(12) United States Patent
Taylor et al.

(10) Patent No.: US 7,139,767 B1
(45) Date of Patent: Nov. 21, 2006

(54) IMAGE PROCESSING APPARATUS AND DATABASE

(75) Inventors: Michael James Taylor, Guildford (GB); Simon Michael Rowe, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/519,178

(22) Filed: Mar. 6, 2000

(30) Foreign Application Priority Data

| Mar. 5, 1999 | (GB) | ................................ 9905158.3 |
| Mar. 5, 1999 | (GB) | ................................ 9905191.4 |
| Mar. 5, 1999 | (GB) | ................................ 9905197.1 |
| Mar. 5, 1999 | (GB) | ................................ 9905202.9 |

(51) Int. Cl.
*G06F 17/00* (2006.01)
*G06F 7/00* (2006.01)

(52) U.S. Cl. .................................. 707/102; 707/104.1

(58) Field of Classification Search ................ 707/204, 707/6, 7, 100–102, 104.1; 709/201, 205, 709/227, 228; 348/14.08, 14.09, 14.12
See application file for complete search history.

(56) References Cited

U.S. PATENT DOCUMENTS

| 4,400,724 | A | * | 8/1983 | Fields | ........................ 348/14.1 |
| 4,965,819 | A | * | 10/1990 | Kannes | ..................... 348/14.07 |
| 4,996,592 | A | * | 2/1991 | Yoshida | .................... 348/14.12 |
| 5,321,396 | A | * | 6/1994 | Lamming et al. | ...... 340/825.49 |
| 5,347,306 | A | * | 9/1994 | Nitta | ........................... 348/14.1 |
| 5,499,146 | A | | 3/1996 | Donahue et al. | ........... 360/33.1 |
| 5,682,330 | A | * | 10/1997 | Seaman et al. | ............. 358/403 |
| 5,819,286 | A | | 10/1998 | Yang et al. | .................. 707/104 |

FOREIGN PATENT DOCUMENTS

| EP | 0495622 A2 | 7/1992 |
| EP | 0660249 A1 | 6/1995 |
| EP | 0696018 A2 | 2/1996 |
| WO | WO 99/65223 | 12/1999 |

OTHER PUBLICATIONS

"MPEG-4 Systems Version 1", Netsite: http://garuda.Imag.fr/MPEG4/syssite/syspub/index.html, last modified, Jun. 5, 1998.

(Continued)

*Primary Examiner*—Jeffrey Gaffin
*Assistant Examiner*—Jacques Veillard
(74) *Attorney, Agent, or Firm*—Fitzpatrick, Cella, Harper & Scinto

(57) ABSTRACT

Three-dimensional computer model data, moving image data or still image data showing at least one person is stored in an archive database 126, 703, 850, 1303, together with additional information to improve the searching and retrieval of data therefrom. The additional information includes view parameter data 512, 1040 which defines at whom or what each person is looking during each predetermined period of time or image. Text data 504, 1020 which comprises words associated with the person, and viewing histogram data 540 which, for each period of text data defines the percentage of time that the speaking person spent looking at each other person or object, may also be stored.

44 Claims, 73 Drawing Sheets

OTHER PUBLICATIONS

"Learning and Recognizing Human Dynamics In Video Sequences", C. Bregler, Procedgs. IEEE Conf. on Computer Vision and Pattern Recognition, Jun. 1997, pp. 568-574.

"Fast visual tracking by temporal consensus"; A. Gee et al.; Image and Vision Computing 14(2): 105-114, 1996, pp. 105-114.

"Computer and Robot Vision, vol. 2", Harallck et al.; Addison-Wesley Pub. Co., 1993, ISBN 0-201-56943-4, pp. 85-91.

"Capturing human models to populate virtual worlds", A. Hilton et al., University of Surrey Technical Report CVSSP-pp. 1-12.

"The Science of Virtual Reality and Virtual Environments", R.S. Kalawsky, Addison-Wesley Publ Co., ISBN 0-201-63171-7, pp. 184-187.

"Affine Analysis of Image Sequences", Shapiro, Cambridge Univ. Press, 1995, ISBN 0-521-55063-7, pp. 16-23, 24-34, Chapters 5 and 7.

"Robust Detection of Degenerate configuration Whilst Estimating the Fundamental Matrix", Torr et al., Oxford Univ. Technical Report 2090/96.

"Motion and Structure from Two Perspective Views: Algorithms, Error Analysis and Error Estimation", J. Weng, IEEE Transactions on Pattern Analysis and Machine Intelligence, vol. 11, No. 5, May 1989, pp. 451-476.

"Towards Gaze-Mediated Interaction: Collecting Solutions of the Midas touch problem"; B. Vellchkovsky et al.: Human-Computer Interaction: Interact '97, pp. 509-516.

"Look Who's Talking: The Gaze Groupware System", R. Vertegaal et al., Summary, ACM CHI '98 conference on Human Factors In Computing Systems, Los Angeles 1998, pp. 293-294.

* cited by examiner

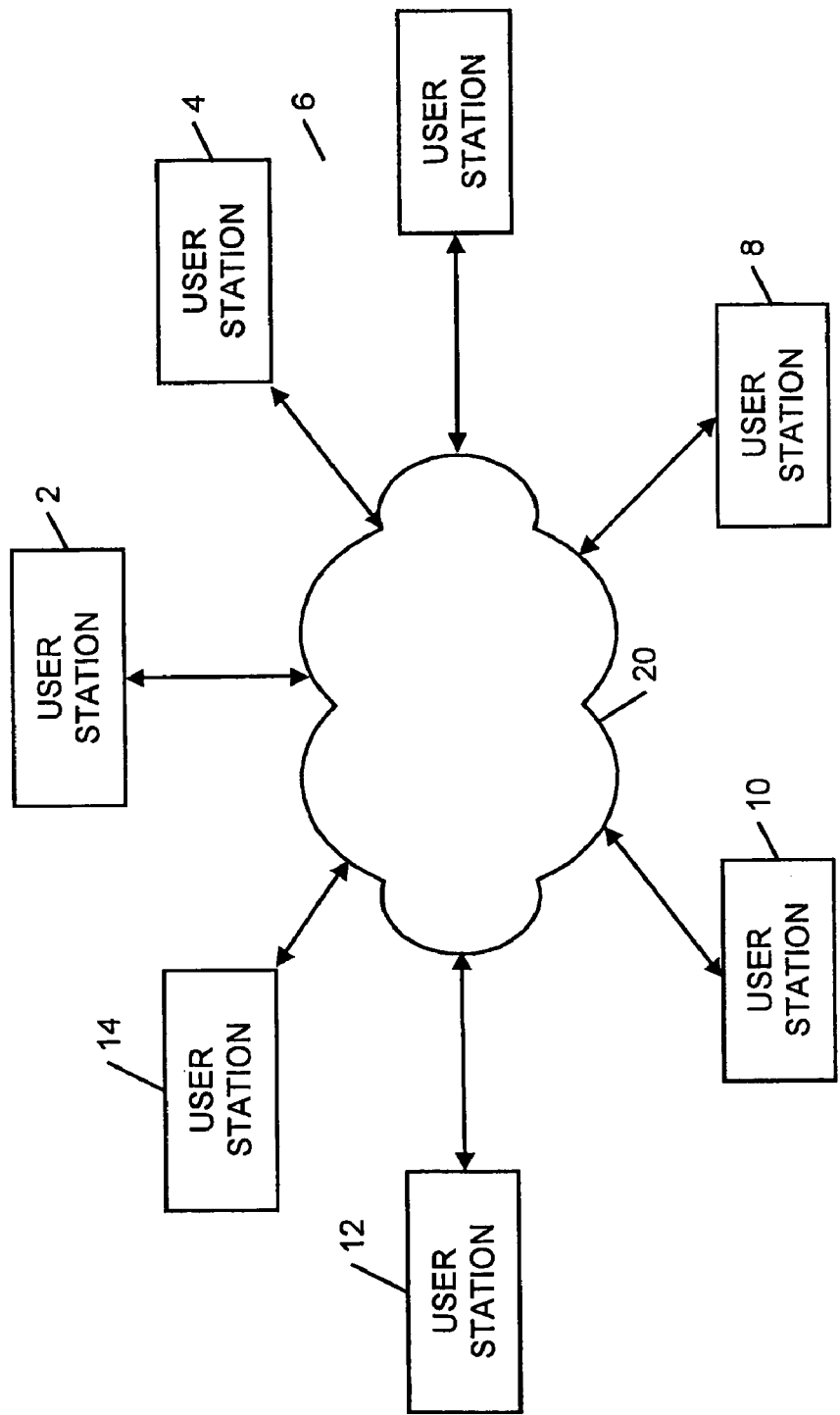

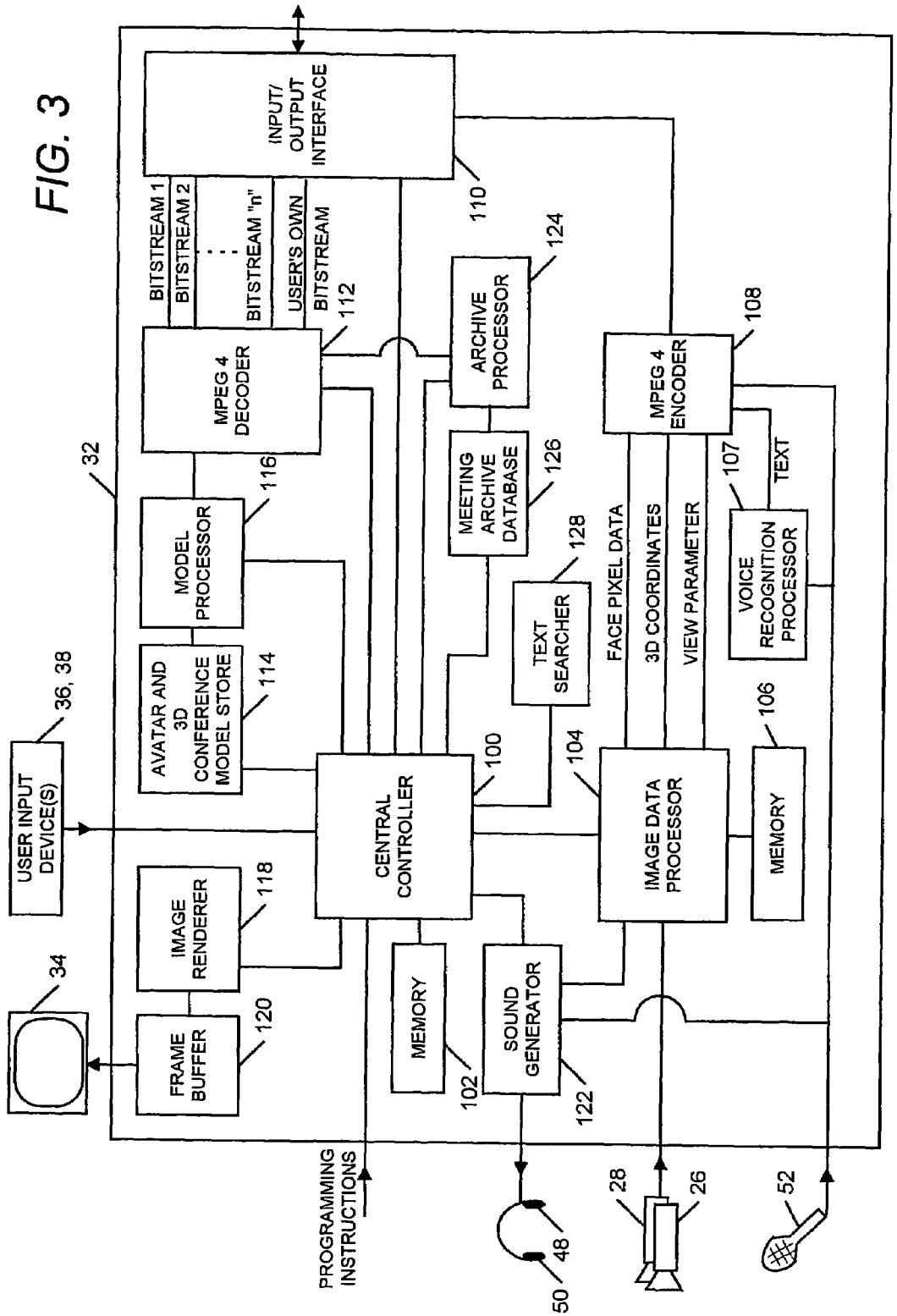

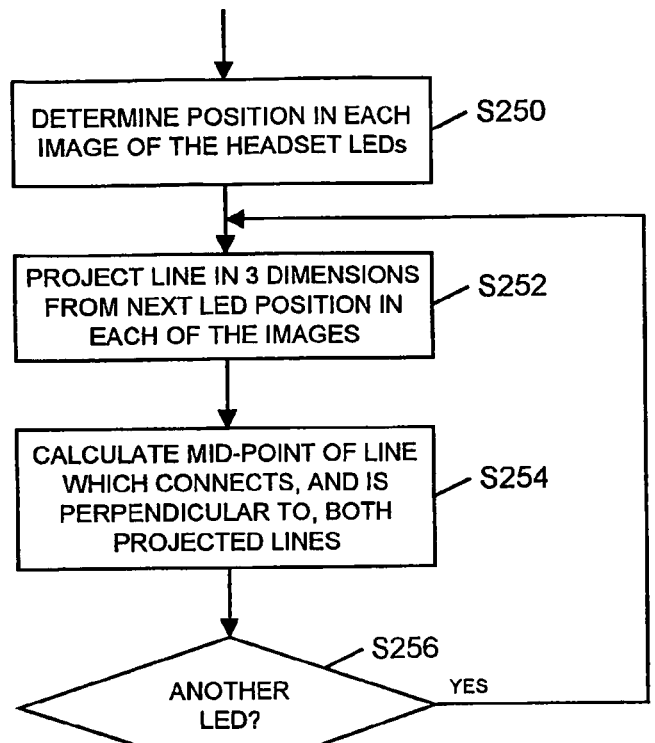
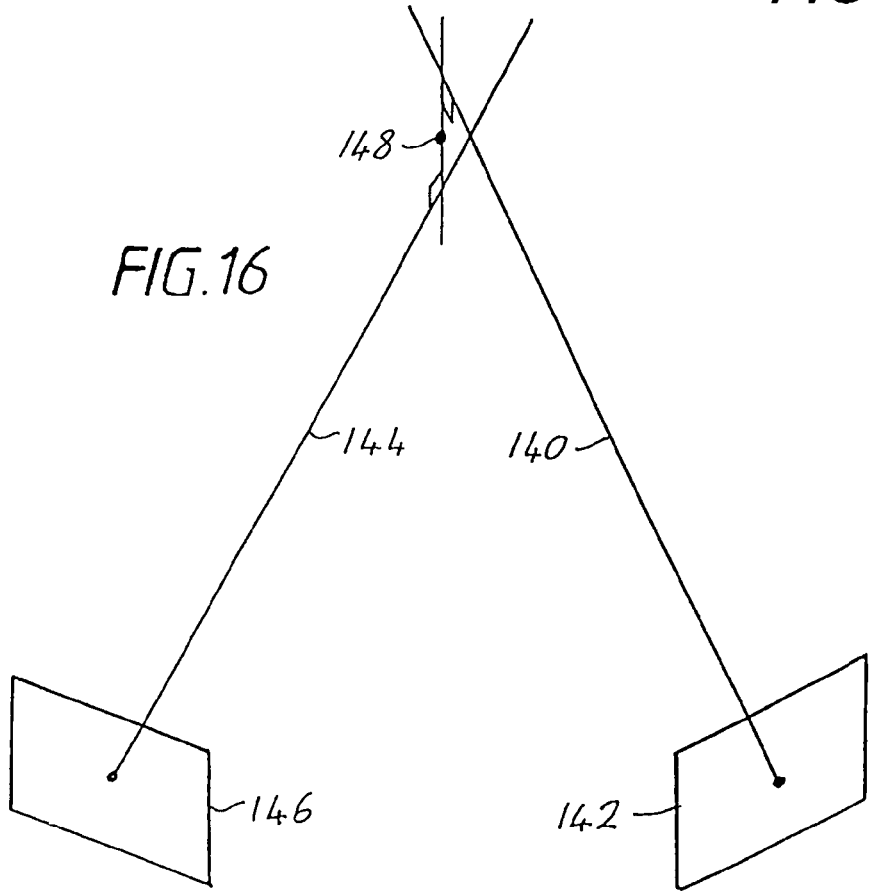

FIG. 21
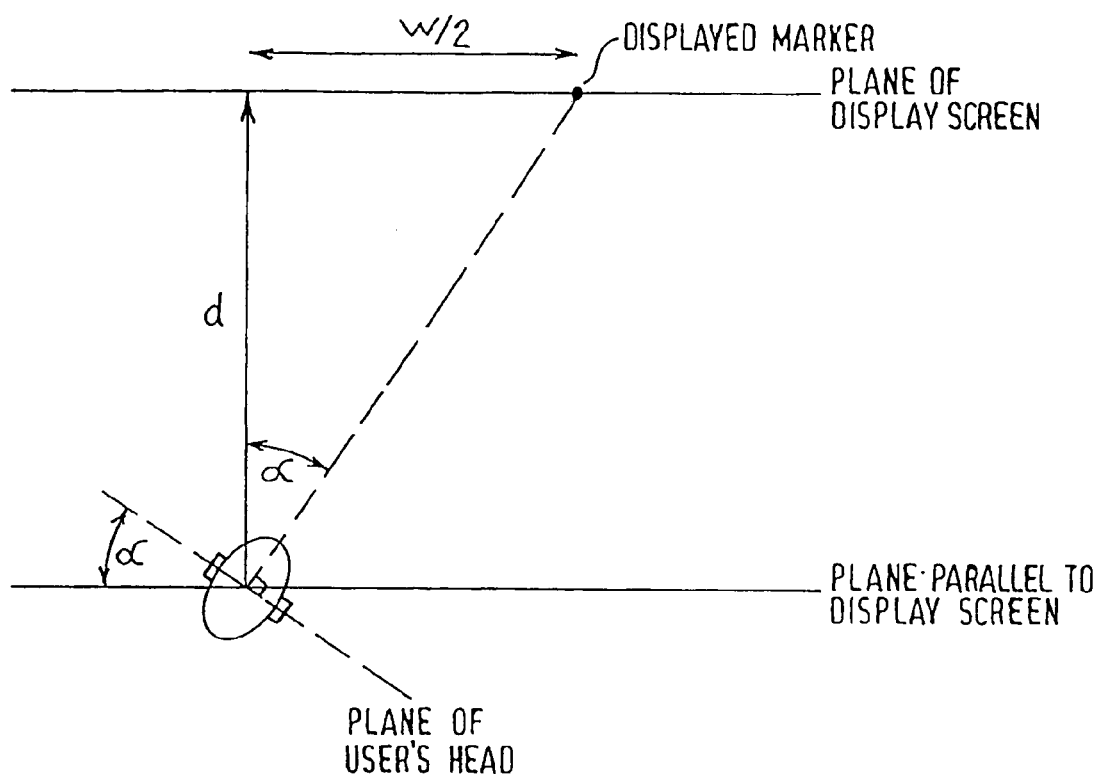
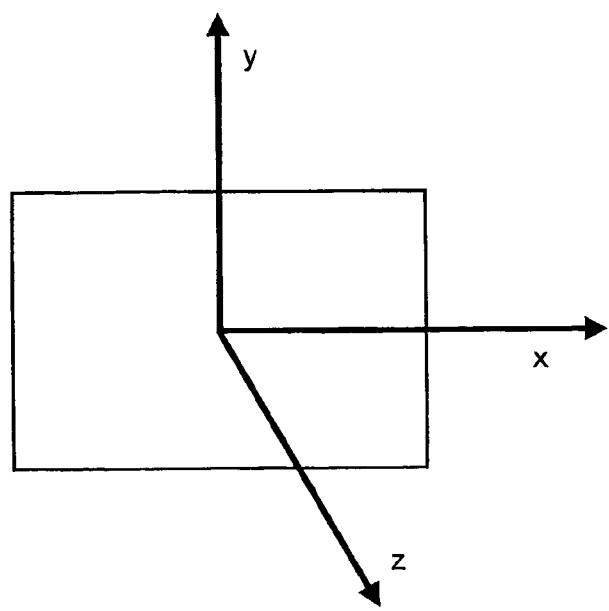
FIG. 22

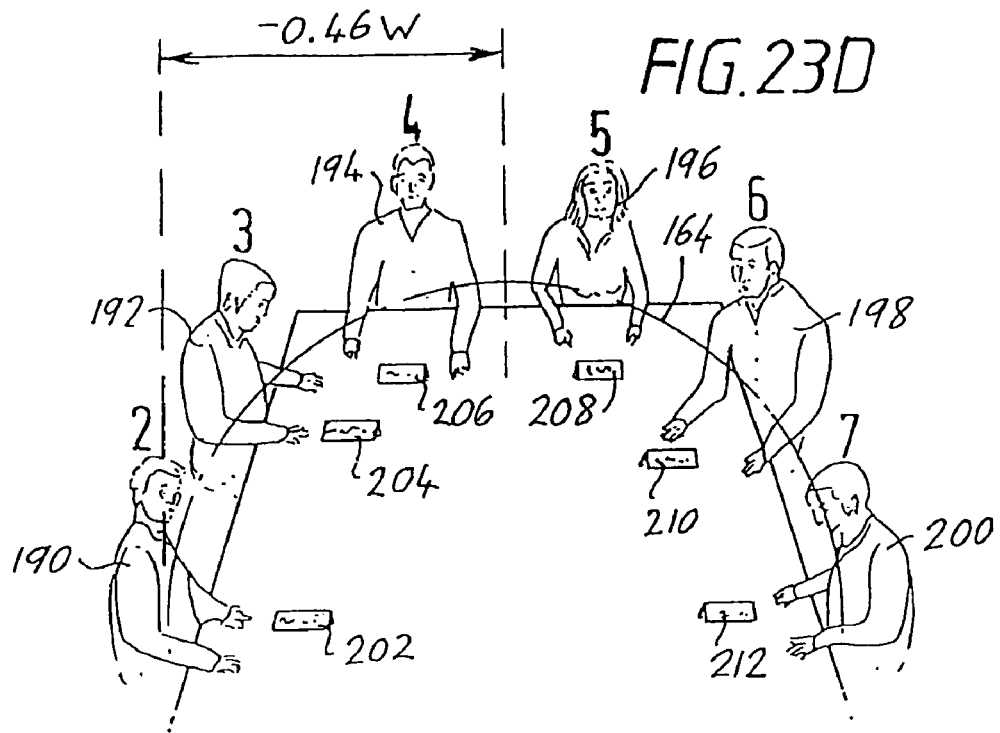
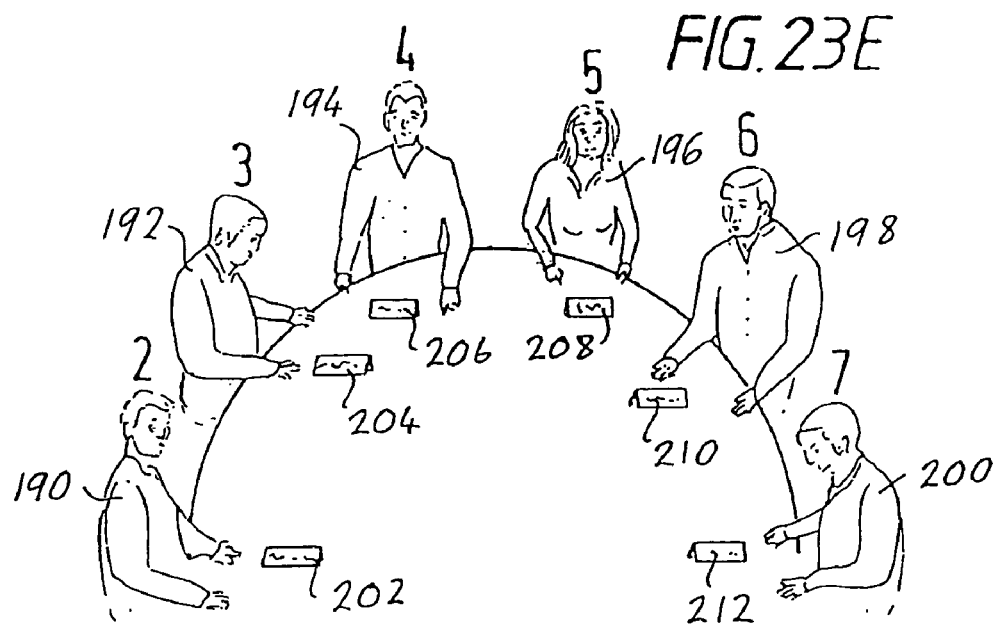

FIG. 36A

| NUMBER | PARTICIPANT |
|--------|-------------|
| 1 | MR. A |
| 2 | MR. B |
| 3 | MR. C |
| 4 | MR. D |
| 5 | MISS. E |
| 6 | MR. F |
| 7 | MR. G |

| NUMBER | PARTICIPANT |
|---|---|
| 1 | MR. A |
| 2 | MR. B |
| 3 | MR. C |
| 4 | MR. D |
| 5 | MISS. E |
| 6 | MR. F |
| 7 | MR. G |

Please enter the following information for this image:

Approximate date that the image was recorded  ☐ — 900

Text to be associated with the image  ☐ — 910

People and animals in the image and at whom or what they are looking:

920 ⎰ ☐ looking at ☐ ⎱
     ⎱ ☐ looking at ☐ ⎰ — 930
       ☐ looking at ☐

FIG. 66B

| NUMBER | PARTICIPANT |
|---|---|
| 1 | MR. A |
| 2 | MR. B |
| 3 | MR. C |
| 4 | MR. D |
| 5 | MISS. E |
| 6 | MR. F |
| 7 | MR. G |

IMAGE PROCESSING APPARATUS AND DATABASE

The present invention relates to the field of information archiving, and, more particularly, to the storage of three-dimensional object data.

This invention also relates to apparatus for generating a two-dimensional (2D) moving image database and a database so generated.

The present invention also relates to the field of information archiving, and, more particularly, to the storage of image data for photographs or other still images.

This invention also relates to apparatus for generating a database and a database so generated.

Many databases exist for the storage of data such as image data etc. However, the existing databases suffer from the problem that it is not possible to store three-dimensional object data therein and/or that the ways in which the database can be interrogated to retrieve information are limited.

In addition, databases are known that enable you to retrieve documents by searching for text strings within those documents. However, these techniques cannot be applied to search for visual information in 2D moving image data such as video data.

Further, many databases exist for the storage of data such as image data. However, existing databases suffer from the problem that the ways in which the database can be interrogated to retrieve information are limited.

In addition, databases exist which enable searching of text documents to locate particular phrases or words within a document.

It is an object of the present invention to provide a database for the archiving of three-dimensional object data which facilitates improved information retrieval.

It is a further aim of the present invention to provide apparatus for generating a moving image database and a moving image database that enables image data containing certain visual information to be retrieved from stored 2D moving image data.

It is a further object of the present invention to provide a database for the archiving of image data which facilitates improved information retrieval.

It is a further aim of the present invention to provide apparatus for generating a database and a database that enables a moving sequence of images or a set of still images to be searched to locate a particular image on the basis of information relating to the visual content of that image.

According to the present invention, there is provided an apparatus or method in which data for three-dimensional objects is archived together with gaze information to facilitate information retrieval.

The present invention also provides an apparatus or method in which data for three-dimensional objects is stored together with information defining where or at what the objects are looking.

The present invention further provides an apparatus or method for archiving data for three-dimensional objects, in which data defining movements of the three-dimensional objects (or, alternatively data defining the three-dimensional objects in different positions) is stored in association with archive data defining at what (for example a person, animal or object) each three-dimensional object is looking at different times.

Such a system facilitates searching of the stored information to identify archive data for the three-dimensional objects using a query such as "find each part in which Simon is looking at Mike" (Simon and Mike being specific ones of the three-dimensional objects) or such as "find each part in which Allan is looking at mountains".

The present invention further provides an apparatus or method for generating archive data in such a system, and in addition, an apparatus or method for searching stored data in such a system.

The present invention further provides instructions, both in signal and recorded form, for configuring a programmable processing apparatus to become arranged as an apparatus, or to become operable to perform a method, in such a system.

The present invention also provides apparatus for creating a two-dimensional (2D) moving image database, comprising: means for receiving 2D moving image data; means for identifying participants shown in the moving image data; means for providing data relating to visually depicted interactions between participants in the moving image data; and processing means for generating a database in which sections or items of the moving image data are stored in association with the data representing interactions between the participants in that particular section of moving image data.

Apparatus embodying the invention enables a 2D moving image database to be produced which can be searched to enable sections of the moving image data in which particular visually depicted interactions occur between particular participants in the moving image data.

Preferably, the data relating to visually depicted interactions between participants relates to the direction of gaze of the participant. For example, this data may define which participant was looking at which other participant in the associated moving image data.

The 2D moving image data may be associated with a sound track carrying speech spoken by the participants and the processing means may be operable to generate the database such that each section of moving image data is also associated with a corresponding sound file 4 a participant who is talking in the corresponding section of moving image data. This enables the database to be searched to retrieve sections of the moving image data where a particular participant was talking about a particular while looking at a specific one of the other participants shown in that moving image data.

The present invention also provides a method for creating such a two-dimensional (2D) moving image data. The present invention also provides a database having the features set out above.

The present invention also provides apparatus for searching a database having means for receiving search parameters input by a user identifying a first participant and a second participant being looked or gazed at by the first participant in the section of moving image data the user wishes to retrieve, means for locating in the data indicating that the first participant is looking at the second participant and means for displaying the results of the search to the user.

According to the present invention there is also provided an apparatus or method in which image data is archived together with gaze information to facilitate information retrieval.

The present invention also provides an apparatus or method in which image data is stored together with information defining one or more subjects in the image and at what the subjects are looking.

The present invention further provides an apparatus or method for archiving image data, in which archive data is stored in association with the image data, the archive data defining one or more people or animals in the image and the person, animal or object at which they are looking.

Such a system facilitates searching of the stored information to identify an image using a query such as "find each image in which Simon is looking at Mike" or such as "find each image in which I am looking at mountains".

The present invention further provides an apparatus or method for generating archive data in such a system, and in addition, an apparatus or method for searching stored data in such a system.

The present invention further provides instructions, both in signal and recorded form, for configuring a programmable processing apparatus to become arranged as an apparatus, or to become operable to perform a method, in such a system.

The present invention further provides apparatus for generating a database, comprising a processor and a memory for storing image data, the processor being operable to generate in said memory a database in which images are each storable in association with data relating to an interaction between participants in that image so that image data can be retrieved from the database by using said interaction data.

Preferably, the interaction relates to the direction of gaze of a participant in an image which may indicate for example which of other participants in the image that participant is looking at.

In an embodiment the processor is operable also to store text data representing words spoken by a participant shown in the image data so as to enable image data to be retrieved from the database by using said text data. In another embodiment words spoken by a participant may be stored as sound data rather than text data.

Embodiments of the invention will now be described, by way of example only, with reference to the accompanying drawings in which:

FIG. 1 schematically shows a plurality of user stations interconnected to carry out a video conference in a first embodiment of the invention;

FIG. 3 is a block diagram showing an example of notional functional components within the computer processing apparatus at each user station;

FIG. 15 shows the processing operations performed at step S234 in FIG. 14;

FIG. 16 illustrates the line projection and mid-point calculation performed at step S252 and step S254 in FIG. 15;

FIG. 21 illustrates the angle calculation performed at step S346 in FIG. 20;

FIG. 22 illustrates the standard coordinate system set up at step S278 in FIG. 17;

FIGS. 23A, 23B, 23C, 23D and 23E show examples of avatar positions at conference room tables;

Figure 4:
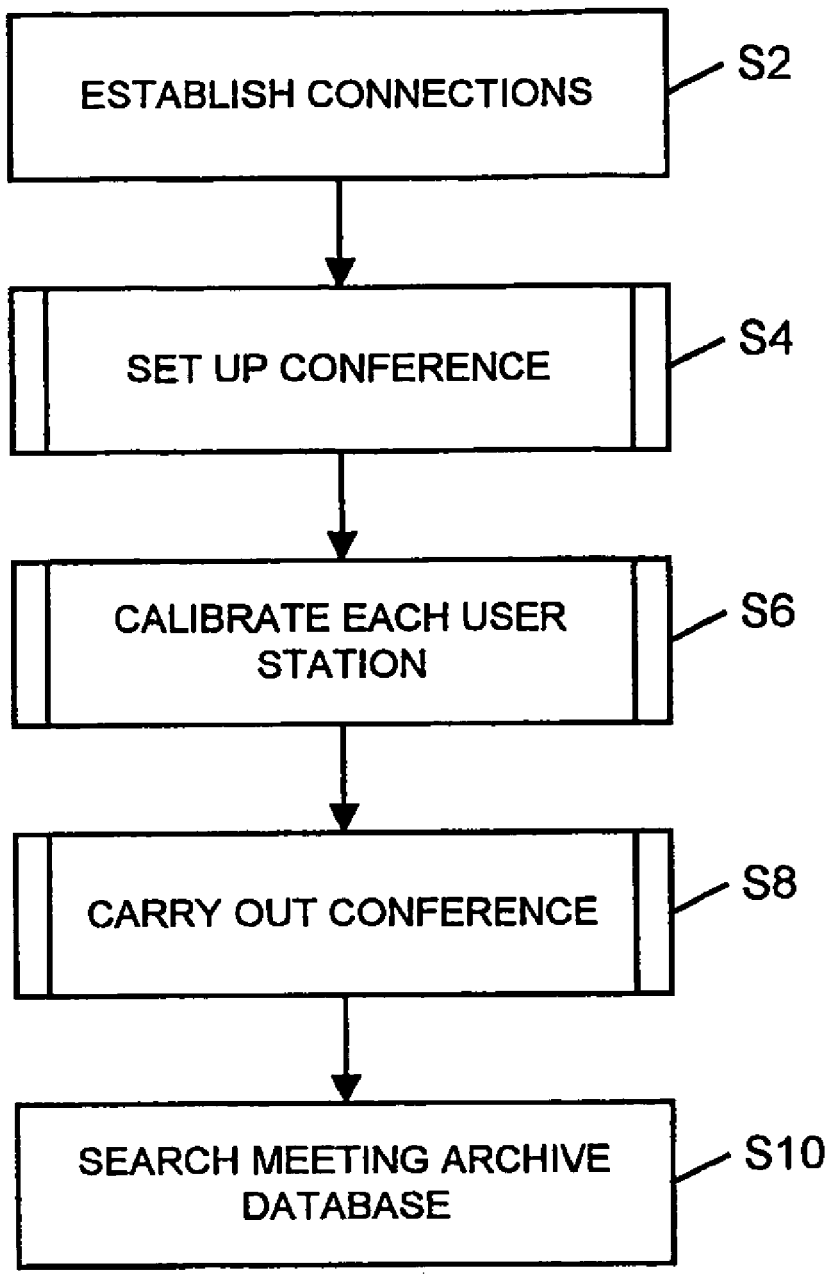
FIG. 4 shows the steps performed to carry out a video conference.
Figure 33:
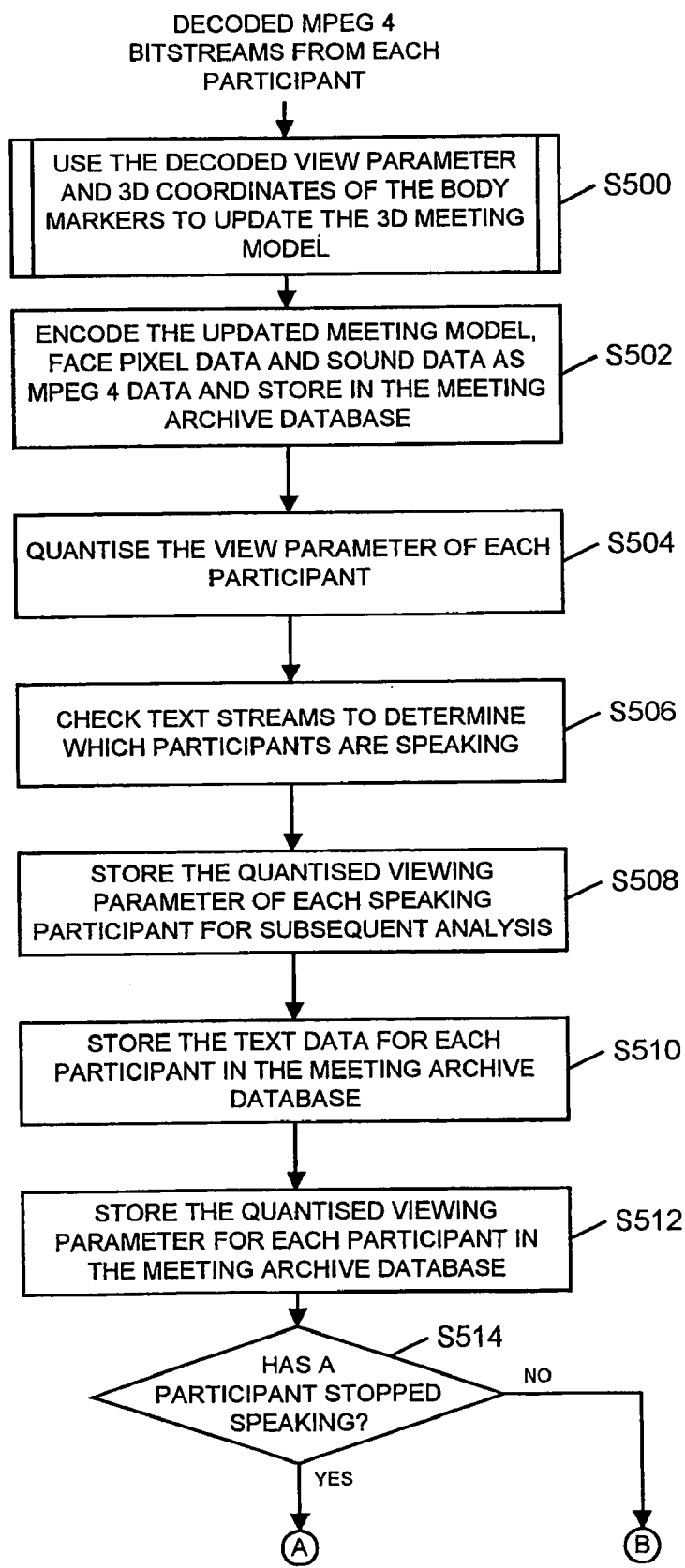
FIGS. 33A and 33B show the processing operations performed at step S380 in FIG. 25.
Figure 33:
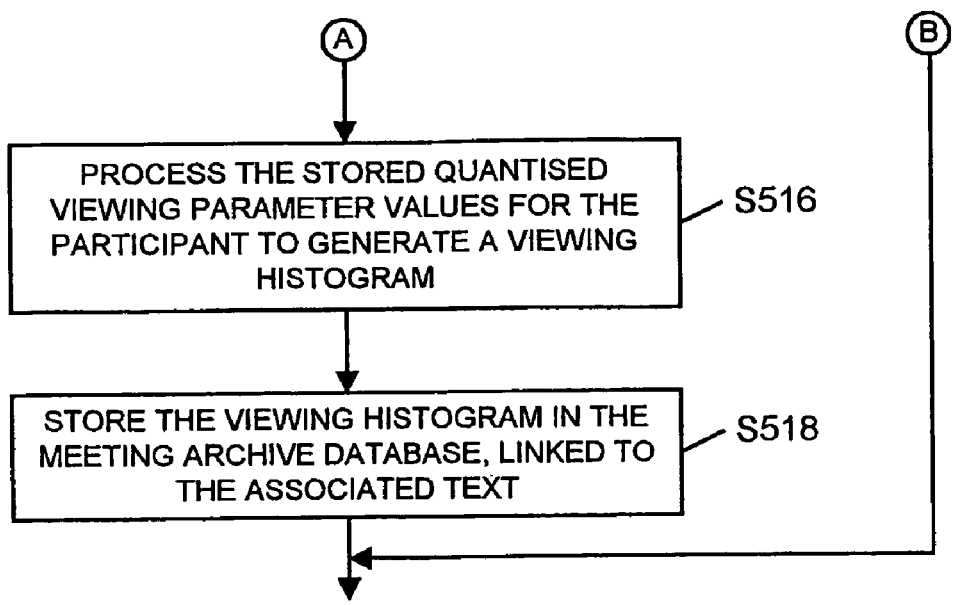
Figure 36B:
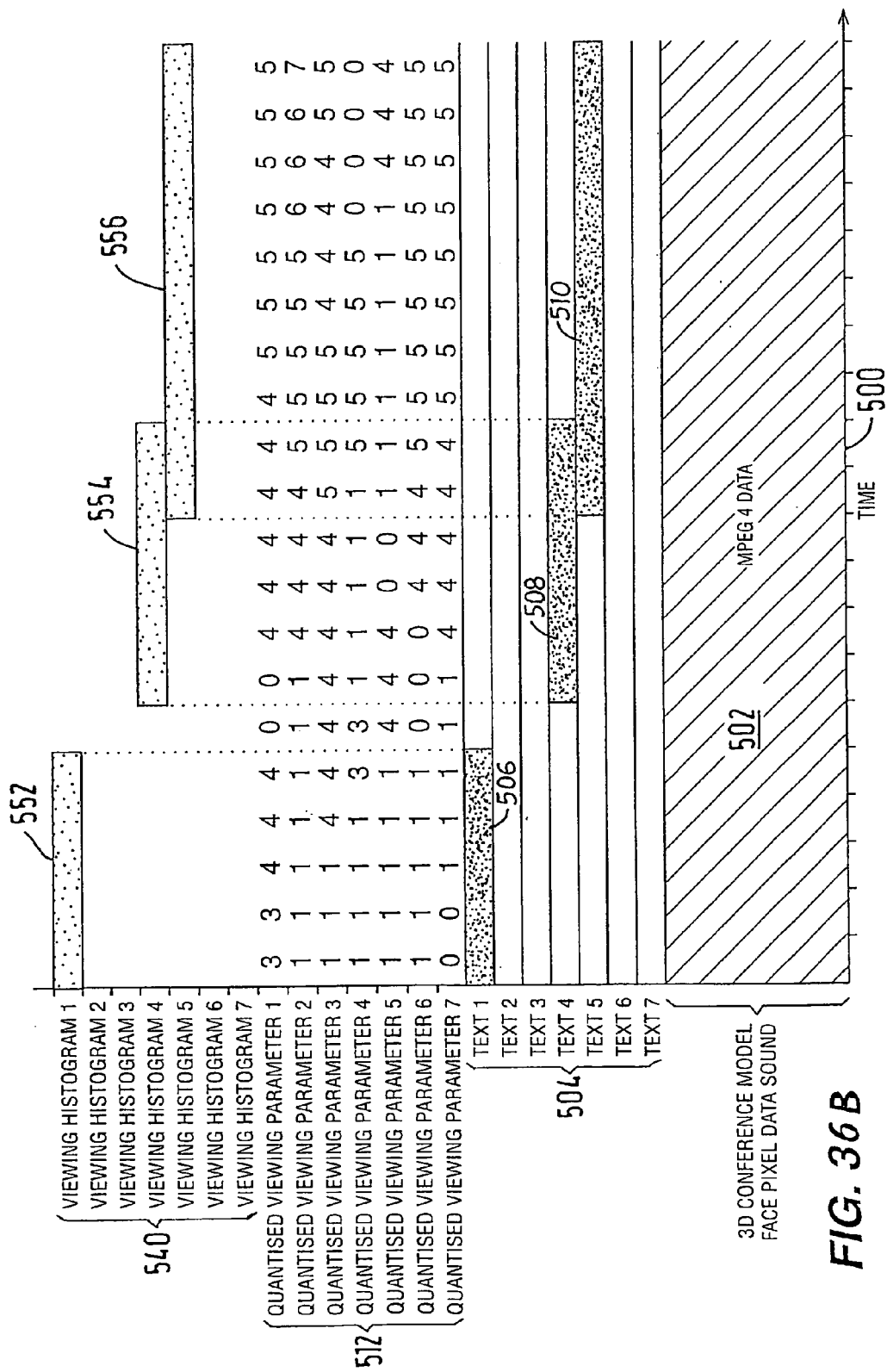
Figure 37A:
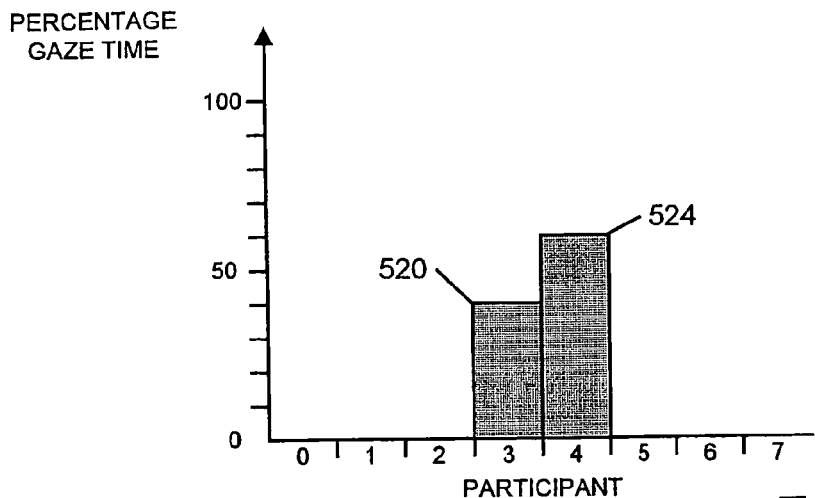
Figure 37B:
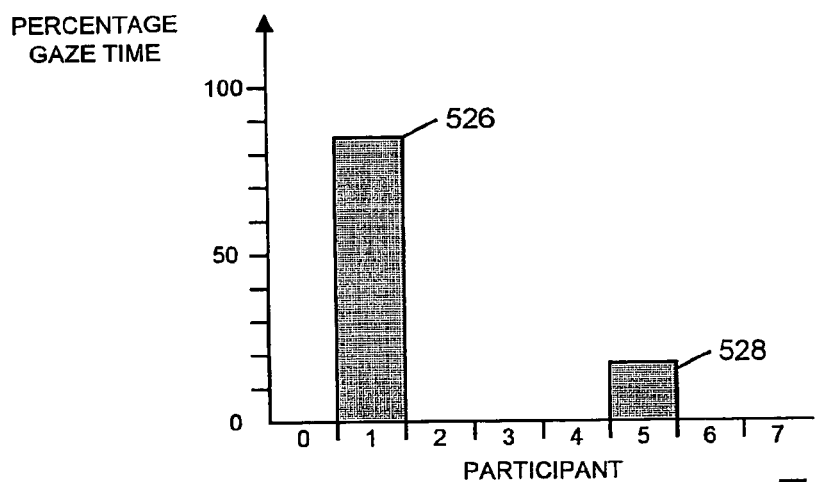
Figure 37C:
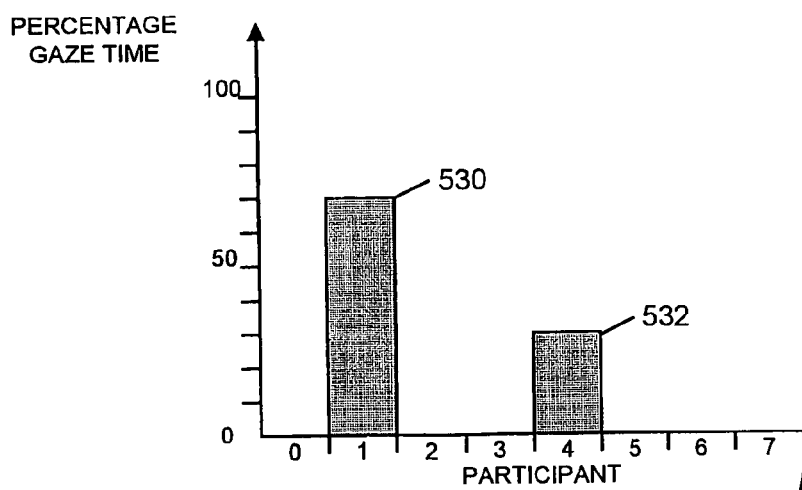
Figure 38:
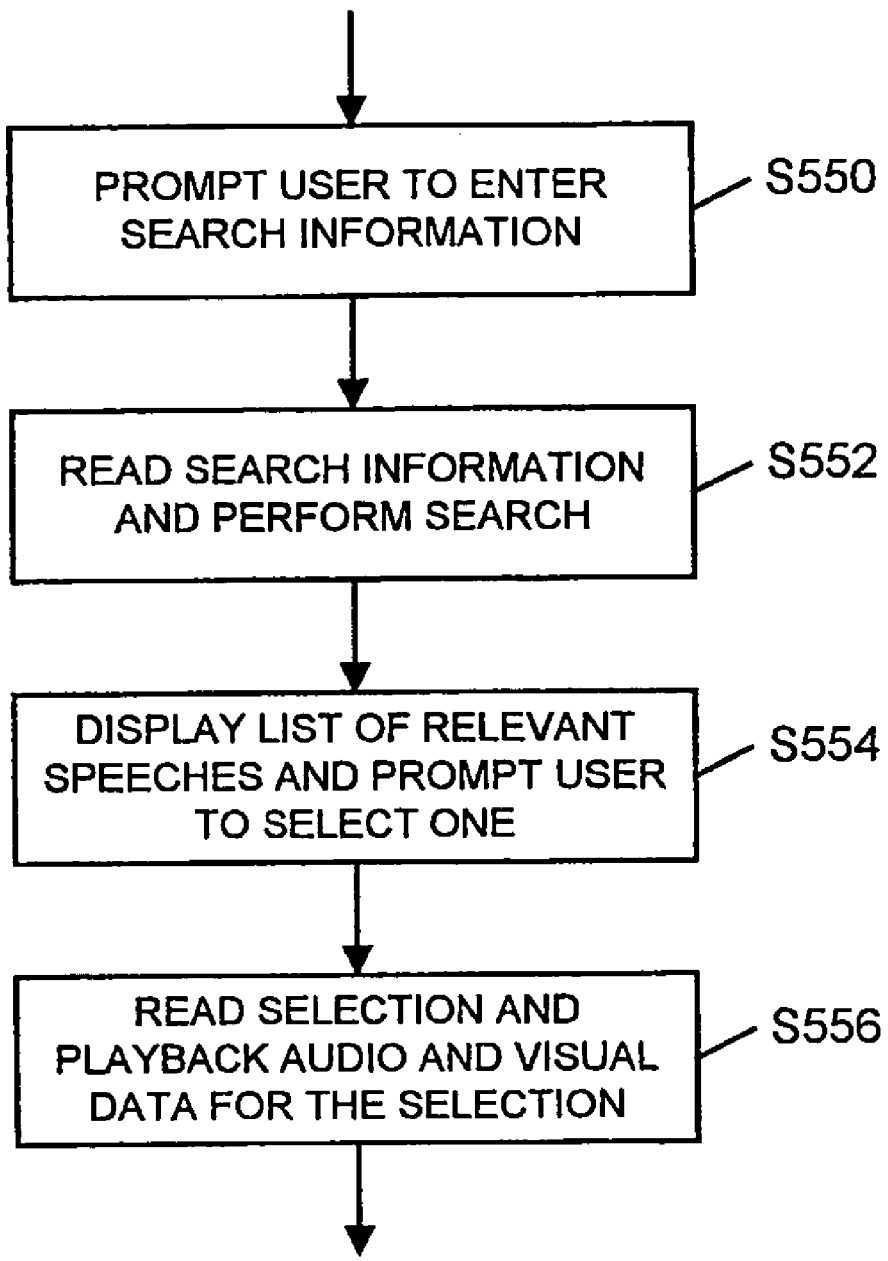
Figure 39A:
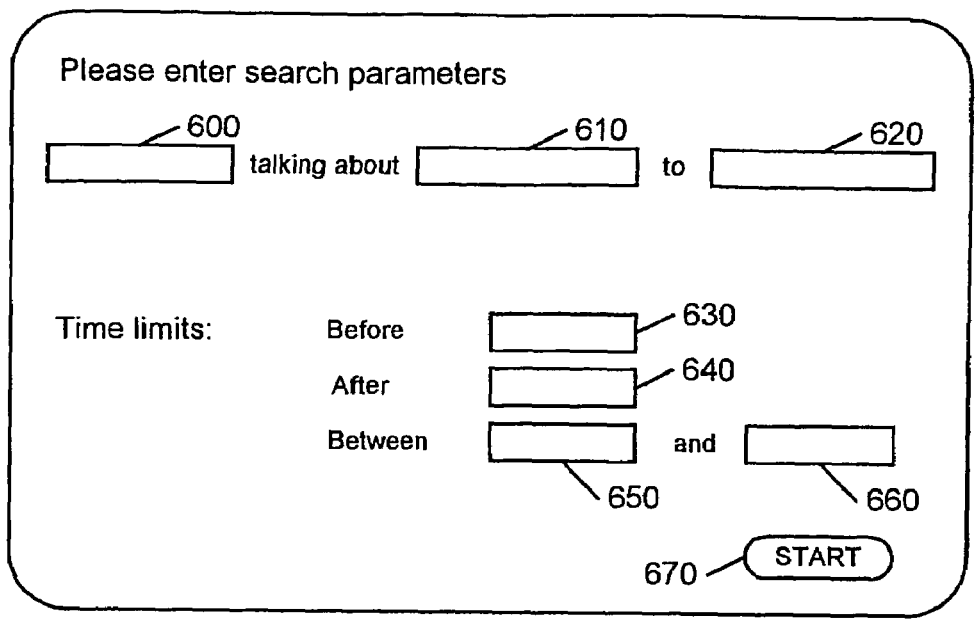
Figure 39B:
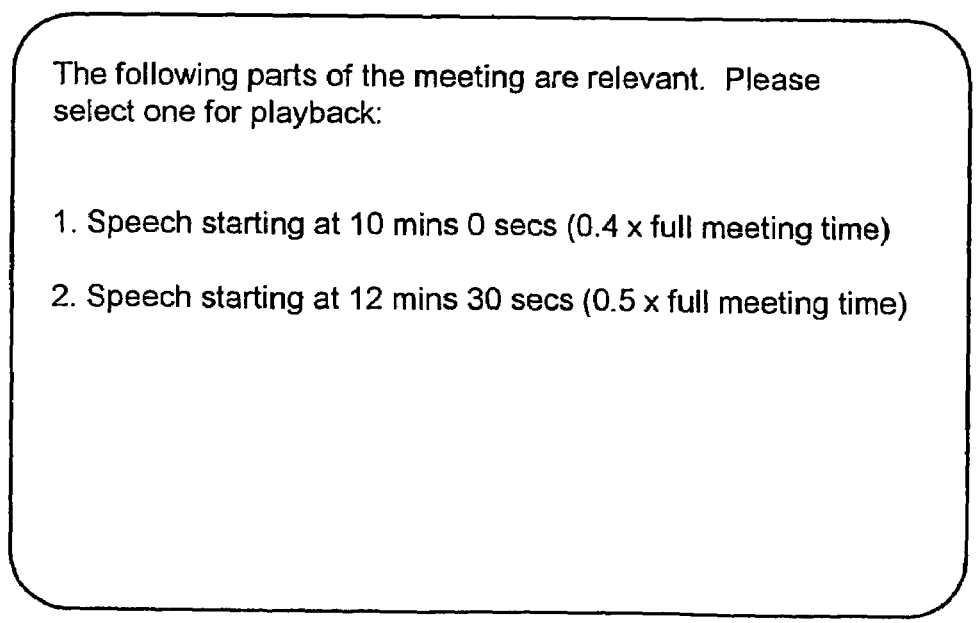
Figure 40:
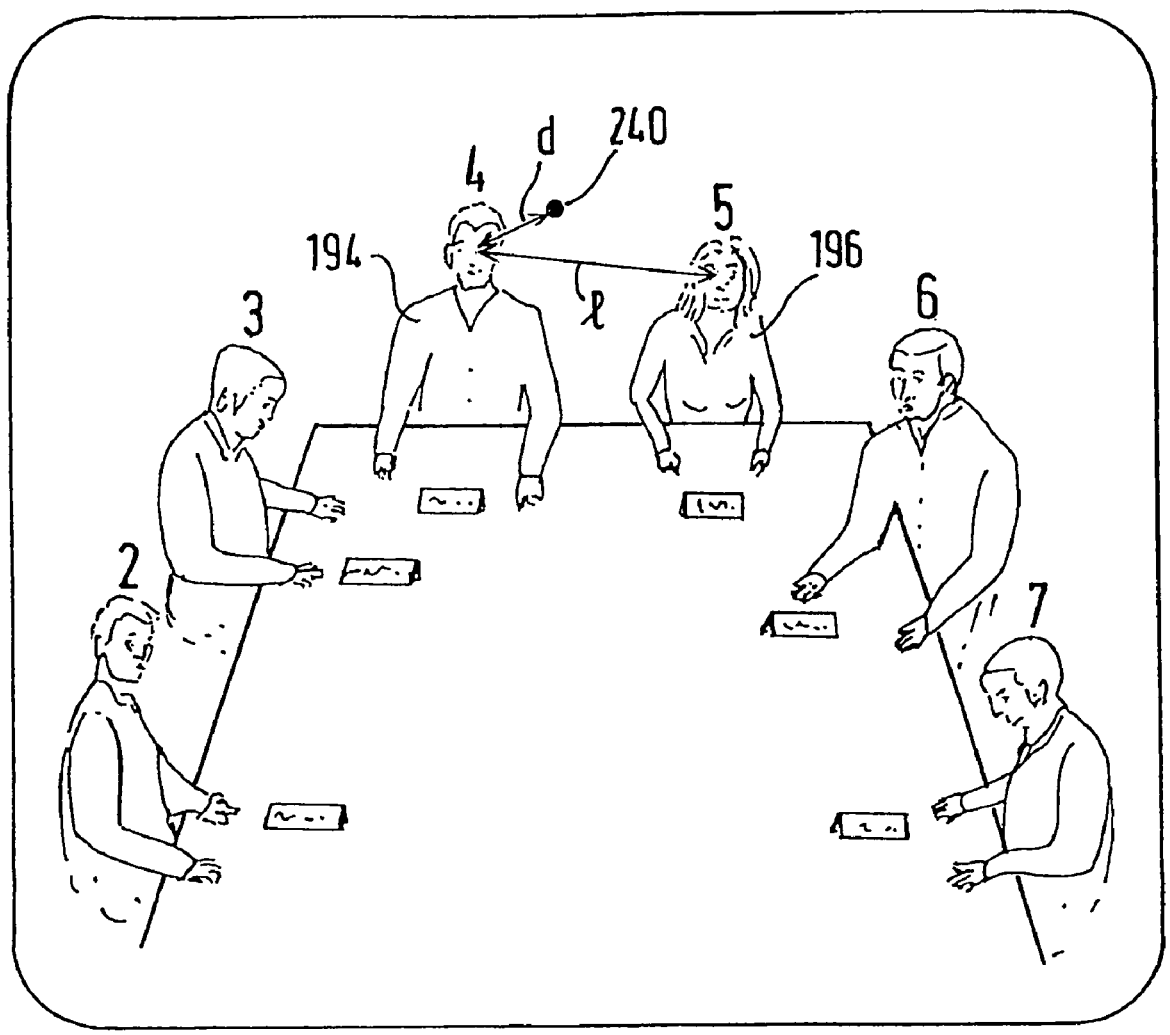
Figure 41:
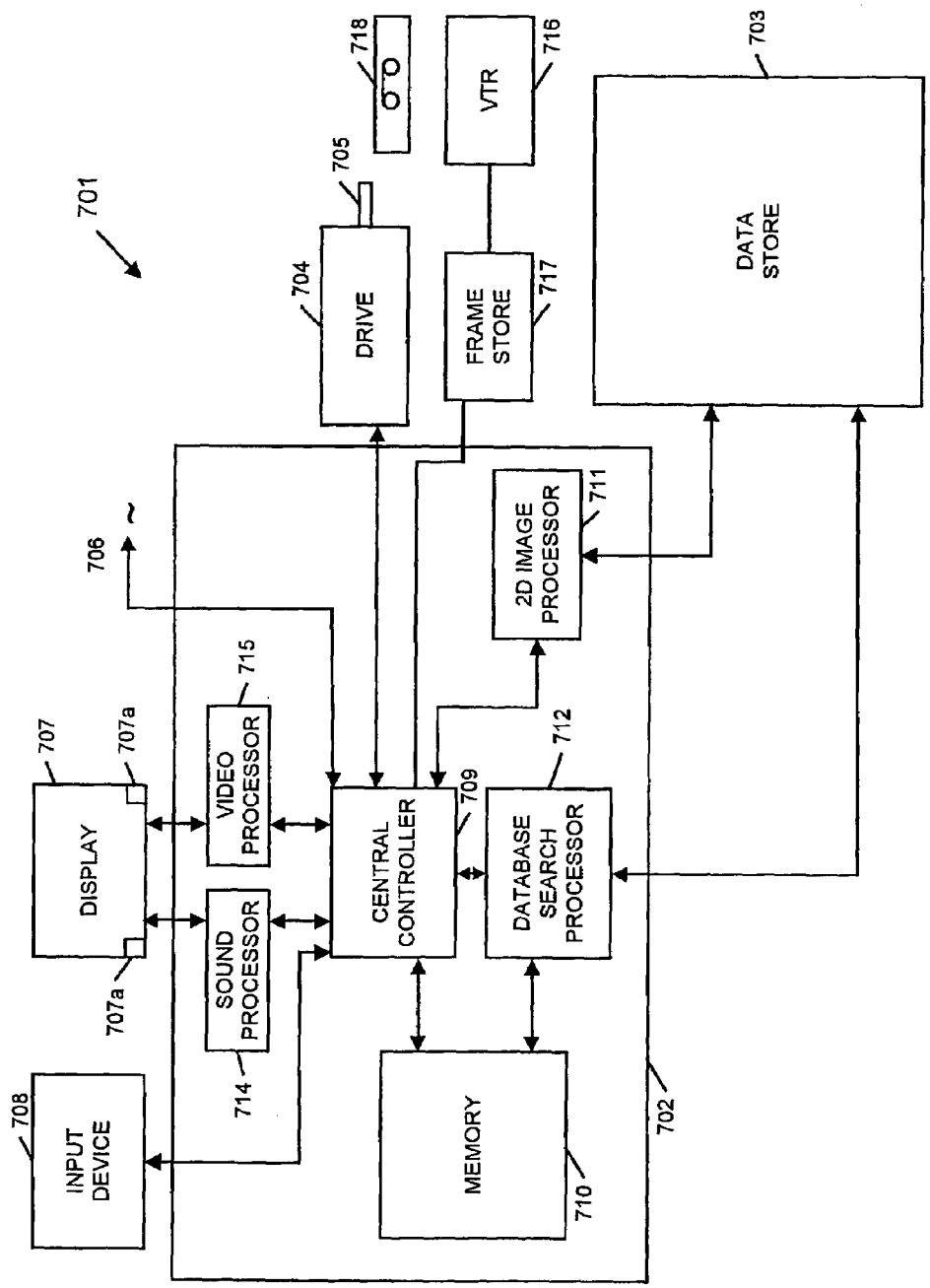
Figure 42A:
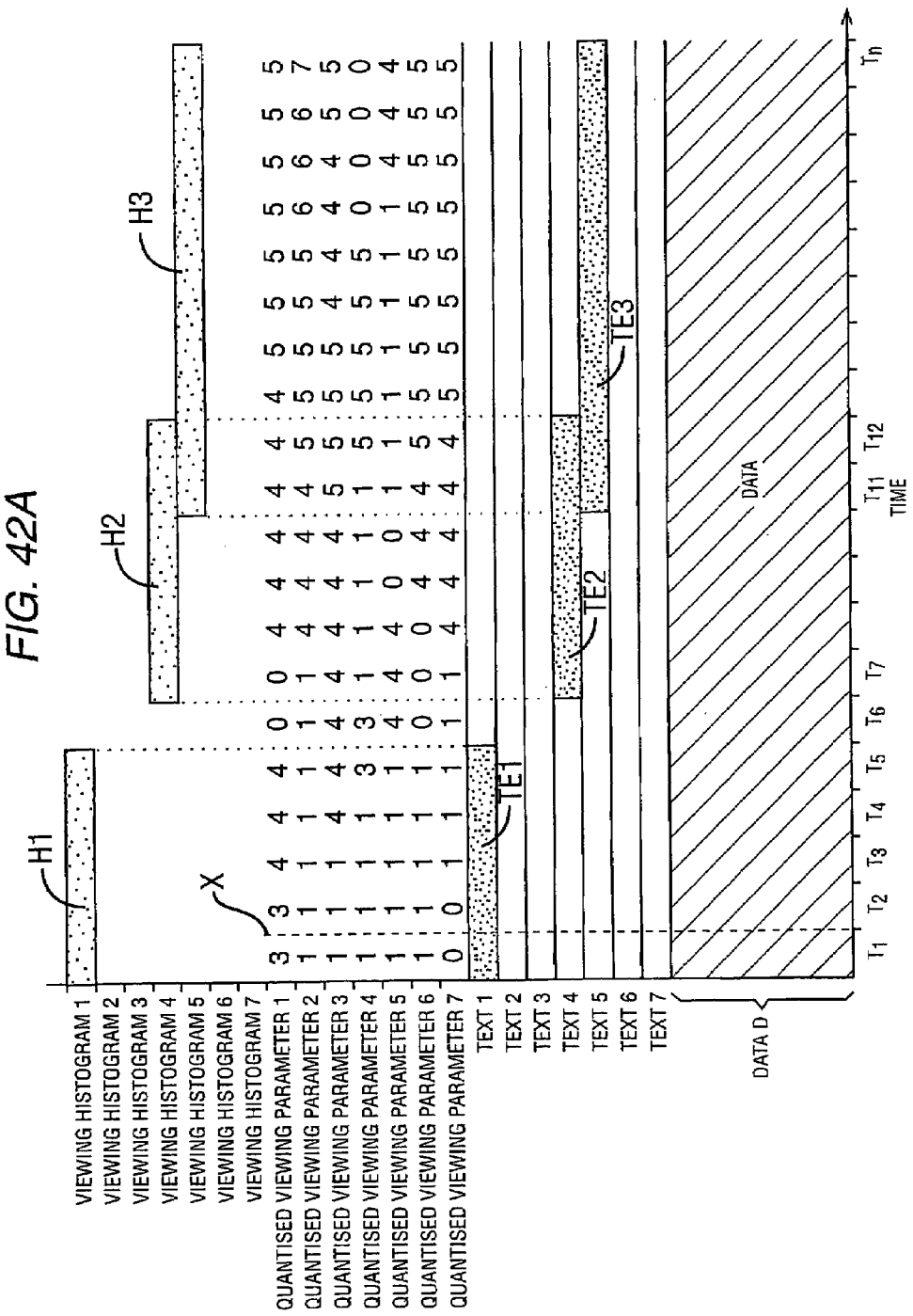
Figure 43A:
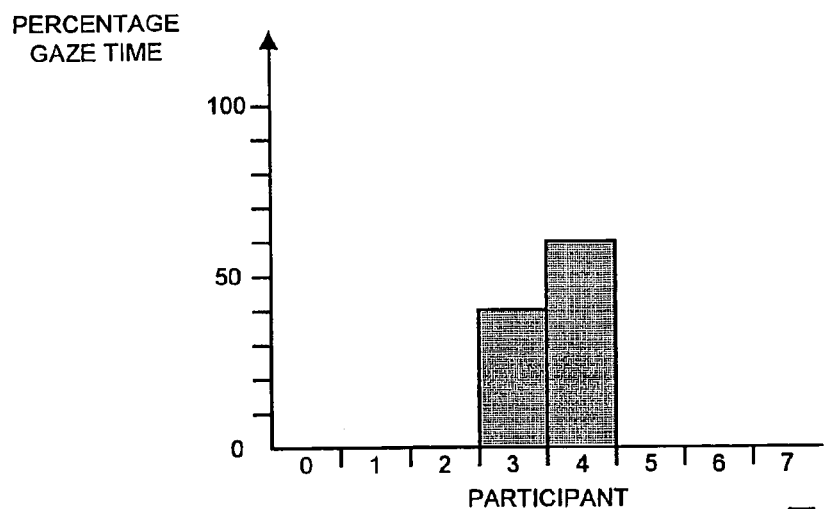
Figure 43B:
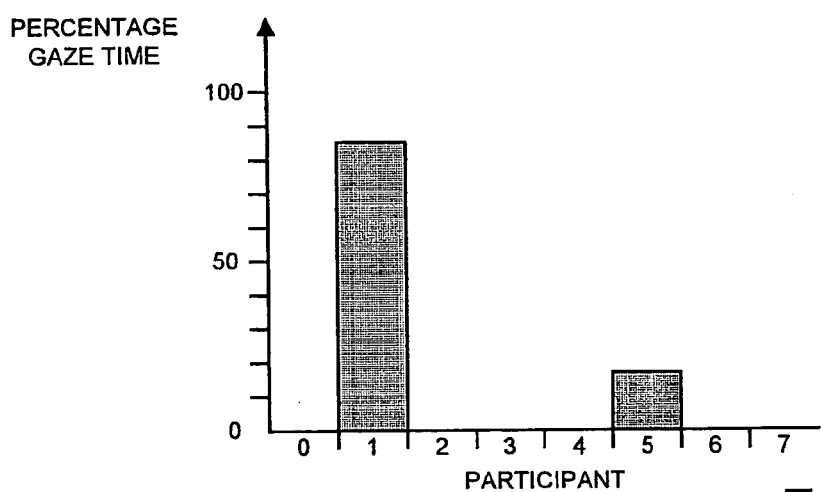
Figure 43C:
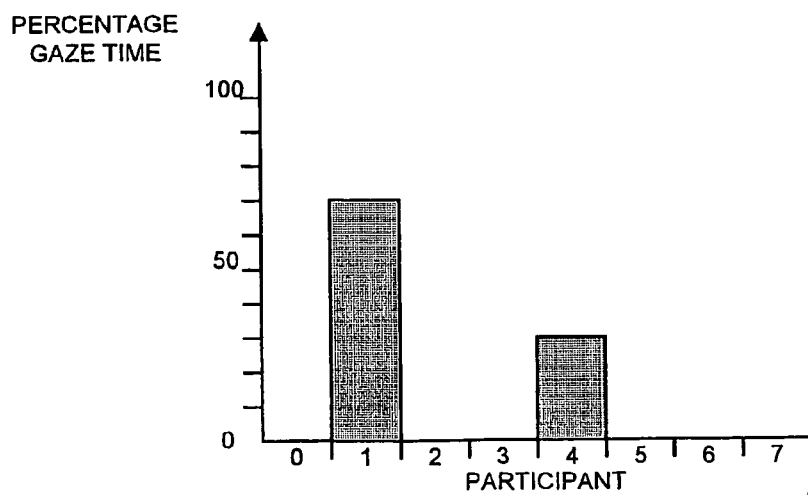
Figure 44:
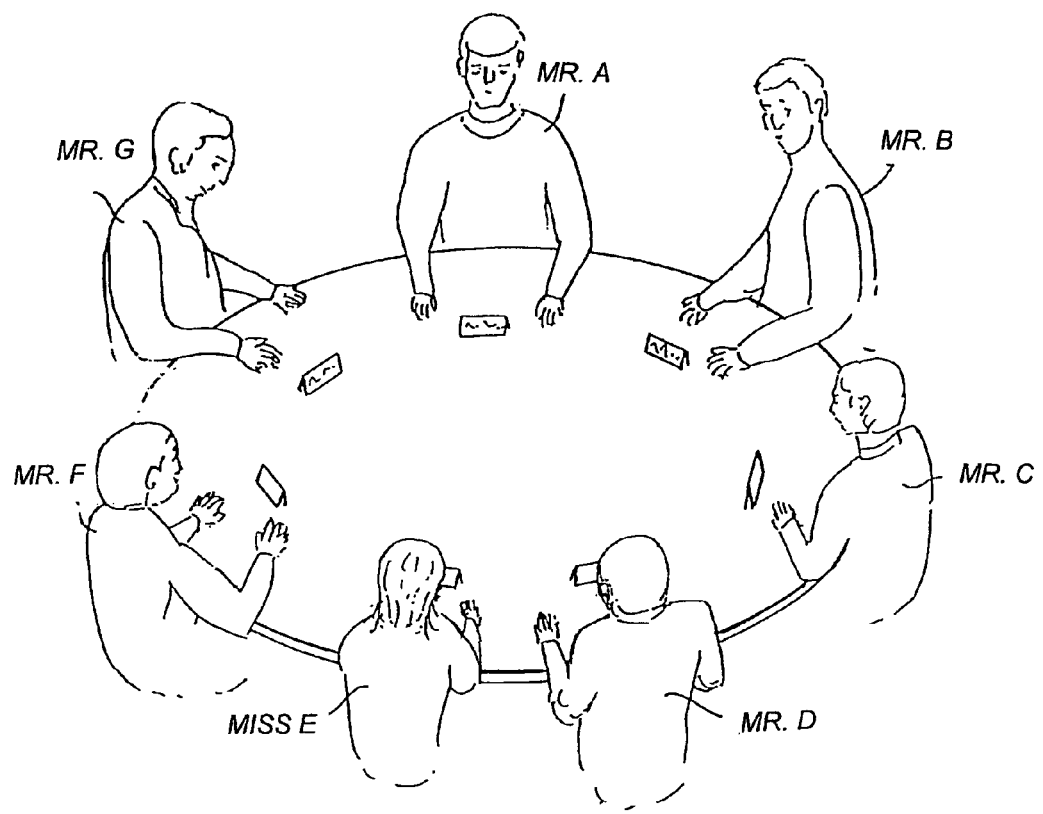
Figure 45:
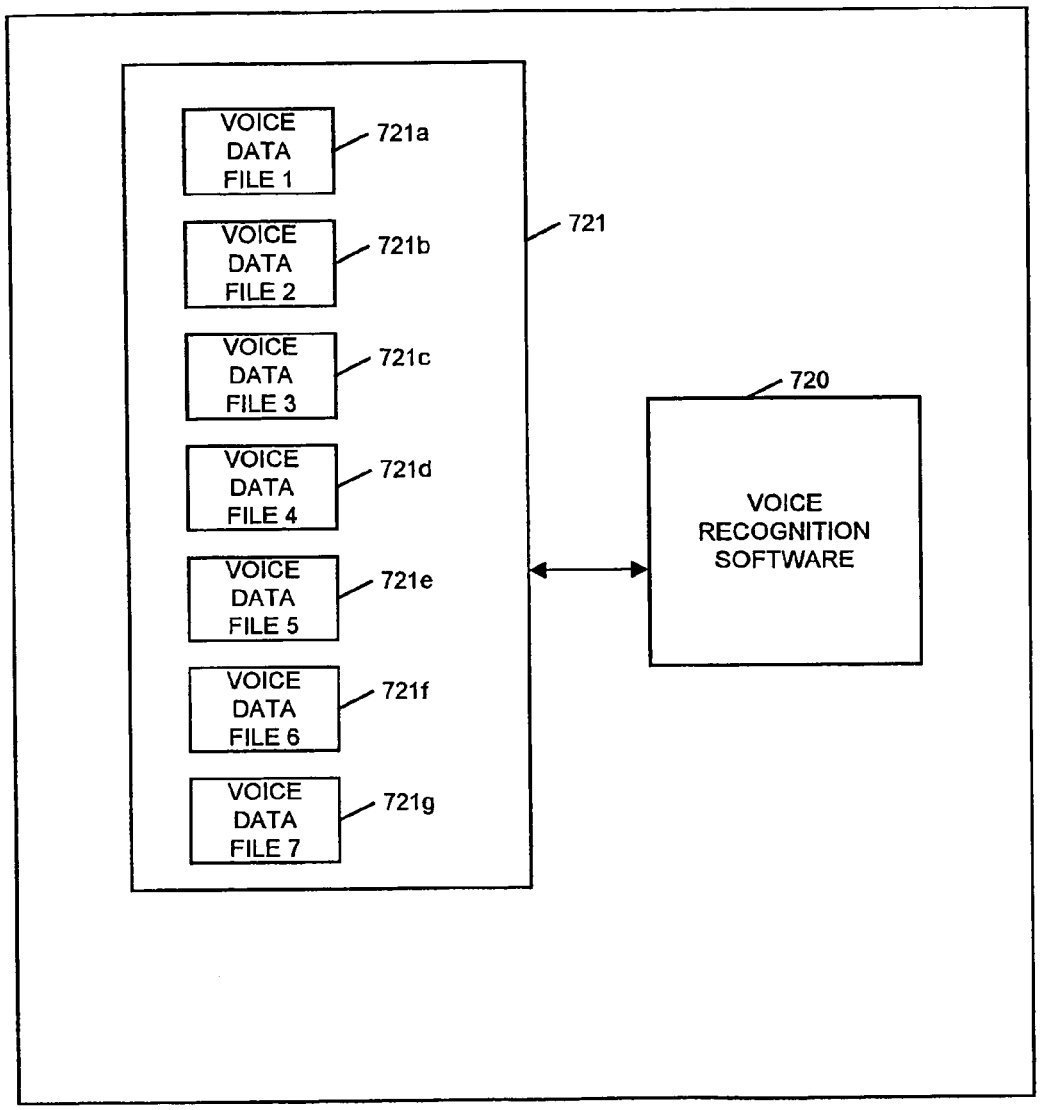
Figure 46A:
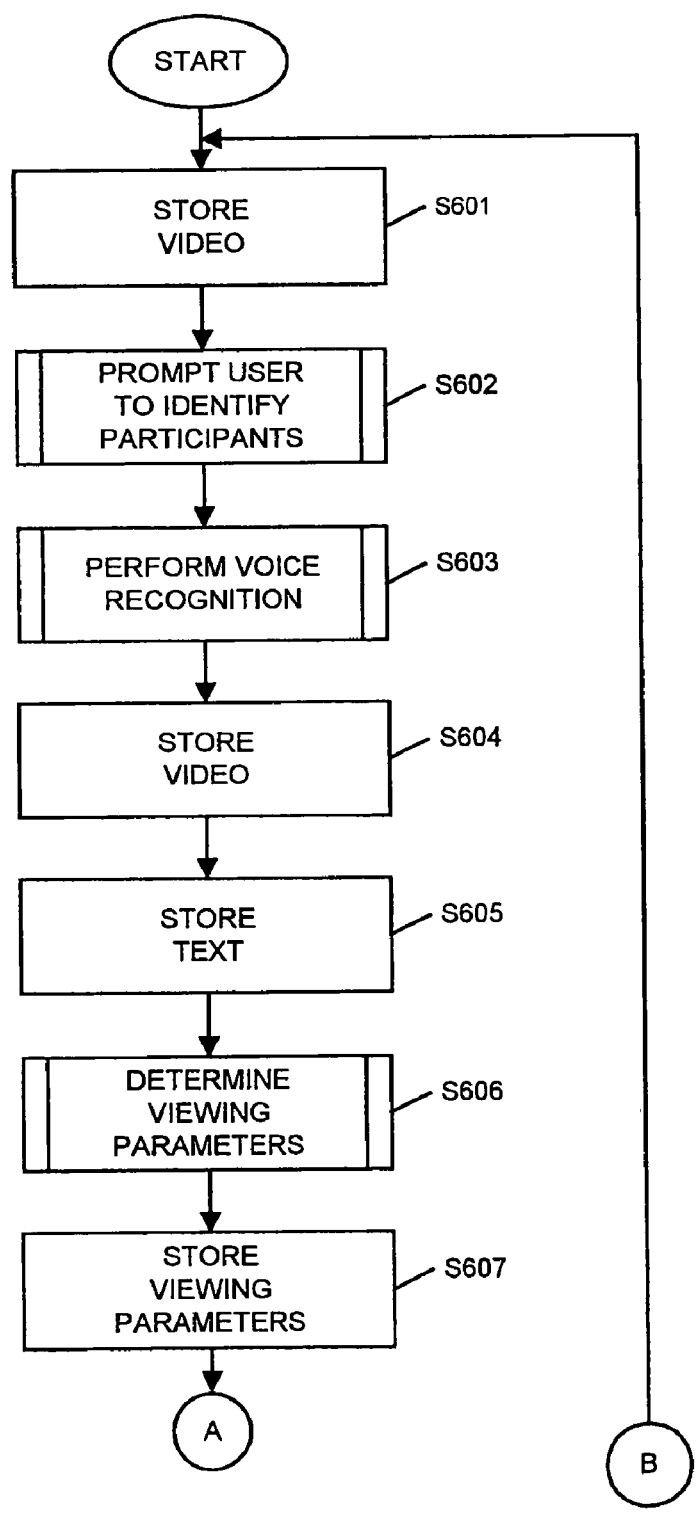
Figure 46B:
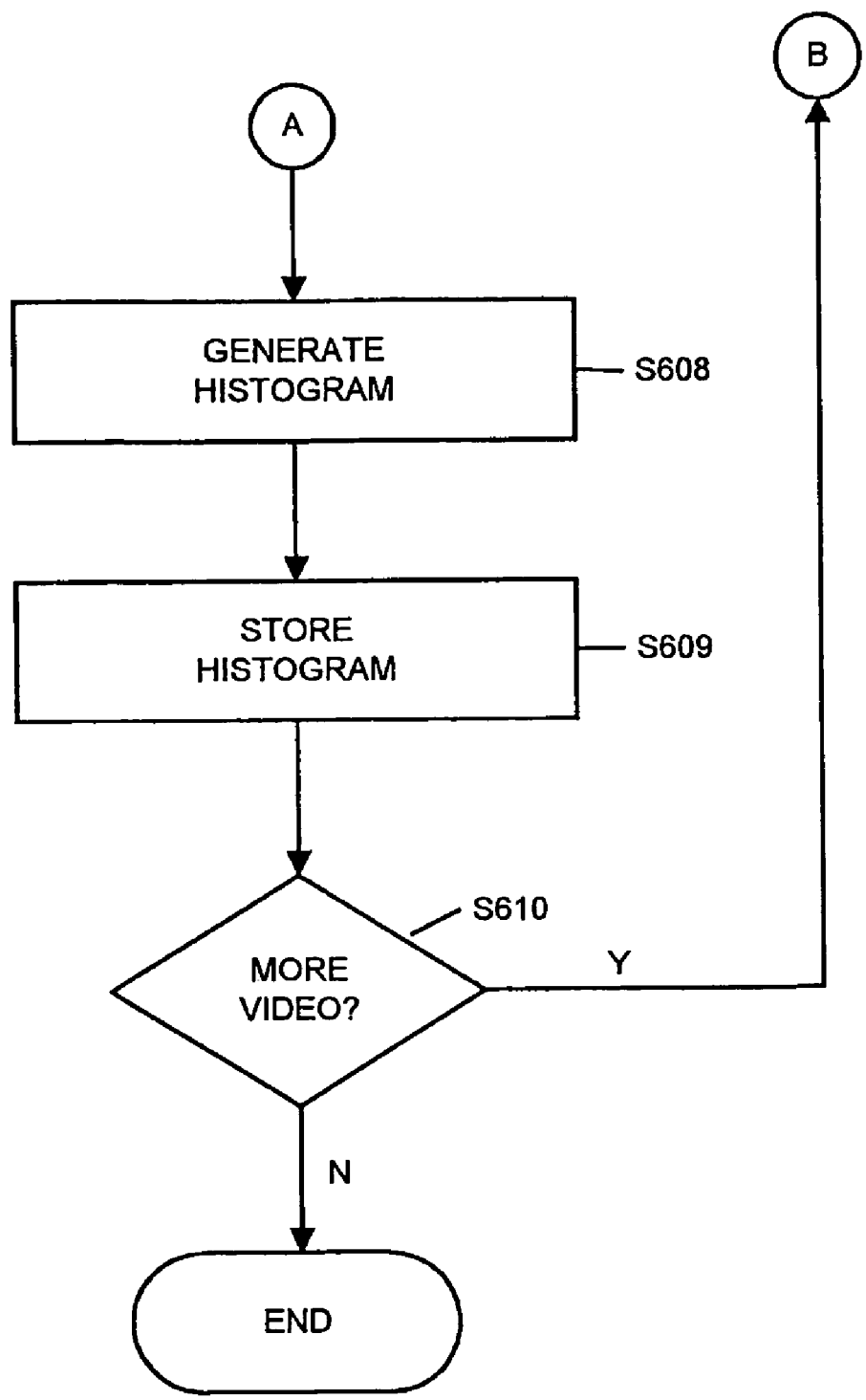
Figure 47:
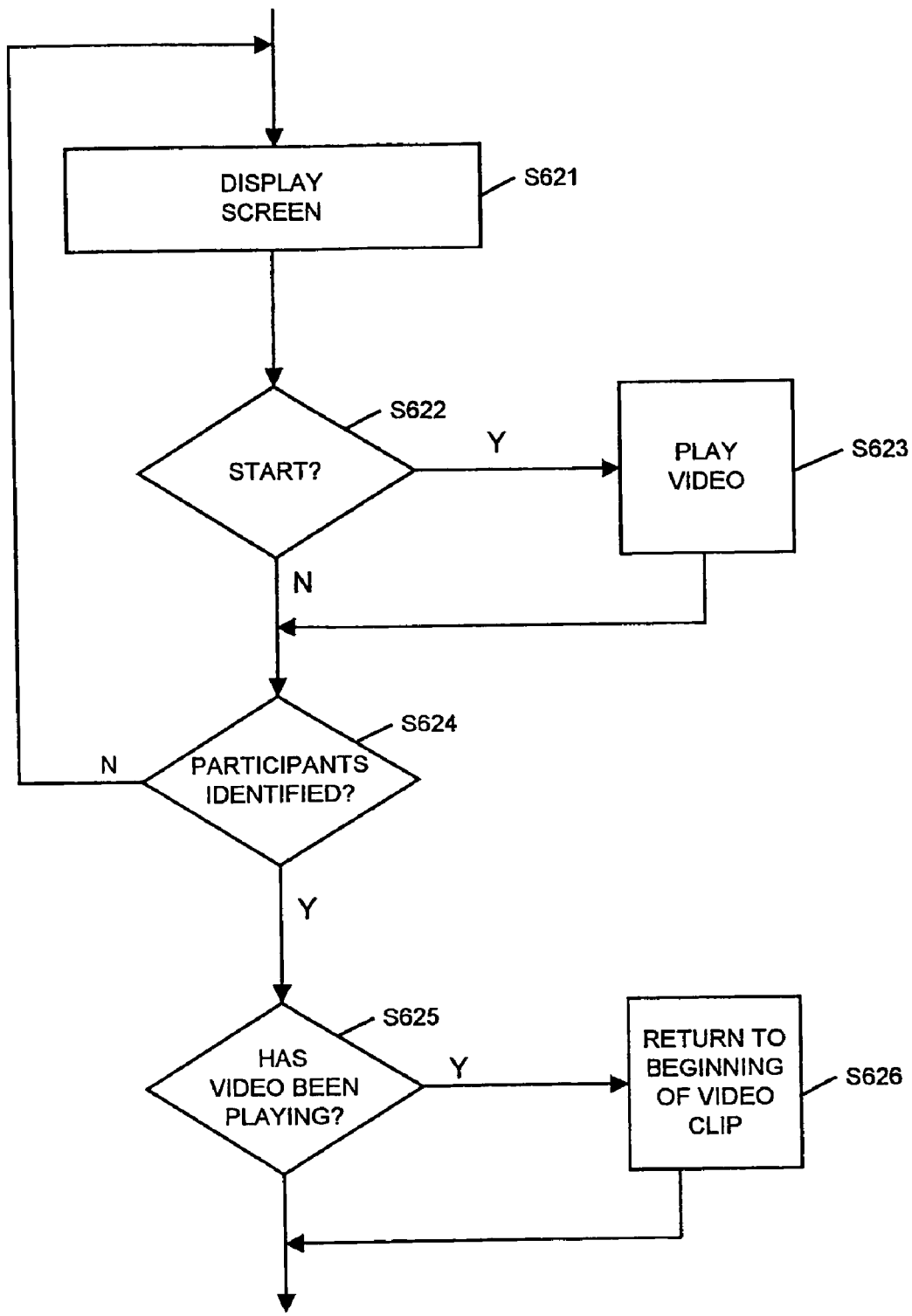
Figure 48:
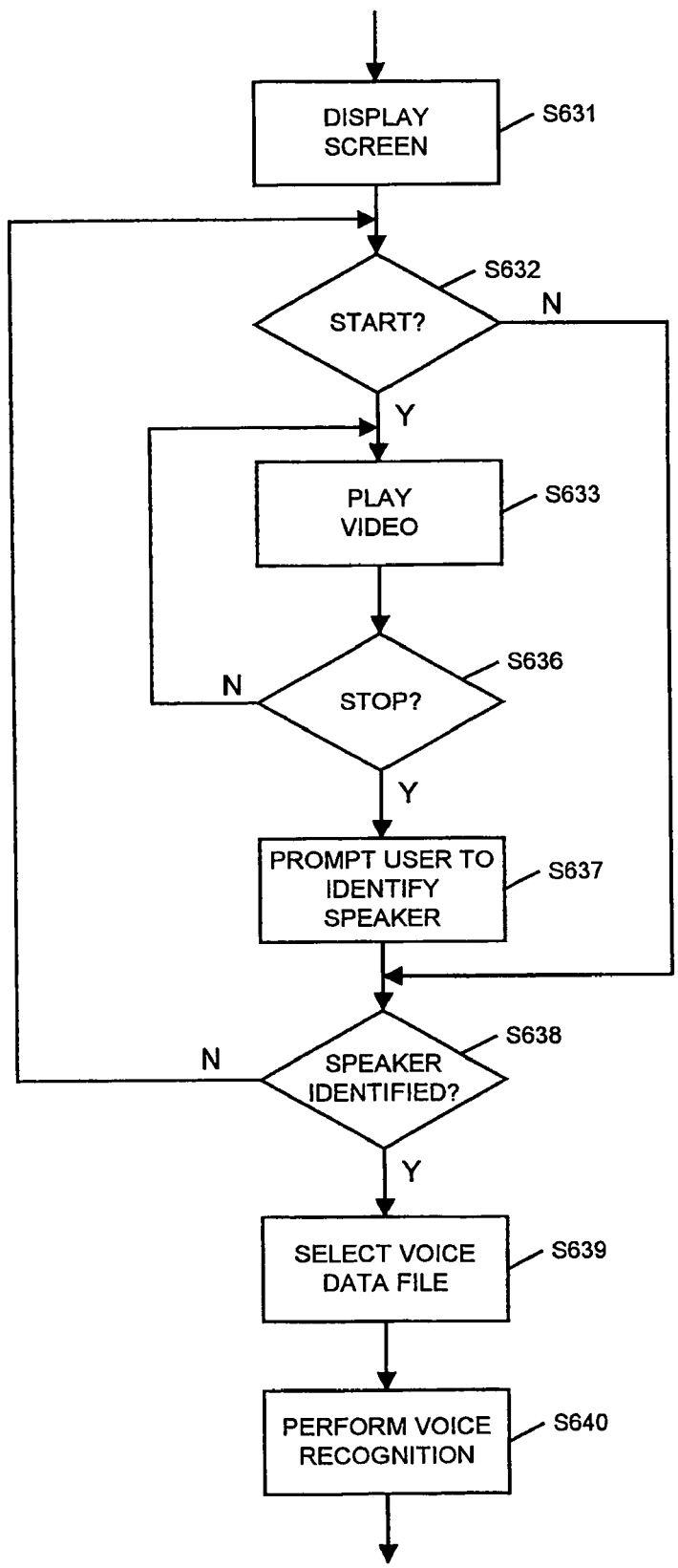
Figure 49:
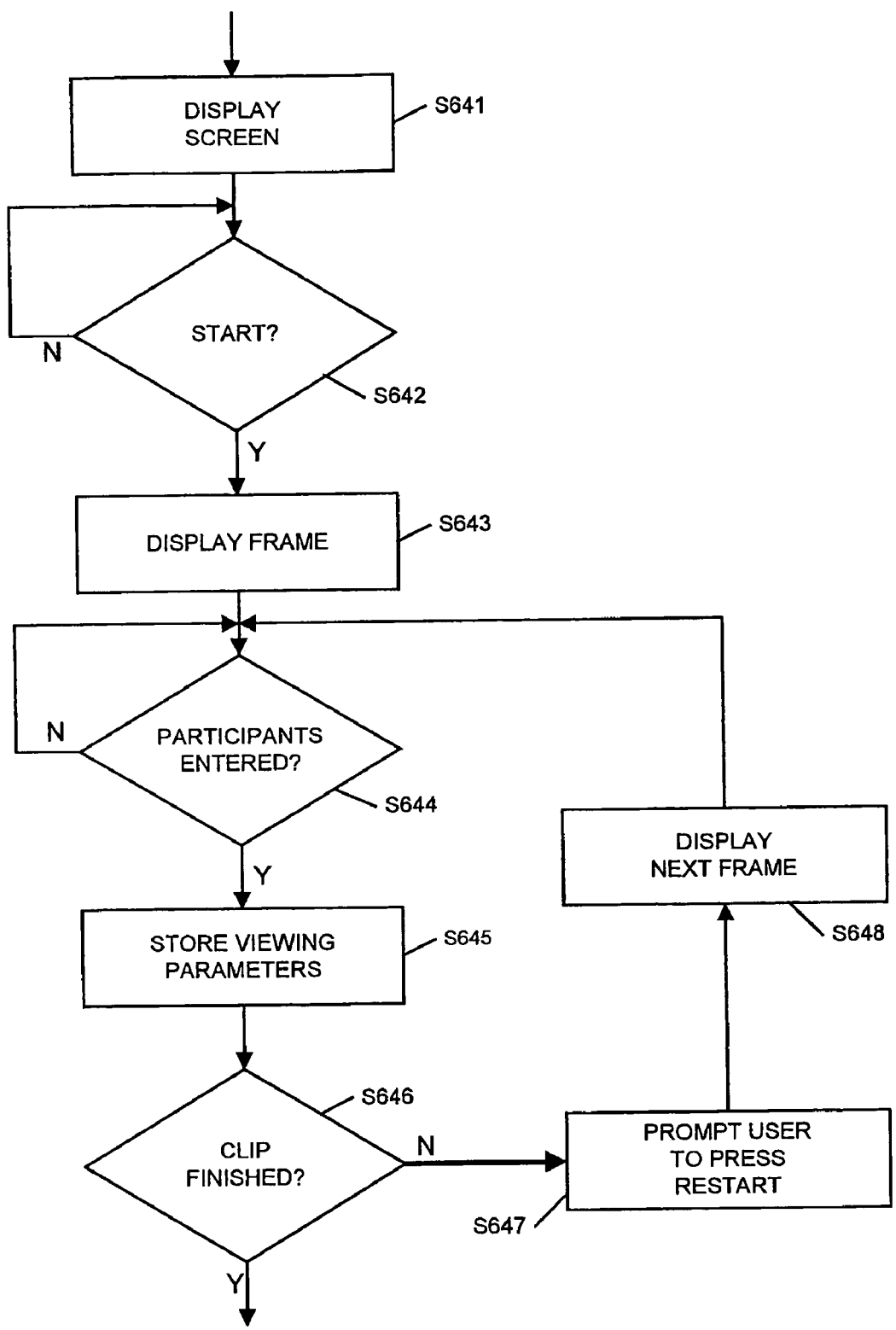
Figure 50:
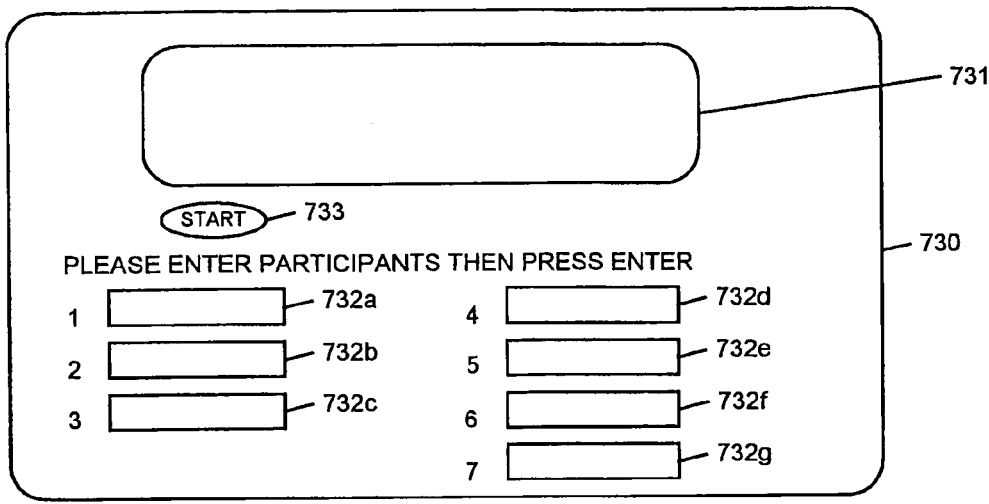
Figure 54:
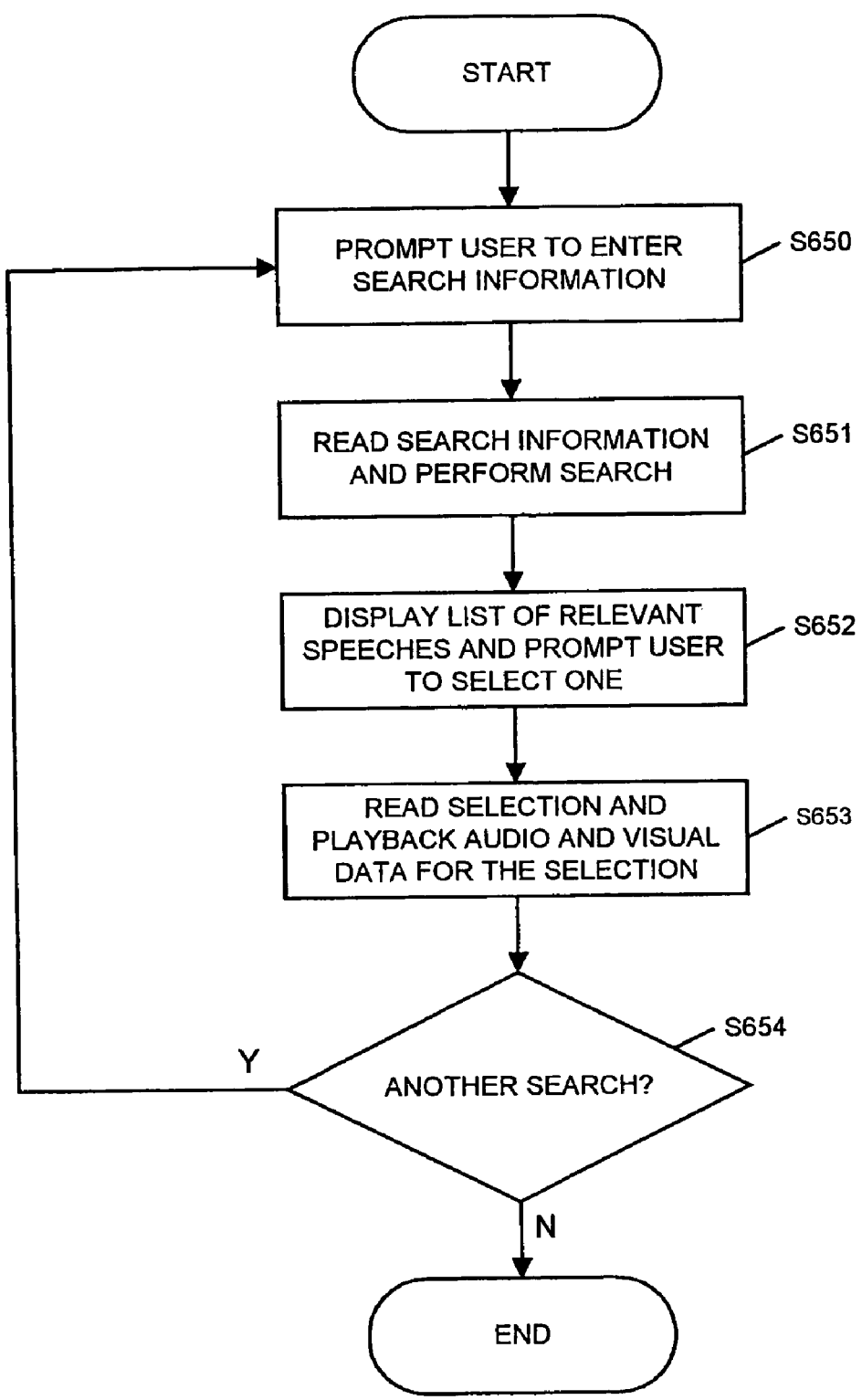
Figure 55:
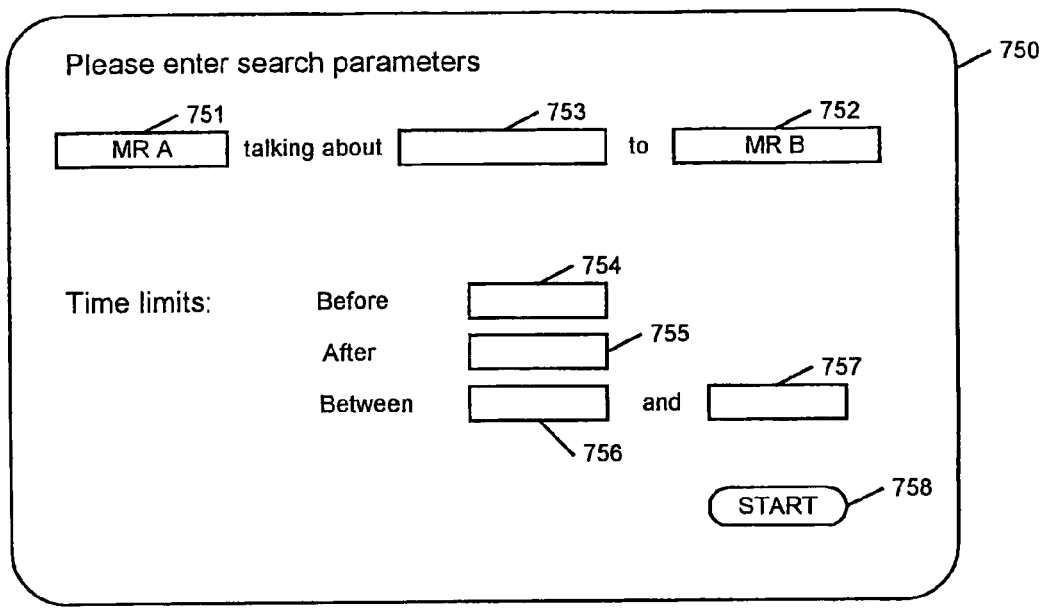
Figure 56:
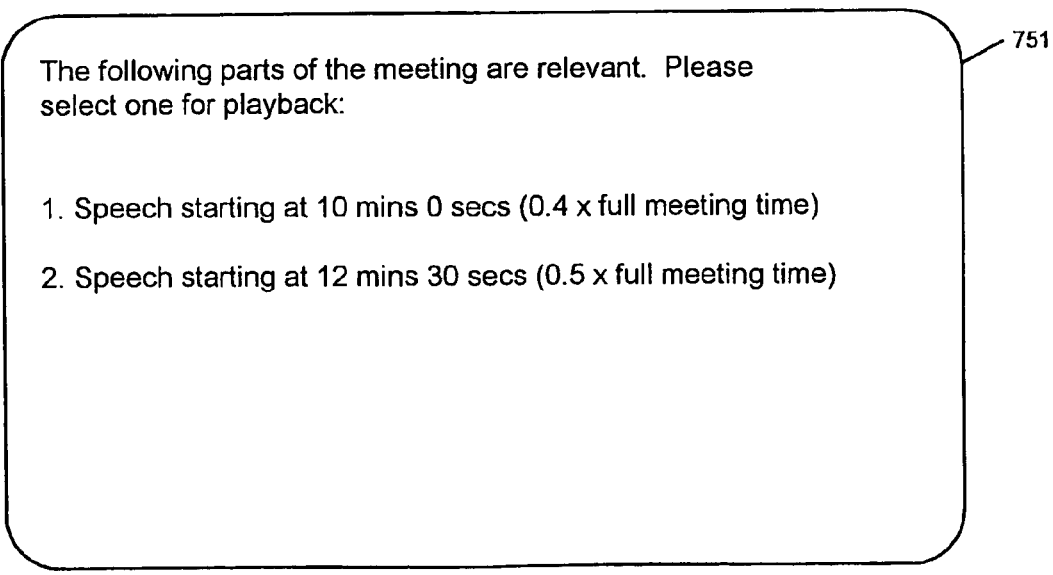
Figure 57:
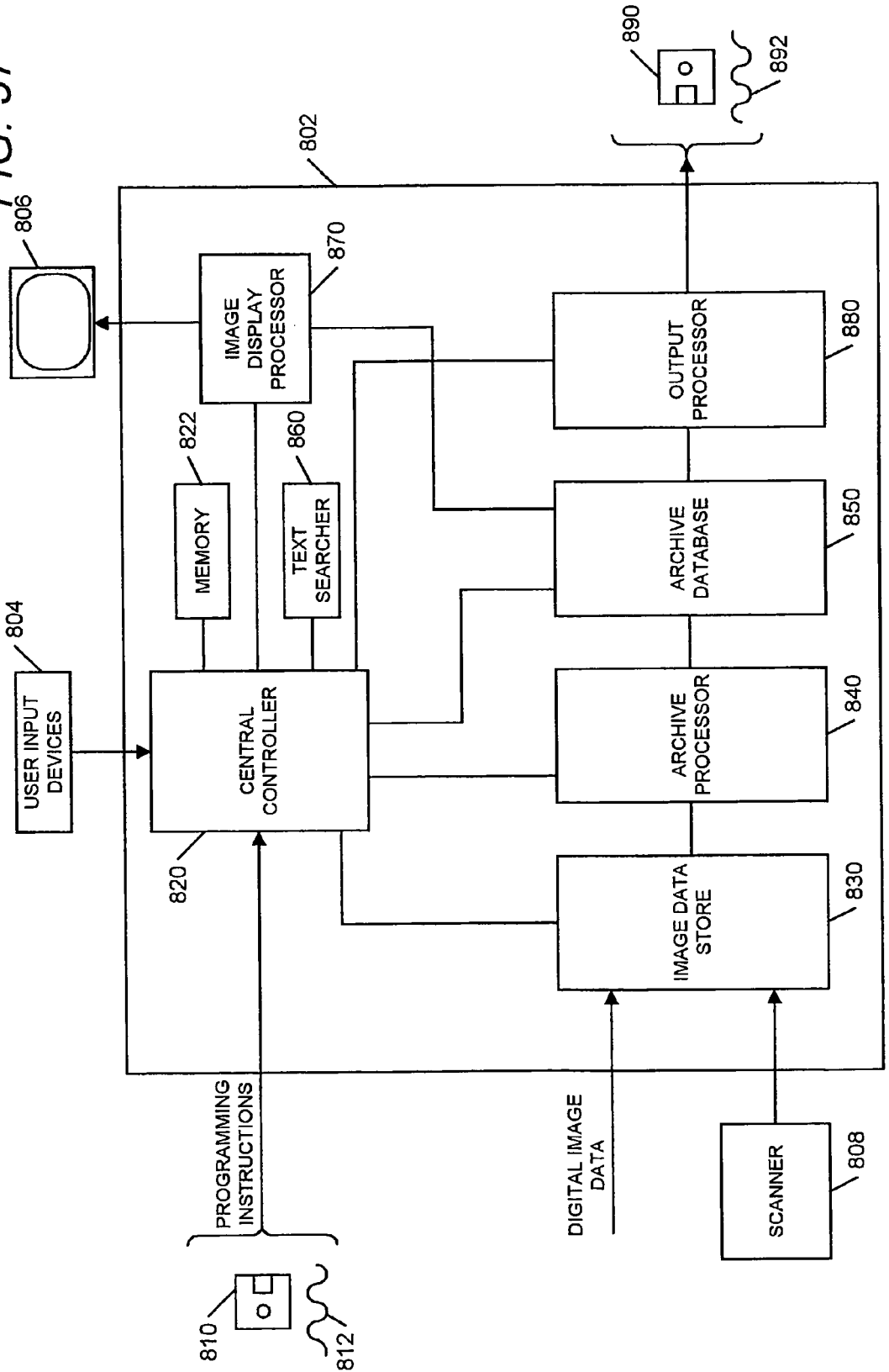
Figures 58, 59:
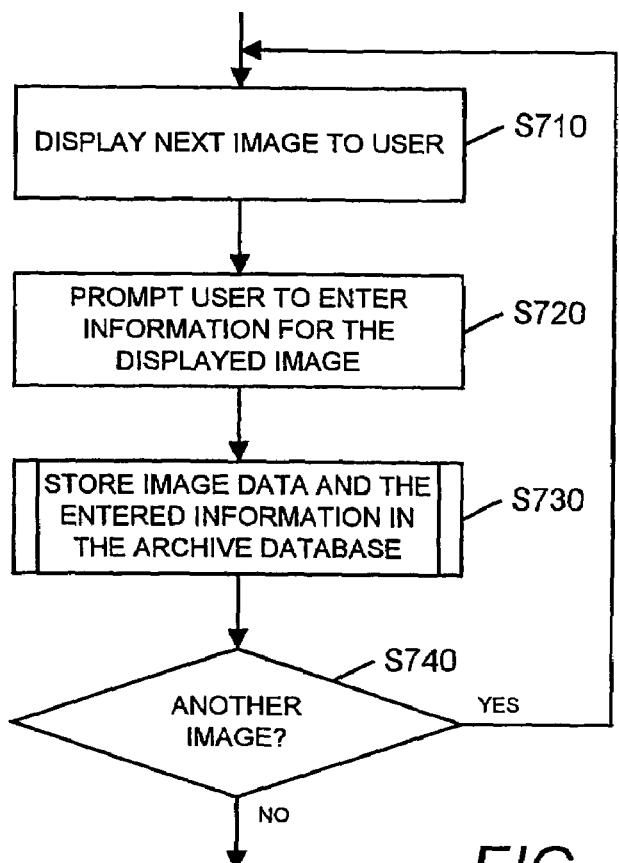
Figure 60:
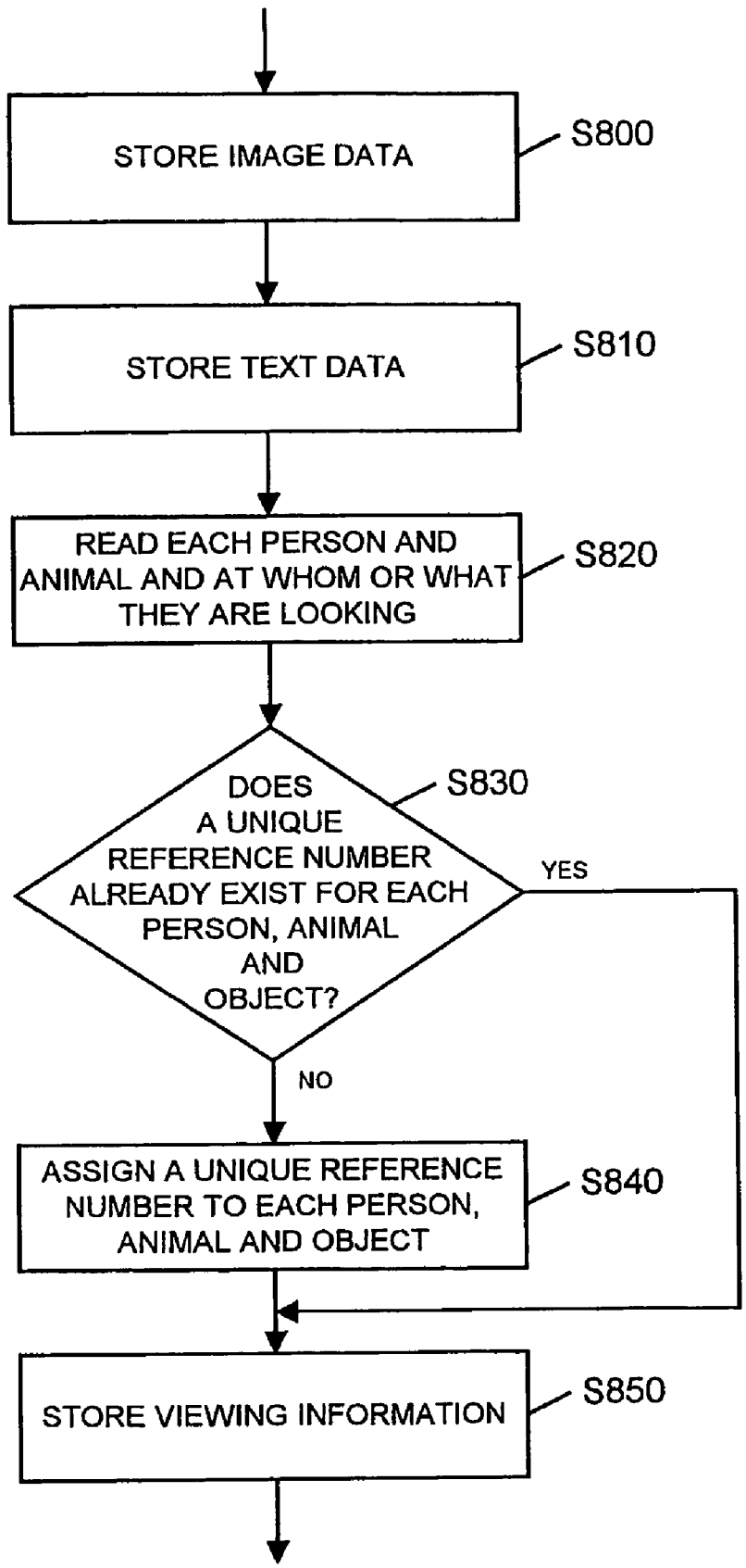
Figure 61:
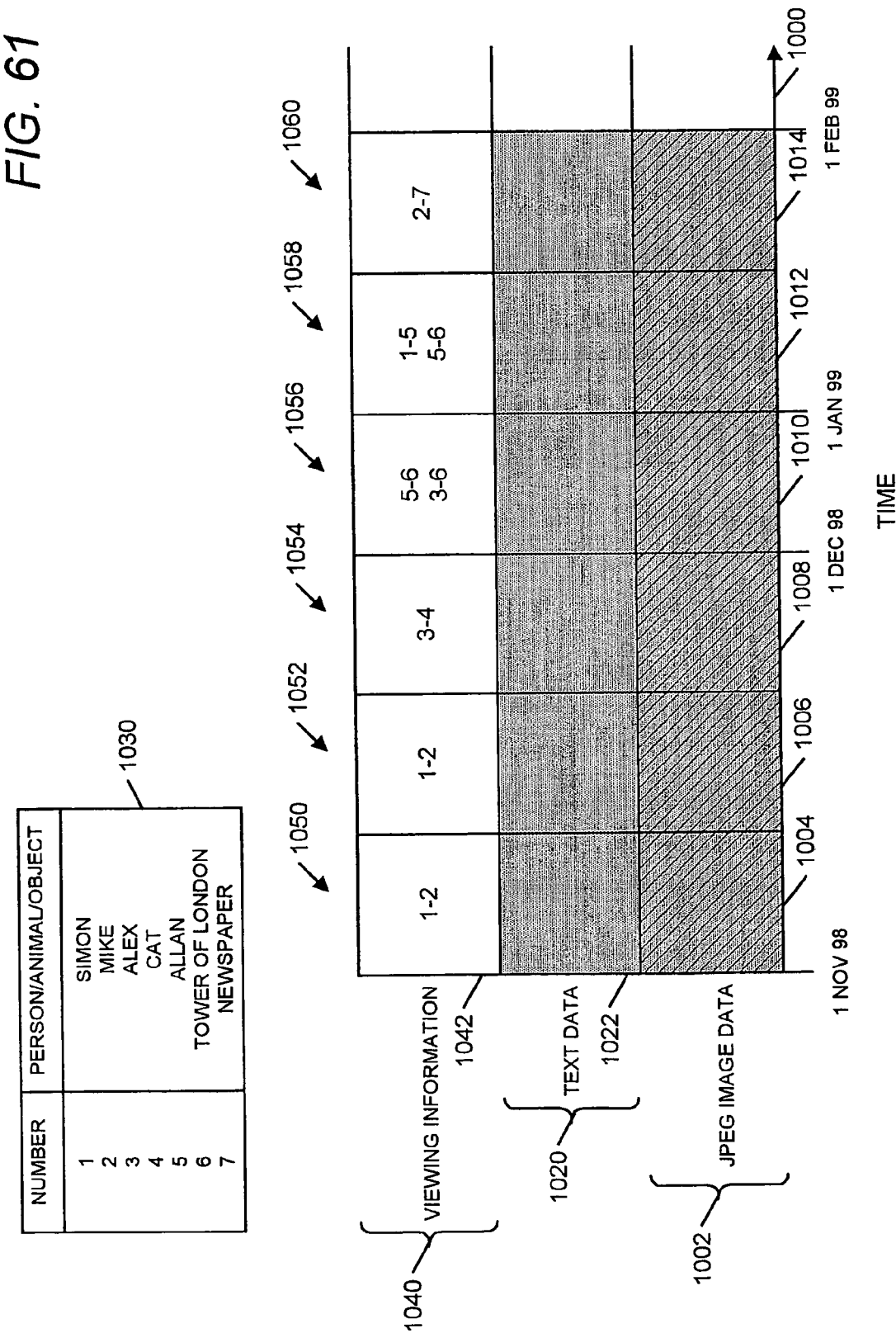
Figure 62:
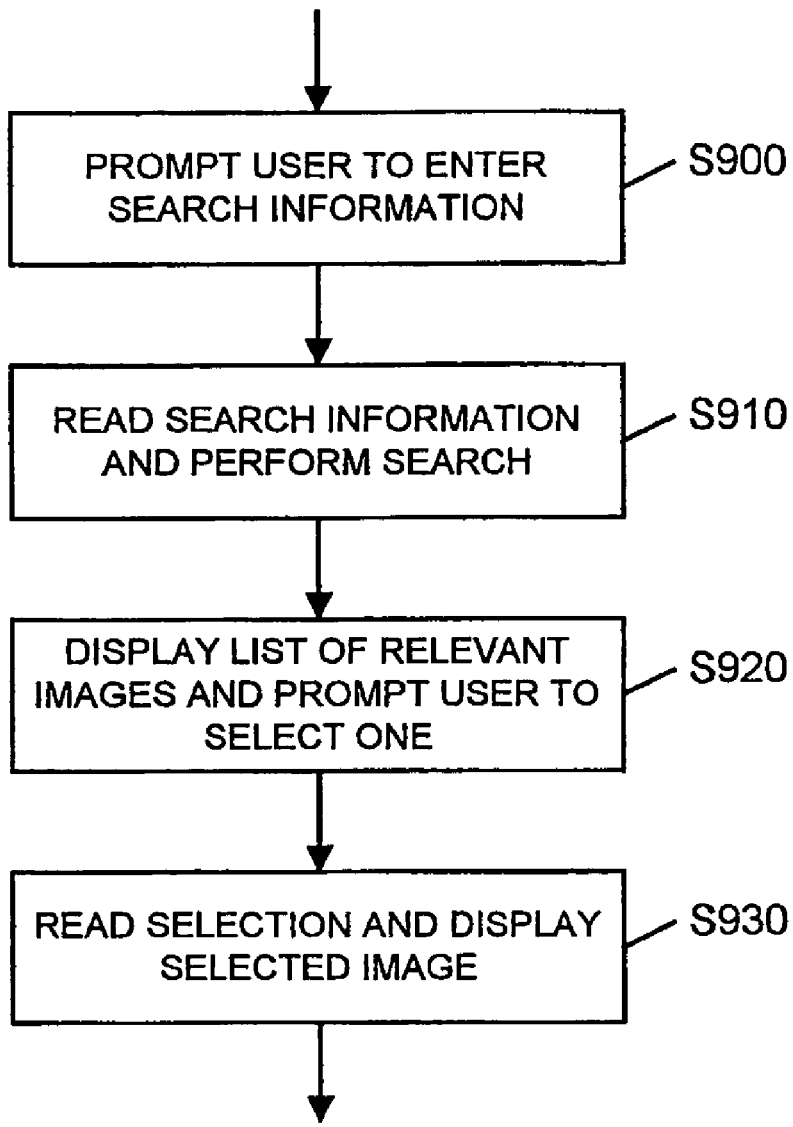
Figure 63A:
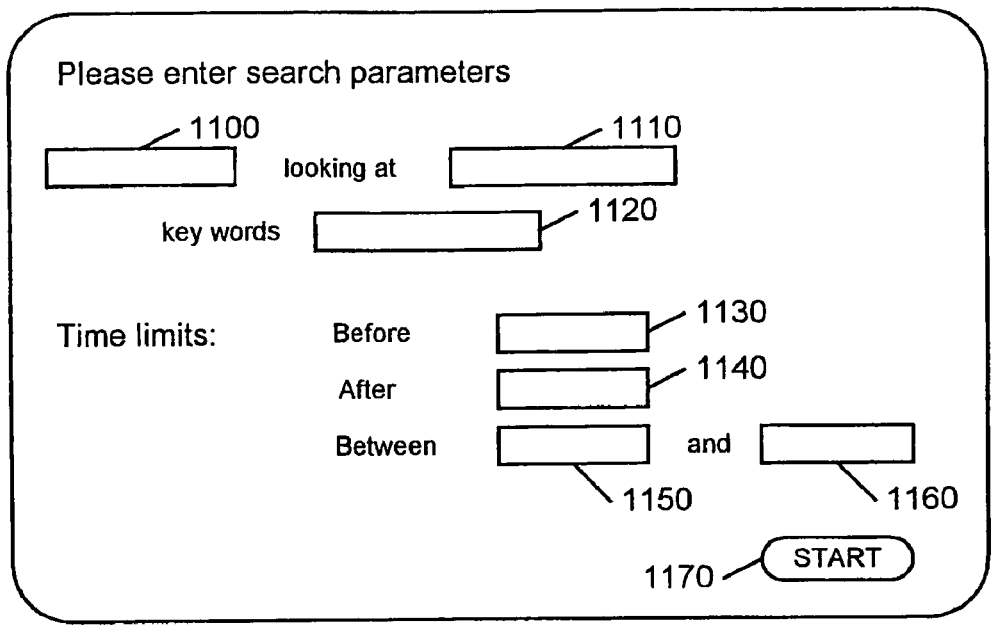
Figure 63B:
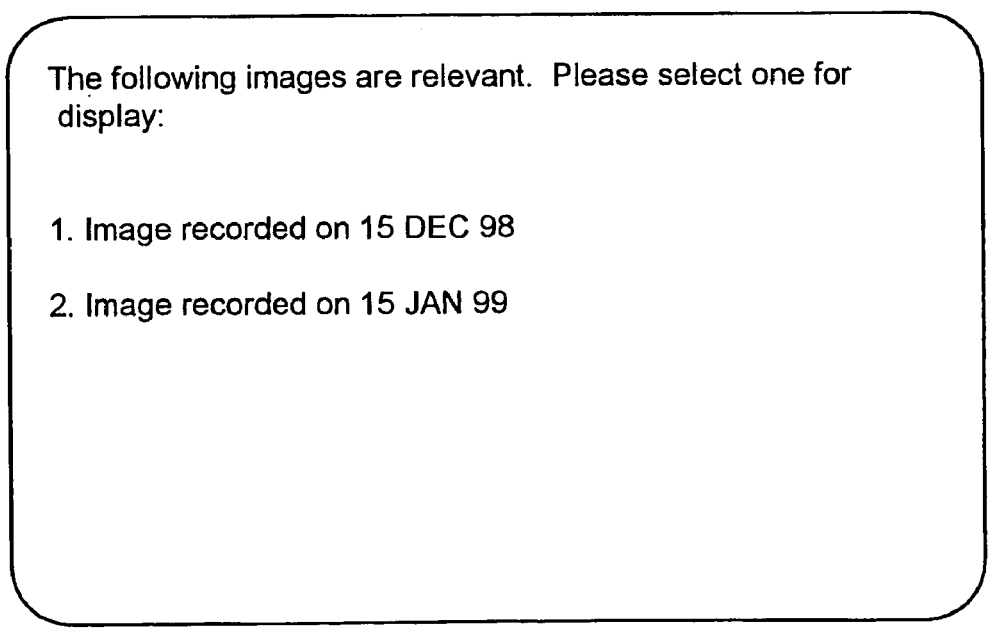
Figure 64:
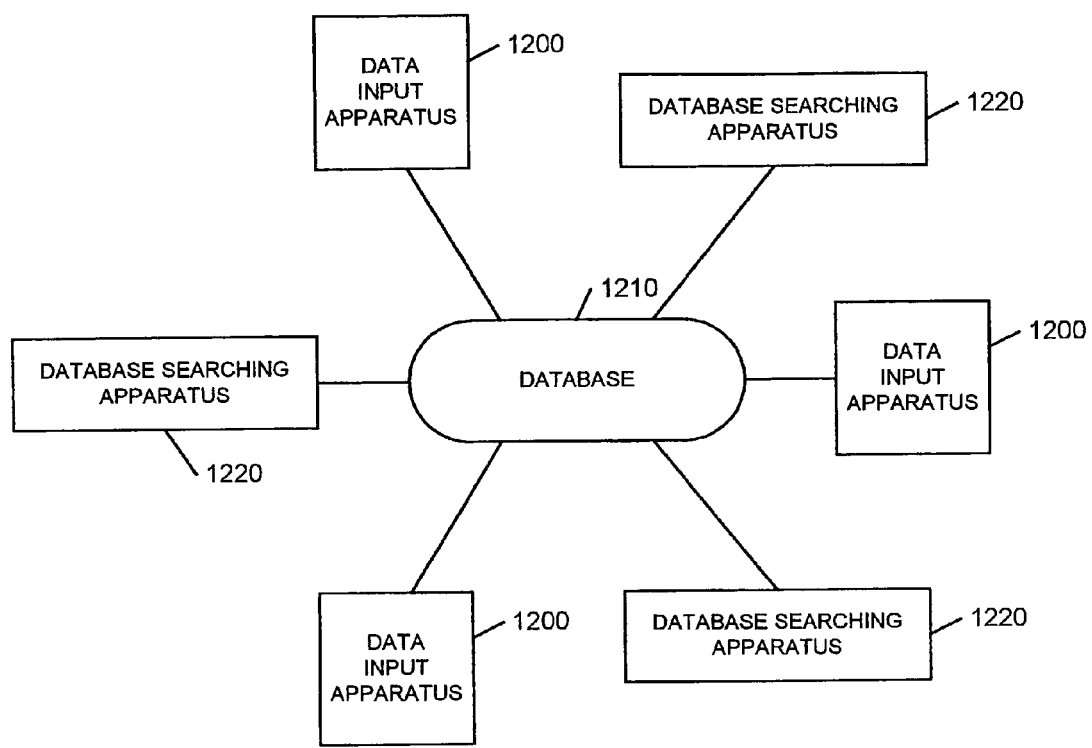
Figure 65:
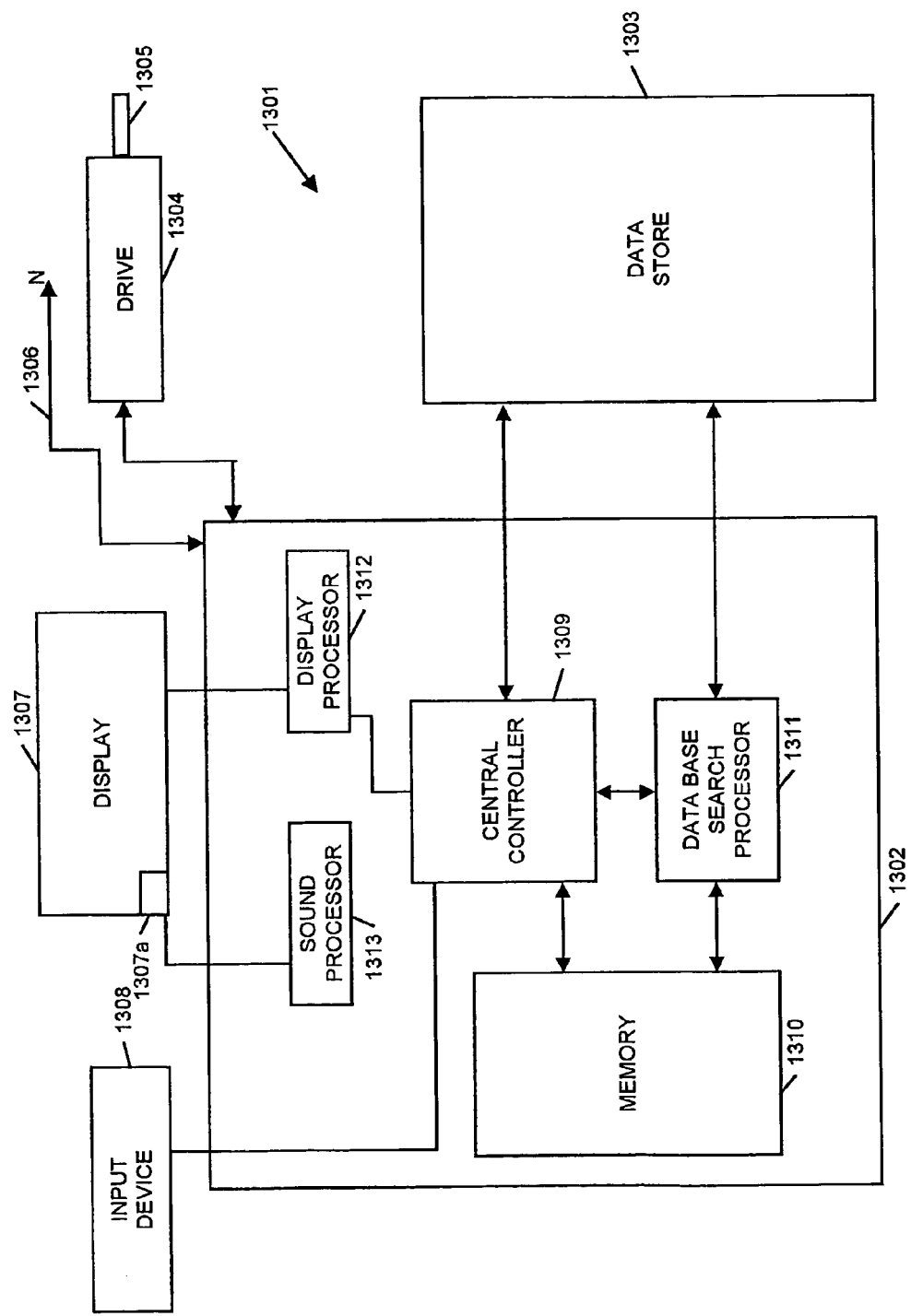
Figure 66A:
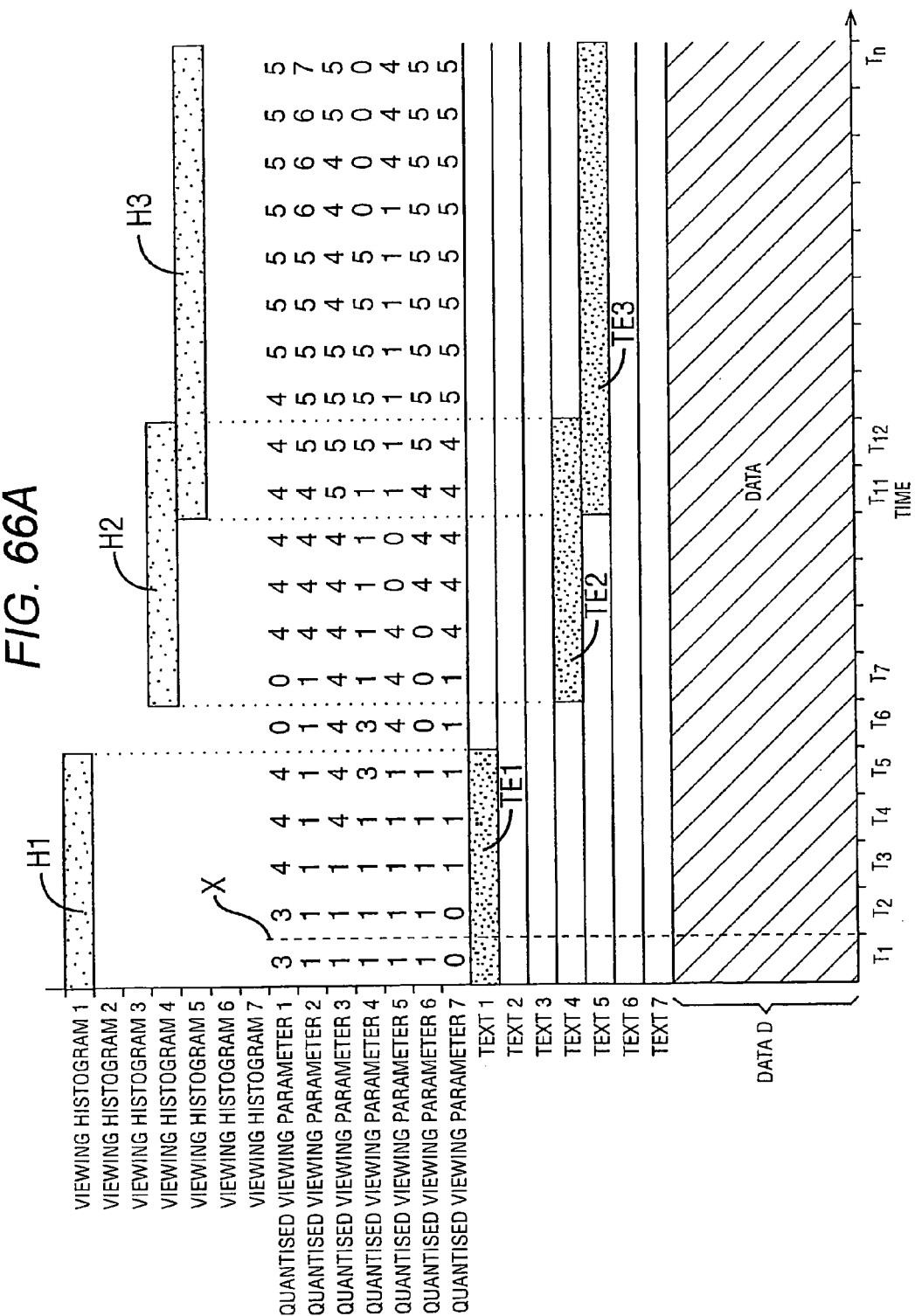
Figure 67:
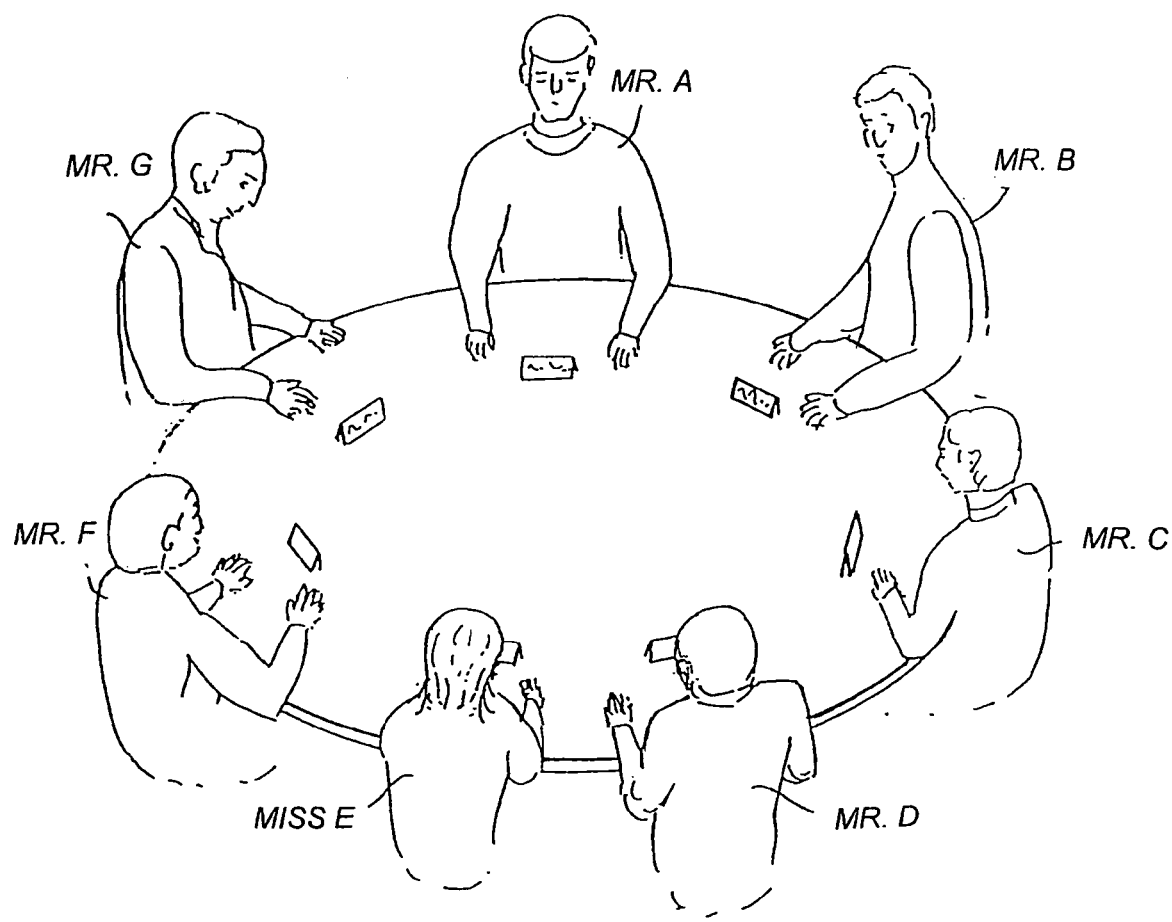
Figure 68A:
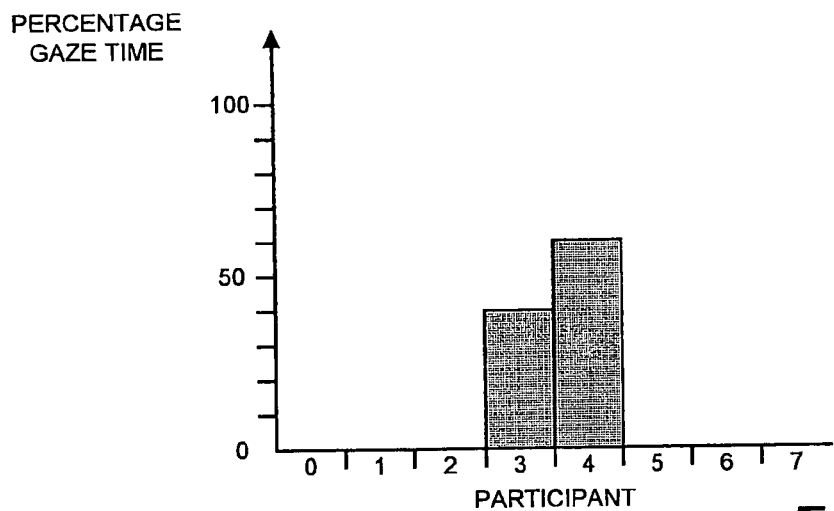
Figure 68B:
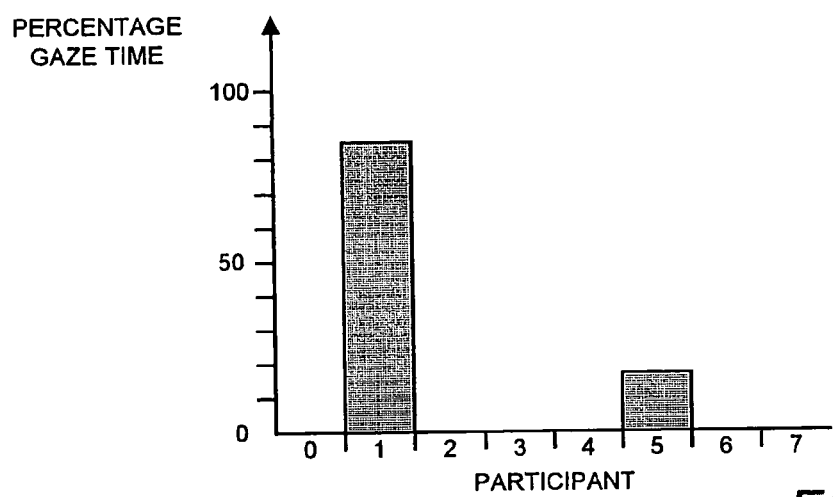
Figure 69:
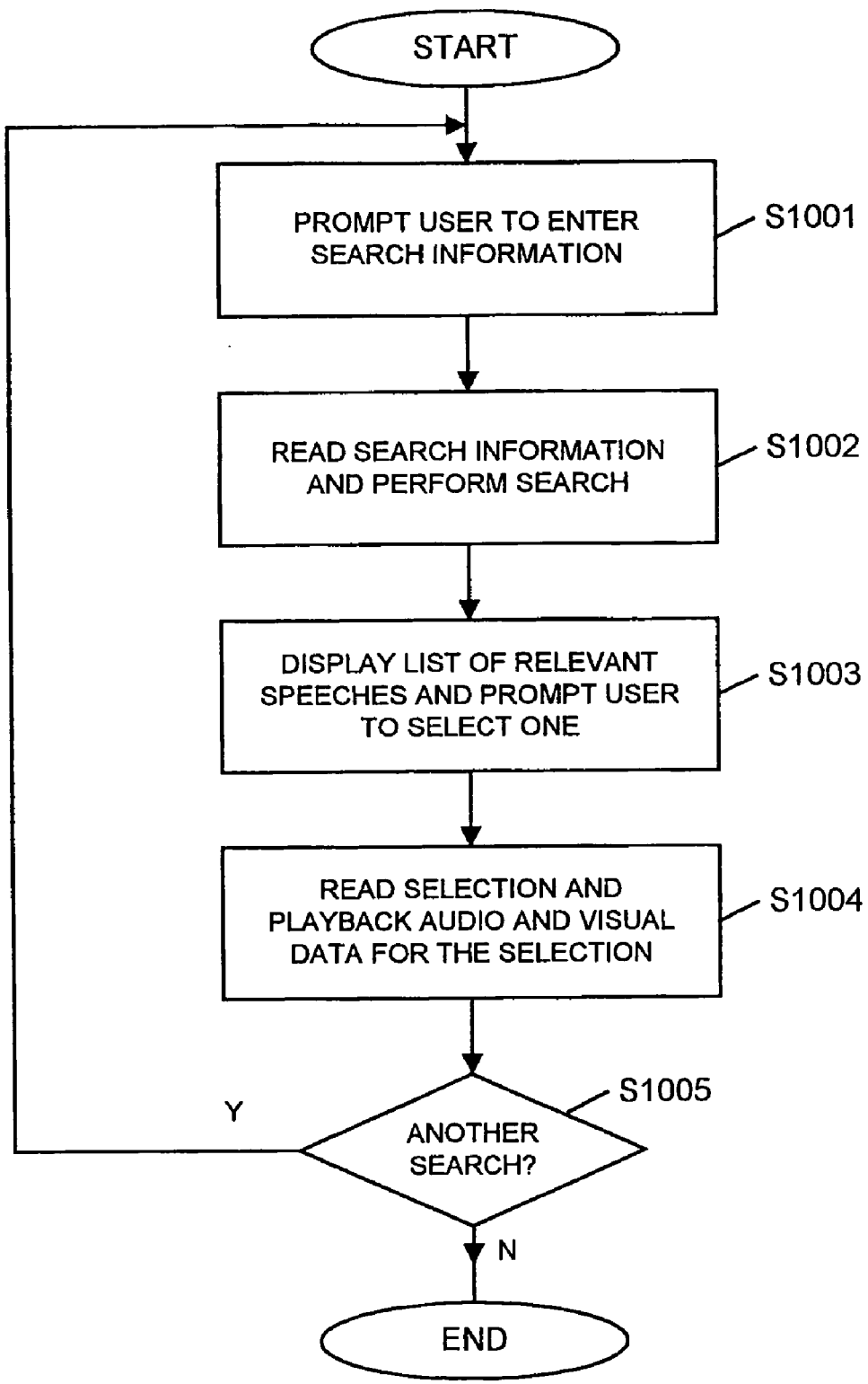
Figure 70A:
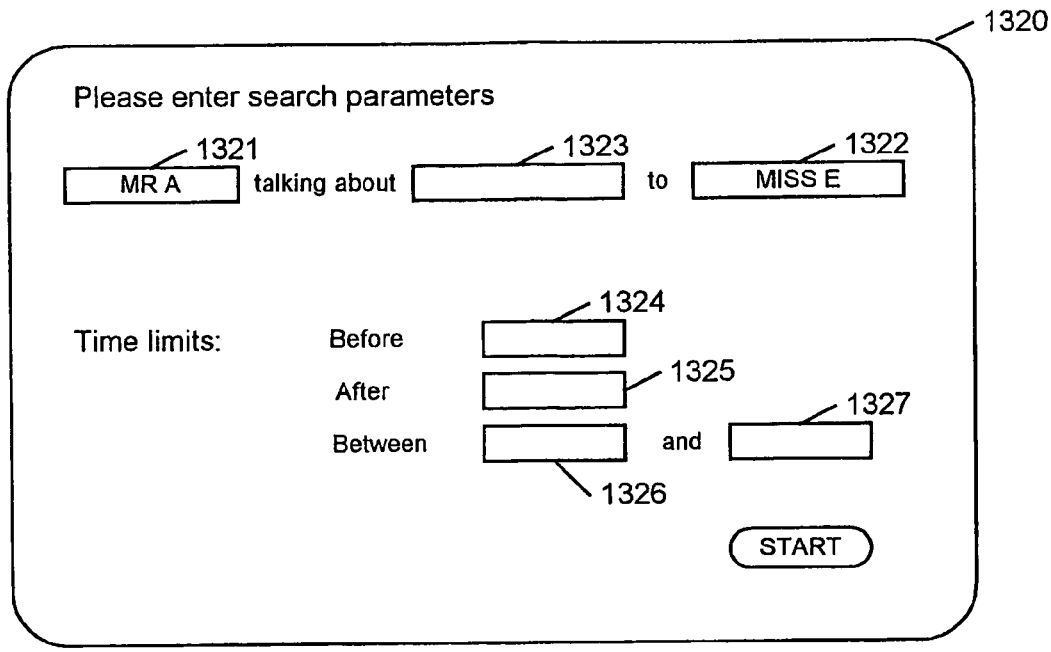
Figure 70B:
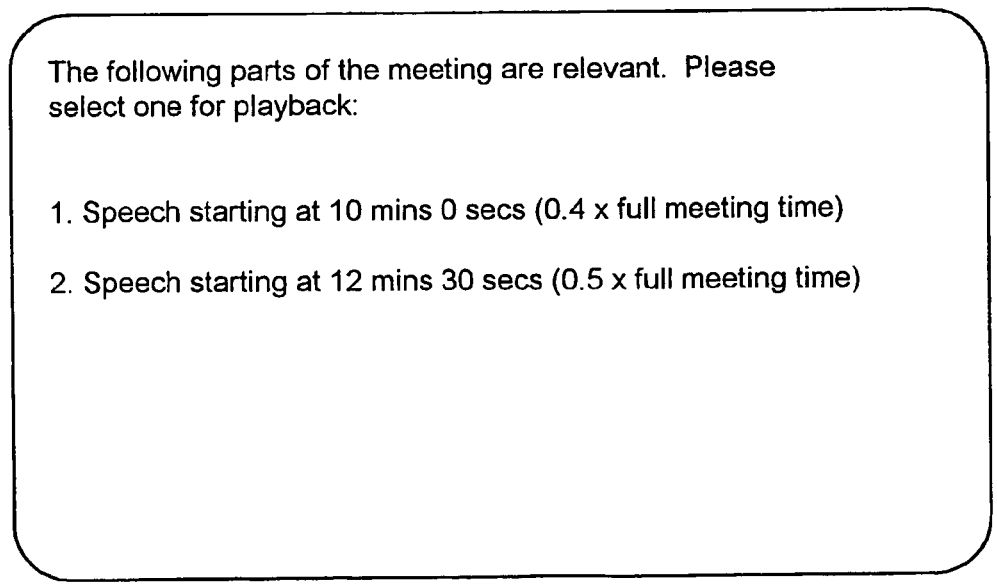

FIGS. 36A and 36B schematically illustrate the storage of information in the meeting archive database;

FIGS. 37A, 37B and 37C show examples of viewing histograms stored in the meeting archive database;

FIG. 38 shows the processing operations performed at step S10 in FIG. 4;

FIG. 39A shows the information displayed to a user at step S550 in FIG. 38;

FIG. 39B shows an example of information displayed to a user at step S554 in FIG. 38;

FIG. 40 schematically illustrates an alternative method for quantising the viewing parameter of a participant at step S504 in FIG. 33;

FIG. 41 is a block schematic diagram of apparatus in a second embodiment of the invention;

FIGS. 42a and 42b illustrate schematically an embodiment of a database generated using apparatus in a second embodiment of the present invention;

FIGS. 43a to 43c are graphs each illustrating the percentage time for which a speaker gazes at a number of other participants while speaking;

FIG. 44 illustrates diagrammatically a frame taken from an example of 2D moving image data to be stored in the database;

FIG. 45 shows a functional block diagram of voice recognition components of a 2D image processor;

FIGS. 46a and 46b show a top level flow chart illustrating an embodiment of a method for generating a 2D moving image database in accordance with the second embodiment of the invention;

FIGS. 47 to 49 show flow charts for subroutines shown in the top level flow chart shown in FIGS. 46a and 46b;

FIGS. 50 to 53 illustrate screens displayed to the user during an embodiment of a method of generating a 2D moving image database in accordance with the second embodiment of the present invention;

FIG. 54 shows a flow chart for illustrating a method of retrieving information from a 2D moving image database in the second embodiment;

FIGS. 55 and 56 show embodiments of screens displayed to a user during the carrying out of the search illustrated by FIG. 54;

FIG. 57 is a block diagram showing an example of notional functional components within a processing apparatus of a third embodiment of the invention;

FIG. 58 shows the processing operations performed to store information in the archive database;

FIG. 59 shows the information displayed to a user at step S720 in FIG. 58;

FIG. 60 shows the processing operations performed at step S730 in FIG. 58 to store the image data and information in the archive database;

FIG. 61 schematically illustrates the storage of image data and information in the meeting archive database;

FIG. 62 shows the processing operations performed to retrieve information from the archive database;

FIG. 63A shows the information displayed to a user at step S900 in FIG. 62;

FIG. 63B shows an example of information displayed to a user at step S920 in FIG. 62;

FIG. 64 shows a modification of the third embodiment of the invention in which the functions of the third embodiment are performed by separate, interconnected apparatus;

FIG. 65 shows an apparatus for generating a database in accordance with a fourth embodiment of the present invention;

FIGS. 66a and 66b represent diagrammatically database in accordance with the fourth embodiment of the present invention;

FIG. 67 shows an example of a frame of image data to be stored in the database;

FIGS. 68a to 68b show examples of viewing histograms of the database shown in FIGS. 66a and 66b;

FIG. 69 shows a flow chart for illustrating searching of a database to retrieve particular information; and FIGS. 70a and 70b show screens displayed to a user to enable searching of the database shown in FIGS. 66a and 66b.

FIRST EMBODIMENT

Although a first embodiment will now be described relating to a virtual meeting, the invention is not limited to this application, and instead can be applied to any application in which three-dimensional object data is to be archived.

Referring to FIG. 1, in this embodiment, a plurality of user stations 2, 4, 6, 8, 10, 12, 14 are connected via a communication path 20, such as the Internet, wide area network (WAN), etc.

As will be described below, each user station 2, 4, 6, 8, 10, 12, 14 comprises apparatus to facilitate a desktop video conference between the users at the user stations.

Figure 2A:
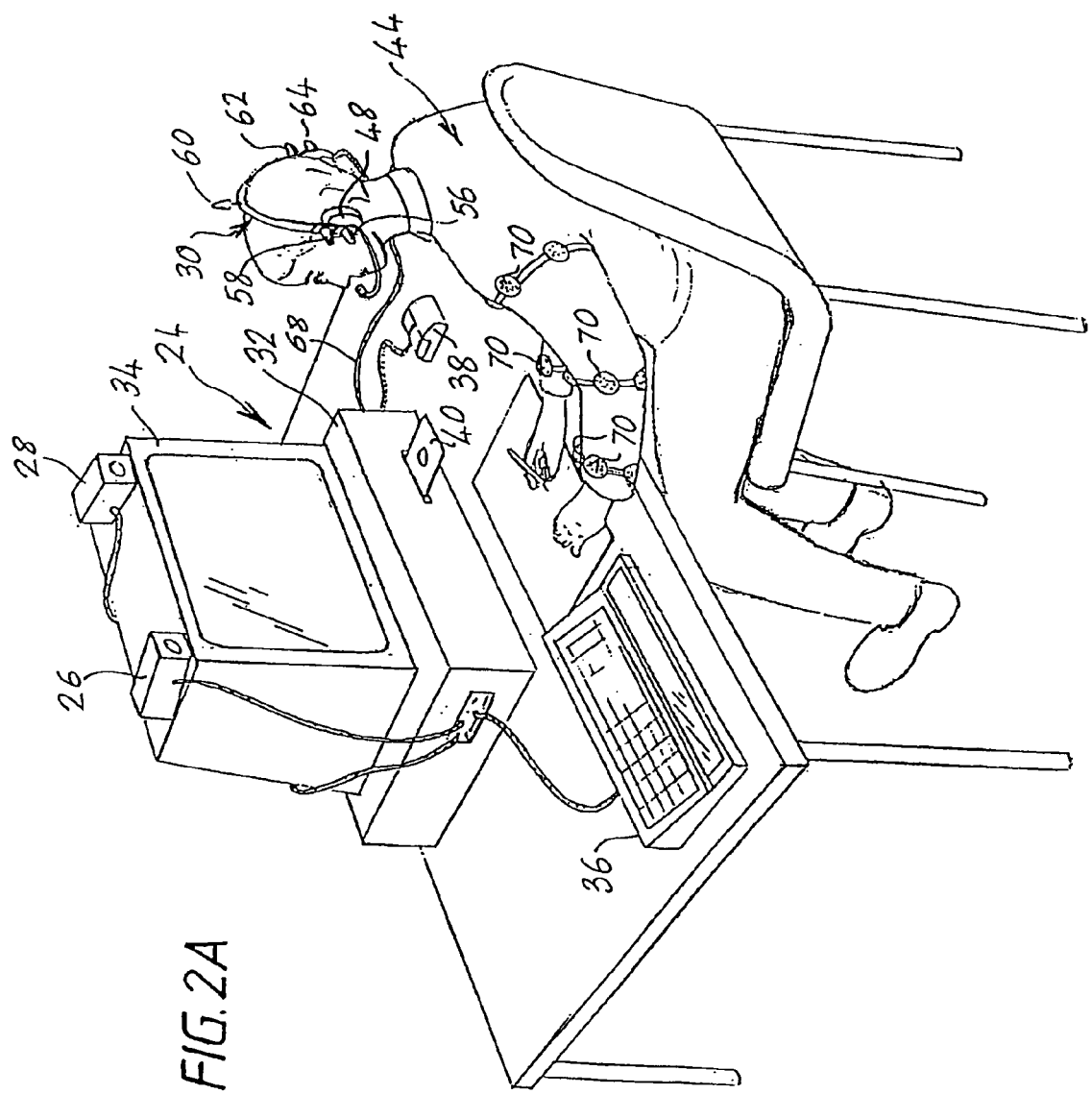
FIG. 2A shows a user station and a user.
Figure 2B:
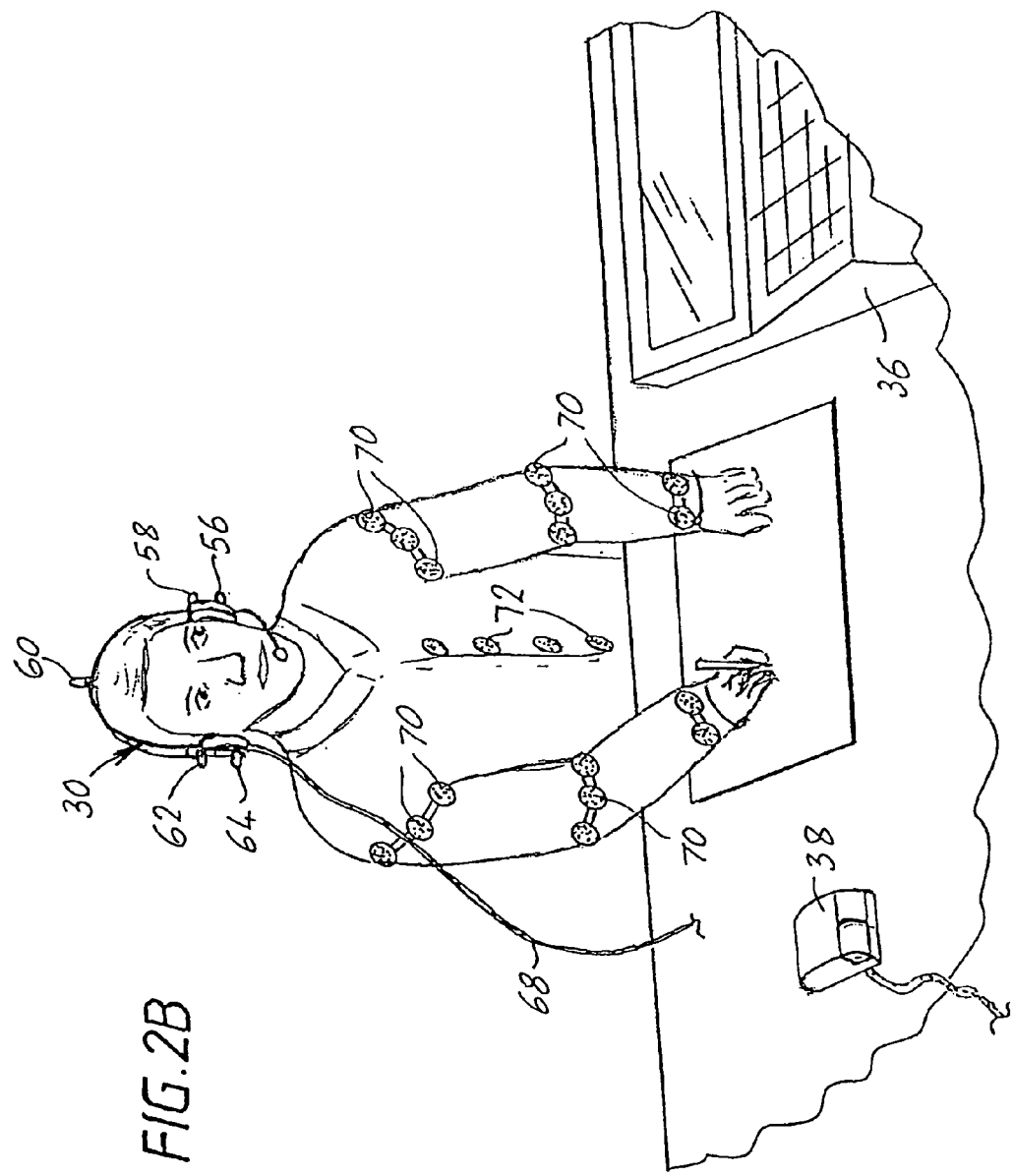
FIG. 2B shows the headset and body markers worn by the user.
Figure 2C:
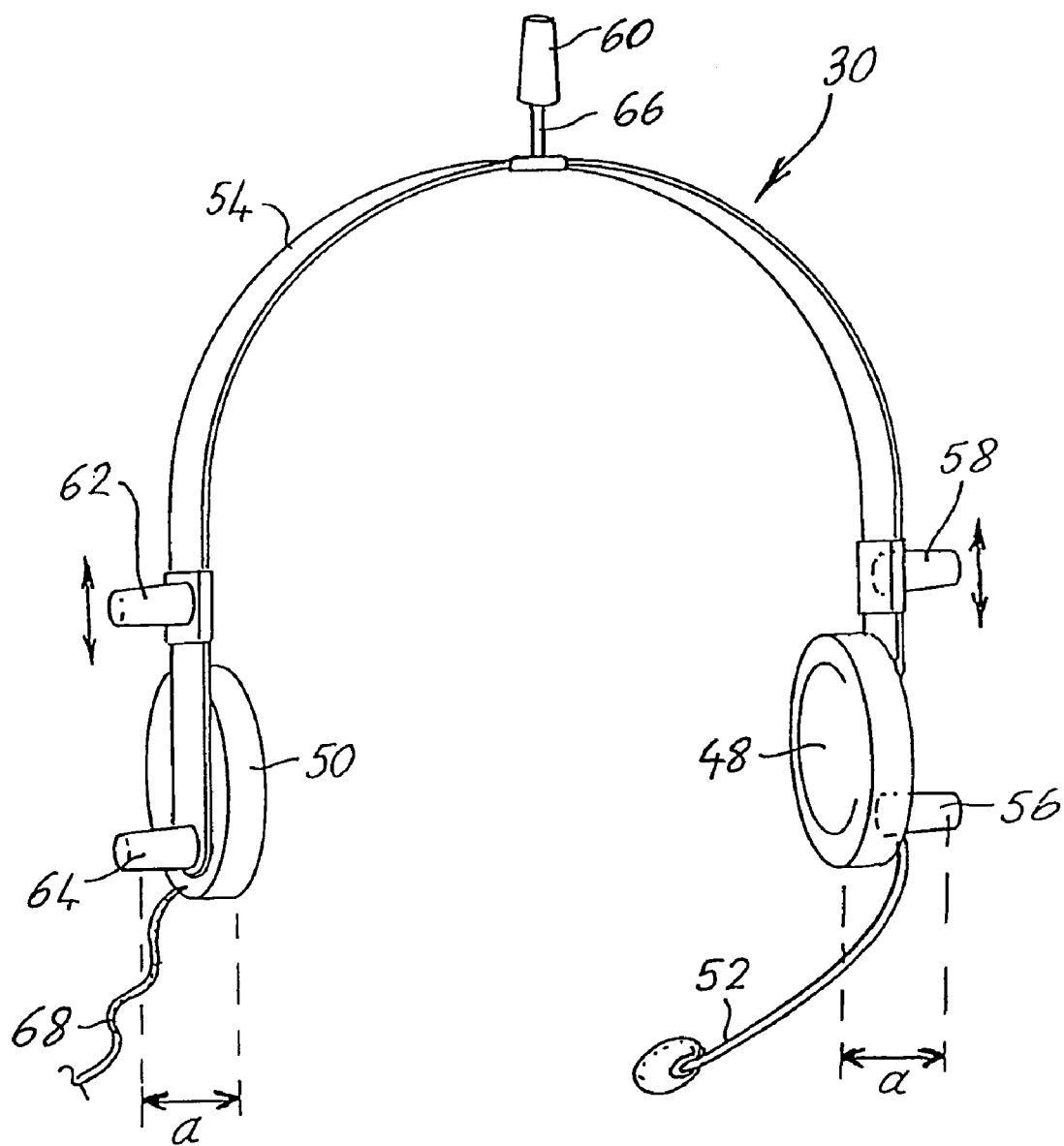
FIG. 2C shows the components of the headset worn by the user.

FIGS. 2A, 2B and 2C show the components of each user station 2, 4, 6, 8, 10, 12, 14 in this embodiment.

Referring to FIG. 2A, a user station comprises a conventional personal computer (PC) 24, two video cameras 26, 28 and a pair of stereo headphones 30.

PC 24 comprises a unit 32 containing, in a conventional manner, one or more processors, memory, and sound card etc, together with a display device 34, and user input devices, which, in this embodiment, comprise a keyboard 36 and mouse 38.

PC 24 is programmed to operate in accordance with programming instructions input for example as data stored on a data storage medium, such as disk 40, and/or as a signal input to PC 24 over a datalink (not shown) such as the Internet, and/or entered by a user via keyboard 36.

PC 24 is connected to the Internet 20 via a connection (not shown) enabling it to transmit data to, and receive data from, the other user stations.

Video cameras 26 and 28 are of conventional design, and are provided to record video images of user 44 using a charge coupled device (CCD). As will be described below, image data recorded by cameras 26 and 28 is processed by PC 24 to generate data defining the movements of user 44, and this data is then transmitted to the other user stations. Each user station stores a three-dimensional computer model of the video conference containing an avatar for each participant, and each avatar is animated in response to the data received from the user station of the corresponding participant.

In the example shown in FIG. 2A, cameras 26 and 28 are positioned on top of monitor 34, but can, however, be positioned elsewhere to view user 44.

Referring to FIGS. 2A and 2B, a plurality of coloured markers 70, 72 are provided to be attached to the clothing of user 44. The markers each have a different colour, and, as will be explained later, are used to determine the position of the user's torso and arms during the video conference. The markers 70 are provided on elasticated bands to be worn around the user's wrists, elbows and shoulders. A plurality of markers 70 are provided on each elasticated band so that at least one marker will be visible for each position and orientation of the user's arms. The markers 72 are provided with a suitable adhesive so that they can be removably attached to the torso of user 44, for example along a central line, as shown in FIG. 2B, such as at the positions of buttons on the user's clothes.

Referring to FIG. 2C, headset 30 comprises earphones 48, 50 and a microphone 52 provided on a headband 54 in a conventional manner. In addition, light emitting diodes (LEDs) 56, 58, 60, 62 and 64 are also provided on headband 54. Each of the LEDs 56, 58, 60, 62 and 64 has a different colour, and, in use, is continuously illuminated. As will be explained later, the LEDs are used to determine the position of the user's head during the video conference.

LED 56 is mounted so that it is central with respect to earphone 48 and LED 64 is mounted so that it is central with respect to earphone 50. The distance "a" between LED 56 and the inner surface of earphone 48 and between LED 64 and the inner surface of earphone 50 is pre-stored in PC 24 for use in processing to be performed during the video conference, as will be described below. LEDs 58 and 62 are slidably mounted on headband 54 so that their positions can be individually changed by user 44. LED 60 is mounted on a member 66 so that it protrudes above the top of headband 54. In this way, when mounted on the head of user 44, LED 60 is held clear of the user's hair. Each of the LEDs 56, 58, 60, 62 and 64 is mounted centrally with respect to the width of headband 54, so that the LEDs lie in a plane defined by the headband 54.

Signals from microphone 52 and signals to headphones 48, 50 are carried to and from PC 24 via wires in cable 68. Power to LEDs 56, 58, 60, 62 and 64 is also carried by wires in cable 68.

FIG. 3 schematically shows the functional units into which the components of PC 24 effectively become configured when programmed by programming instructions.

The units and interconnections shown in FIG. 3 are notional and are shown for illustration purposes only to assist understanding; they do not necessarily represent the exact units and connections into which the processor, memory, etc of PC 24 become configured.

Referring to FIG. 3, central controller 100 processes inputs from user input devices such as keyboard 36 and mouse 38, and also provides control and processing for a number of the other functional units. Memory 102 is provided for use by central controller 100.

Image data processor 104 receives frames of image data recorded by video cameras 26 and 28. The operation of cameras 26 and 28 is synchronised so that images taken by the cameras at the same time can be processed by image data processor 104. Image data processor 104 processes synchronous frames of image data (one from camera 26 and one from camera 28) to generate data defining (i) image pixel data for the user's face, (ii) the 3D coordinates of each of the markers 70 and 72 on the user's arms and torso, and (iii) a view parameter which, as will be explained further below, defines the direction in which the user is looking. Memory 106 is provided for use by image data processor 104.

The data output by image data processor 104 and the sound from microphone 52 is encoded by MPEG 4 encoder 108. In addition, the sound from microphone 52 is processed by voice recognition processor 107 which operates in accordance with a conventional voice recognition programme, such as "Dragon Dictate" or IBM "ViaVoice", which has previously been trained in a conventional manner to recognise the user's voice. Voice recognition processor 107 generates a stream of text corresponding to the words spoken by the user. The text stream from voice recognition processor 107 is also encoded by MPEG 4 encoder 108. The encoded MPEG 4 bitstream from MPEG 4 encoder 108 is output to the other user stations via input/output interface 110.

Corresponding MPEG 4 bitstreams are received from each of the other user stations and input via input/output interface 110. Each of the bitstreams (bitstream 1, bitstream 2 . . . bitstream "n") is decoded by MPEG 4 decoder 112 together with the user's own MPEG 4 bitstream produced by MPEG 4 encoder 108, which is passed to MPEG 4 decoder 112 via the input/output interface 110.

Three-dimensional avatars (computer models) of each of the other participants in the video conference and a three-dimensional computer model of the conference room are stored in avatar and 3D conference model store 114.

In response to the information in the MPEG 4 bitstreams from the other participants, model processor 116 animates the avatars so that the movements of each avatar mimic the movements of the corresponding participant in the video conference.

Image renderer 118 renders an image of the 3D model of the conference room and the avatars, and the resulting pixel data is written to frame buffer 120 and displayed on monitor 34 at a video rate. In this way, images of the avatars and 3D conference model are displayed to the user, and the images show the movement of each avatar corresponding to the movements of the participants in real-life.

Sound data from the MPEG 4 bitstreams received from the other participants is processed by sound generator 122 together with information from image data processor 104 defining the current position and orientation of the head of user 44, to generate signals which are output to earphones 48 and 50 in order to generate sound to user 44. In addition, signals from microphone 52 are processed by sound generator 22 so that sound from the user's own microphone 52 is heard by the user via his headphones 48 and 50.

Archive processor 124, meeting archive database 126 and text searcher 128 are provided to maintain an archive database of the video conference and to facilitate searching of the database to find and replay the required part of the video conference, as will be described in further detail below.

FIG. 4 shows, at a top level, the processing operations carried out to conduct a video conference between the participants at user stations 2, 4, 6, 8, 10, 12 and 14.

Referring to FIG. 4, at step S2, suitable connections between each of the user stations 2, 4, 6, 8, 10, 12, 14 are established in a conventional manner.

At step S4, processing operations are performed to set up the video conference. These operations are performed by one of the user stations, previously designated as the conference coordinator.

Figure 5:
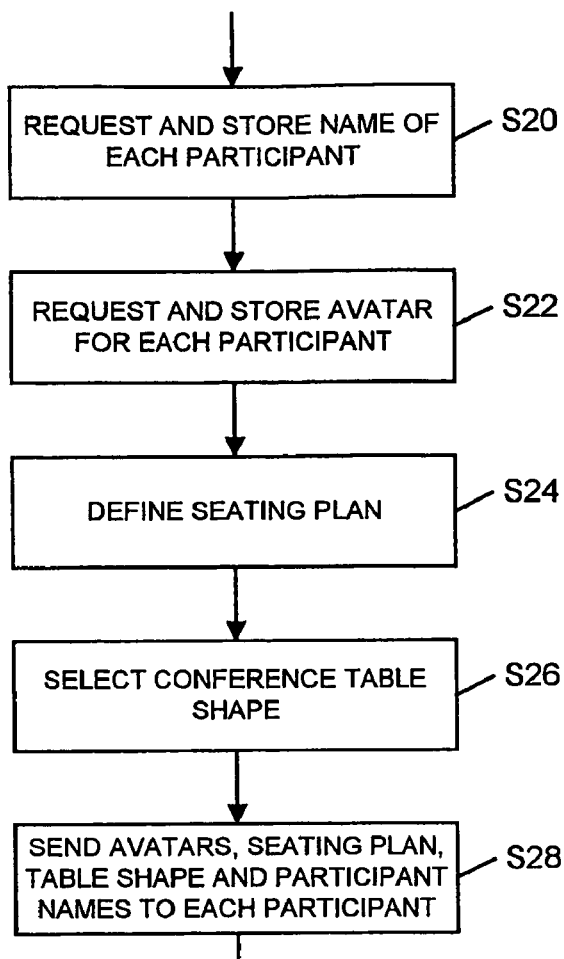
FIG. 5 shows the processing operations performed at step S4 in FIG. 4.

FIG. 5 shows the processing operations performed at step S4 to set up the conference.

Referring to FIG. 5, at step S20, the conference coordinator requests the name of each participant, and stores the replies when they are received.

At step 522, the conference coordinator requests the avatar of each participant, and stores the avatars when they are received. Each avatar comprises a three-dimensional computer model of the participant, and may be provided by prior laser scanning of the participant in a conventional manner, or in other conventional ways, for example as described in University of Surrey Technical Report CVSSP—hilton98a, University of Surrey, Guildford, UK.

Figure 6:
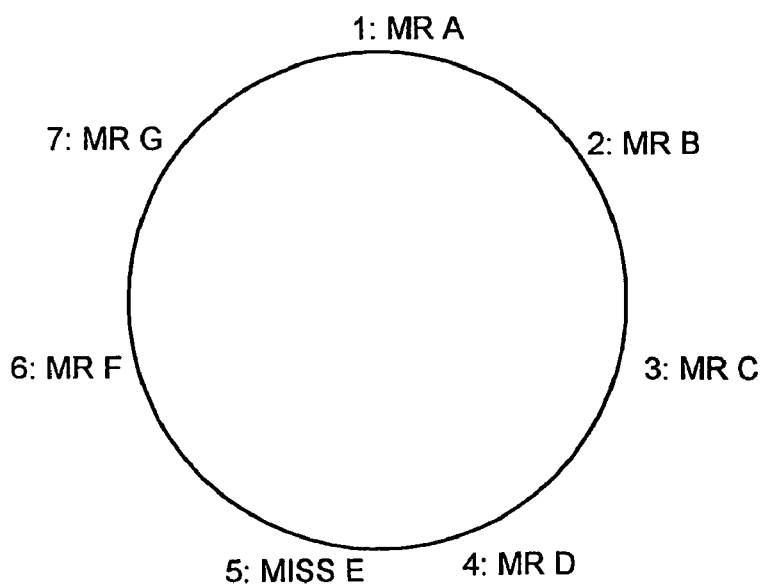
FIG. 6 shows an example seating plan defined at step S24 in FIG. 5.

At step S24, the conference coordinator defines a seating plan for the participants taking part in the video conference. In this embodiment, this step comprises assigning a number to each participant (including the conference coordinator) and defining the order of the participants around a circular conference room table, for example as shown in FIG. 6.

At step S26, the conference room coordinator selects whether a circular or rectangular conference room table is to be used for the video conference.

At step S28, the conference coordinator sends data via Internet 20 defining each of the avatars received at step S22 (including his own), the participant numbers and seating plan defined at step S24, the table shape selected at step S26, and the participants names received at step S20 (including his own) to each of the other participants in the video conference.

Referring again to FIG. 4, at step S6, processing operations are performed to calibrate each user station 2, 4, 6, 8, 10, 12, 14 (including the user station of the conference coordinator).

Figure 7:
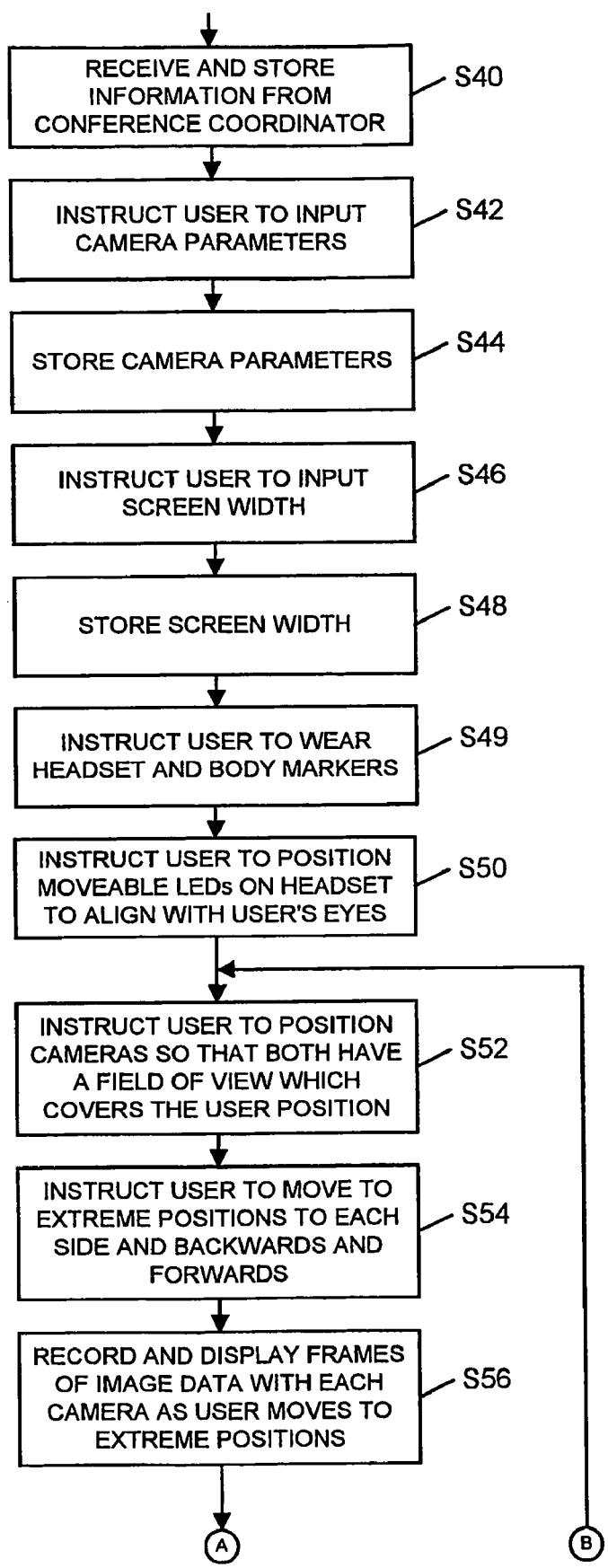
FIGS. 7A to 7C show the processing operations performed at step S6 in FIG. 4.
Figure 7:
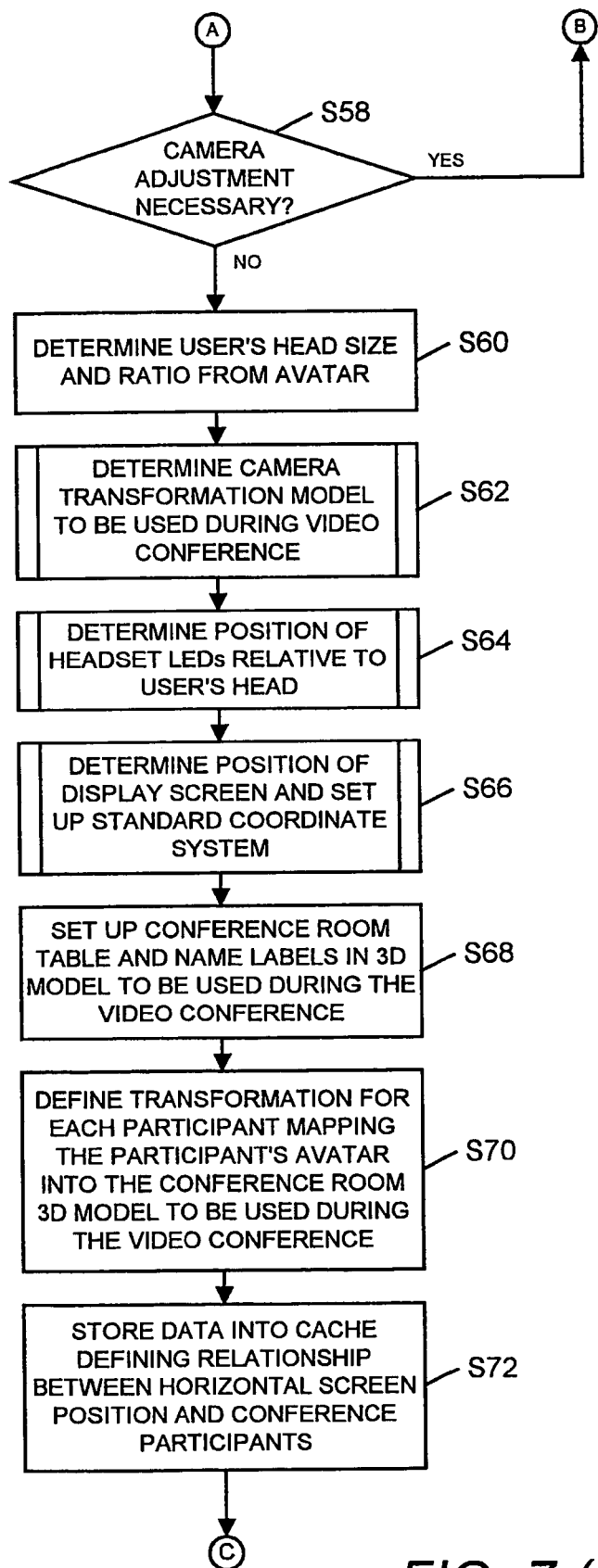
Figure 7:
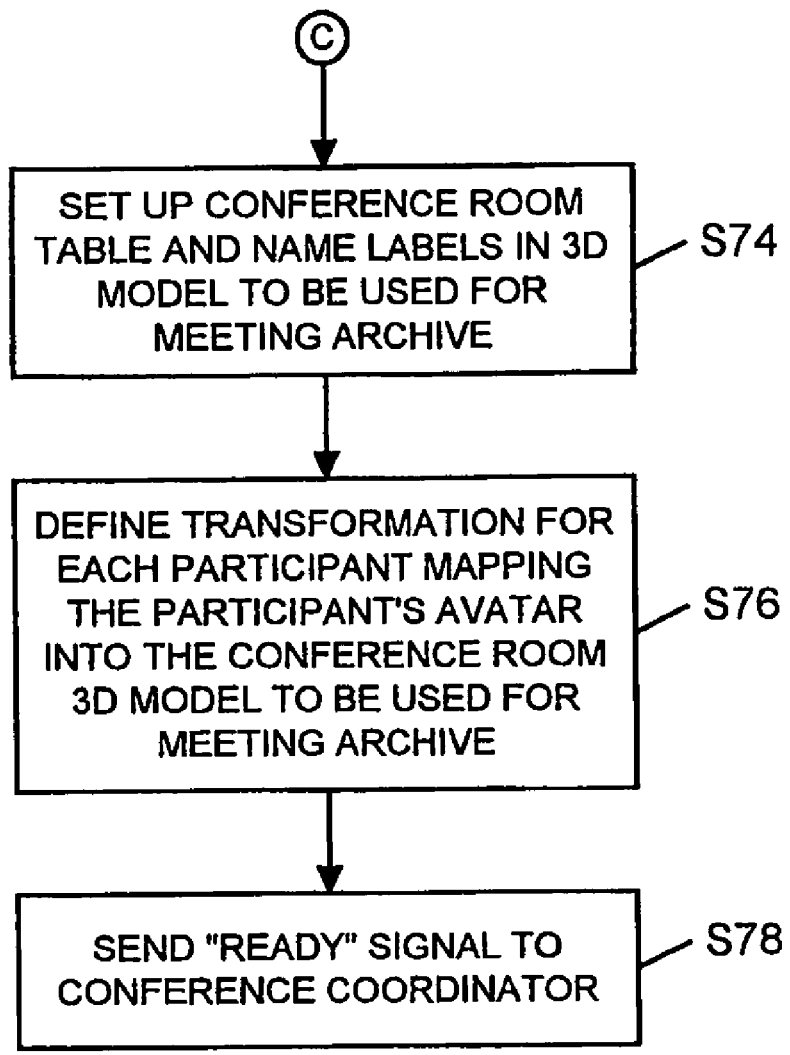

FIG. 7 shows the processing operations performed at step S6 to calibrate one of the user stations. These processing operations are performed at every user station.

Referring to FIG. 7, at step S40, the data transmitted by the conference coordinator at step S28 (FIG. 5) is received and stored. The three-dimensional avatar model of each participant is stored in its own local reference system in avatar and 3D conference model store 114, and also in its own further local reference system in meeting archive database 126. The other data received from the conference coordinator is stored for example in memory 102 for subsequent use.

At step S42, central controller 100 requests user 44 to input information about the cameras 26, 28. Central controller 100 does this by displaying a message on monitor 34 requesting the user to input for each camera the focal length of the lens in millimeters and the size of the imaging charge couple device (CCD) within the camera. This may be done by displaying on monitor 34 a list of conventional cameras, for which the desired information is pre-stored in memory 102, and from which user 44 can select the camera used, or by the user inputting the information directly. At step S44, the camera parameters input by the user are stored, for example in memory 102 for future use.

At step S46, central controller 100 displays a message on monitor 34 requesting user 44 to input the width in millimeters of the screen of monitor 34, and at step S48, the width which is input by the user is stored, for example in memory 102, for future use.

At step S49, central controller 100 displays a message on monitor 34 instructing the user to wear the headset 30 and body markers 70, 72, as previously described with reference to FIGS. 2A, 2B and 2C. When the user has completed this step, he inputs a signal to central controller 100 using keyboard 36. Power is then supplied to headset 30 when it is worn by user 44 so that each of the LEDs 56, 58, 60, 62 and 64 are continuously illuminated.

At step S50, central controller 100 displays a message on monitor 34 instructing the user to position the movable LEDs 58, 62, on headset 30 so that the LEDs align with the user's eyes. When the user has slid LEDs 58 and 62 on headband 54 so that they align with his eyes, he inputs a signal to central controller 100 using keyboard 36.

At step S52, central controller 100 displays a message on monitor 34 instructing the user to position cameras 26 and 28 so that both cameras have a field of view which covers the user's position in front of PC 24. When the user has positioned the cameras, he inputs a signal to central controller 100 using keyboard 36.

At step S54, central controller 100 displays a message on monitor 34 instructing the user to move backwards, forwards, and to each side over the full range of distances that the user is likely to move during the video conference. At step S56, as the user moves, frames of image data are recorded by cameras 26 and 28 and displayed on monitor 34, so that the user can check whether he is visible to each camera at all positions.

At step S58, central controller 100 displays a message on monitor 34 asking the user whether it is necessary to adjust the positions of the cameras so that the user is visible throughout the full range of his likely movements. If the user inputs a signal using keyboard 36 indicating that camera adjustment is necessary, steps 552 to 558 are repeated until the cameras are correctly positioned. On the other hand, if the user inputs a signal indicating that the cameras are correctly positioned, then processing proceeds to step S60.

At step S60, central controller 100 processes the data defining the avatar of user 44 to determine the user's head ratio, that is, the ratio of the width of the user's head (defined by the distance between the user's ears) and the length of the user's head (defined by the distance between the top of the user's head and the top of his neck), and also the width of the user's head in real-life (which can be determined since the scale of the avatar is known). The head ratio and real-life width are stored, for example in memory 106 for subsequent use by the image data processor 104.

At step S62, central controller 100 and image data processor 104 use the frames of image data previously recorded at step S56 (after the cameras 26 and 28 had been positioned for the final time) to determine the camera transformation model to be used during the video conference. The camera transformation model defines the relationship between the image plane (that is, the plane of the CCD) of camera 26 and the image plane of camera 28 which will be used to reconstruct the three-dimensional positions of the headset LEDs 56, 58, 60, 62, 64 and the body markers 70, 72 using images of these LEDs and markers recorded by the cameras 26 and 28.

Figure 8:
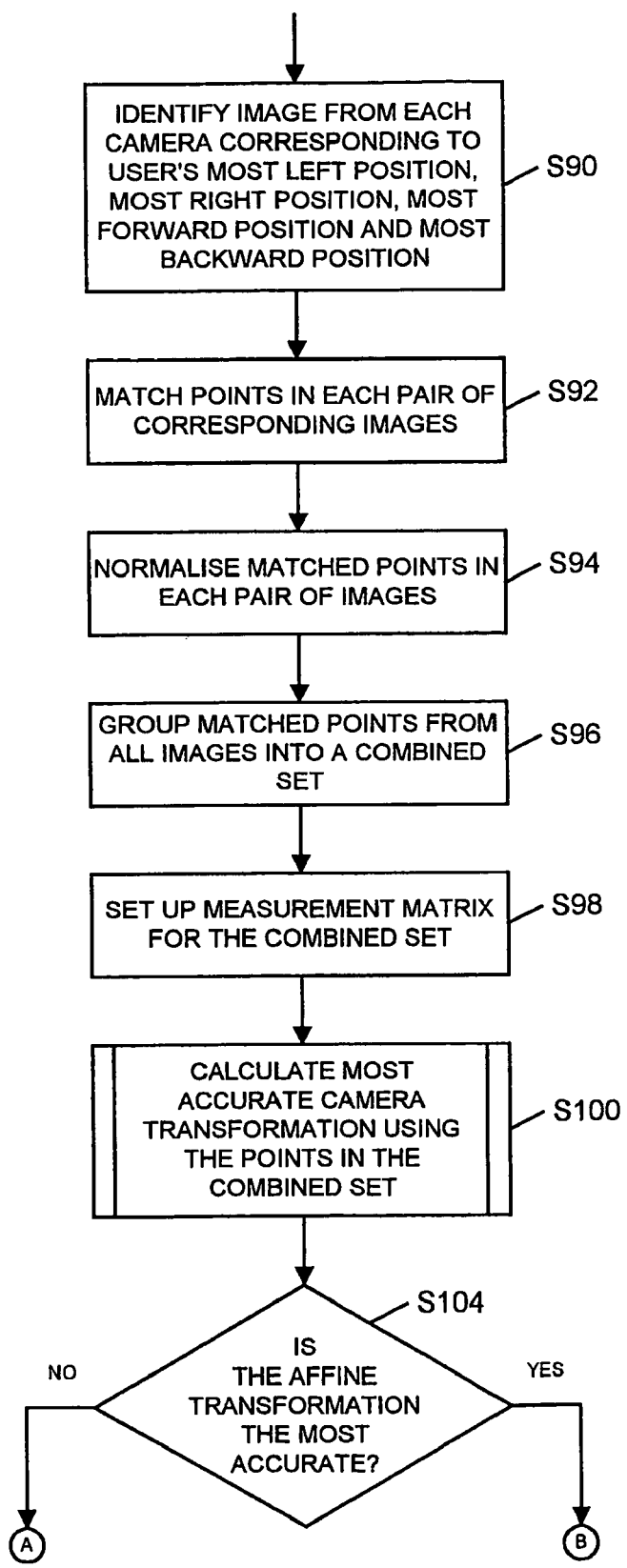
FIGS. 8A and 8B show the processing operations performed at step S62 in FIG. 7.
Figure 8:
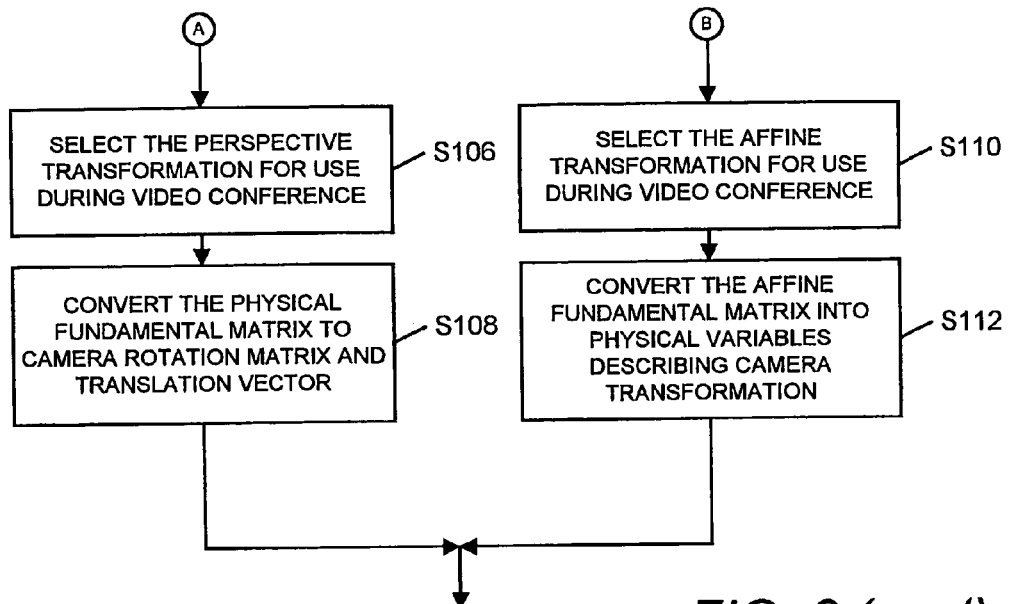

FIG. 8 shows the processing operations performed by central controller 100 and image data processor 104 at step S62 to determine the camera transformation model.

Referring to FIG. 8, at step S90, the frames of image data recorded at step S56 are processed to identify the pair of synchronous images (that is, the image from camera 26 and the image from camera 28 recorded at the same time) which show the most left position, the pair which show the most right position, the pair which show the most forward position, and the pair which show the most backward position to which the user moved. In this embodiment, step S90 is performed by displaying the sequence of images recorded by one of the cameras at step S56, and instructing the user to input a signal, for example via keyboard 36 or mouse 38, when the image for each of the extreme positions is displayed. As noted above, these positions represent the extents of the user's likely movement during the video conference. Images for the most left position and most right position are identified and considered in subsequent processing to determine the camera transformation model since each of the cameras 26 and 28 is positioned at an angle to the user, and so movement of the user to the right or left increases or decreases the distance of the user from each of the cameras.

At step S92, the image data for each of the four pairs of images identified at step S90 (that is, the pair of images for the most left position, the pair of images for the most right position, the pair of images for the most forward position and the pair of images for the most backward position) is processed to identify the positions of the LEDs 56, 58, 60, 62, 64 and coloured body markers 70, 72 which are visible in each image of the pair and to match each of the identified points between the images in the pair. In this step, since each LED and each body marker has a unique colour, the pixel data for each image in a synchronised pair is processed to identify those pixels having one of the predetermined colours by examining the RGB values of the pixels. Each group of pixels having one of the predetermined colours is then processed using a convolution mask to find the coordinates within the image as a whole of the centre of the group of pixels. This is performed in a conventional manner, for example as described in "Affine Analysis of Image Sequences" by L. S. Shapiro, Cambridge University Press, 1995, ISBN 0-521-55063-7, pages 16–23. The matching of points between images is done by identifying the point in each image which has the same colour (if a marker or LED is visible to only one of the cameras 26 or 28, and hence appears in only one image, then no matched pair of points will be identified for this LED or marker).

At step S94, the coordinates of the matched points identified at step S92 are normalised. Up to this point, the coordinates of the points are defined in terms of the number of pixels across and down an image from the top left hand corner of the image. At step S94, the camera focal length and image plane size previously stored at step S44 are used to convert the coordinates of the points from pixels to a coordinate system in millimeters having an origin at the camera optical centre. The millimeter coordinates are related to the pixel coordinates as follows:

$$x^* = h \times (x - C_x) \quad (1)$$

$$y^* = -v \times (y - C_y) \quad (2)$$

where $(x^*, y^*)$ are the millimeter coordinates, $(x, y)$ are the pixel coordinates, $(C_x, C_y)$ is the centre of the image (in pixels), which is defined as half of the number of pixels in the horizontal and vertical directions, and "h" and "v" are the horizontal and vertical distances between adjacent pixels (in mm).

At step S96, a set is formed of all the matched points identified at step S92. This set therefore contains points for all four pairs of images. Of course, the number of points in the combined set from each pair of images may be different, depending upon which LEDs and body markers are visible in the images. However the large number of body markers and LEDs ensures that at least seven markers or LEDs will be visible in each image, giving a minimum of 4×7=28 pairs of matched points in the combined set.

At step 598, a measurement matrix, M, is set up as follows for the points in the combined set created at step S96:

$$M = \begin{pmatrix} x_1 x_1' & -y_1 x_1' & x_1' & -x_1 y_1' & y_1 y_1' & -y_1' & x_1 & -y_1 & 1 \\ x_2 x_2' & -y_2 x_2' & x_2' & -x_2 y_2' & y_2 y_2' & -y_2' & x_2 & -y_2 & 1 \\ \vdots & \vdots & \vdots & \vdots & \vdots & \vdots & \vdots & \vdots & \vdots \\ x_k x_k' & -y_k x_k' & x_k' & -x_k y_k' & y_k y_k' & -y_k' & x_k & -y_k & 1 \end{pmatrix} \quad (3)$$

where $(x,y)$ are the pixel coordinates of the point in the first image of a pair, $(x',y')$ are the pixel coordinates of the corresponding (matched) point in the second image of the pair, and the numbers 1 to k indicate to which pair of points the coordinates correspond (there being k pairs of points in total).

At step s100, the most accurate camera transformation for the matched points in the combined set is calculated. By calculating this transformation using the combined set of points created at step S96, the transformation is calculated using points matched in a pair of images representing the user's most left position, a pair of images representing the user's most right position, a pair of images representing the user's most forward position, and a pair of images representing the user's most backward position. Accordingly, the calculated transformation will be valid over the user's entire workspace.

Figure 9:
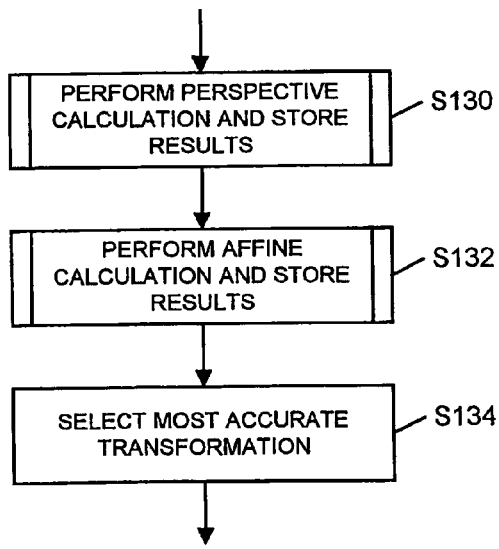
FIG. 9 shows the processing operations performed at step S100 in FIG. 8.

FIG. 9 shows the processing operations performed at step S100 to calculate the most accurate camera transformation.

Referring to FIG. 9, at step S130, a perspective transformation is calculated, tested and stored.

Figure 10:
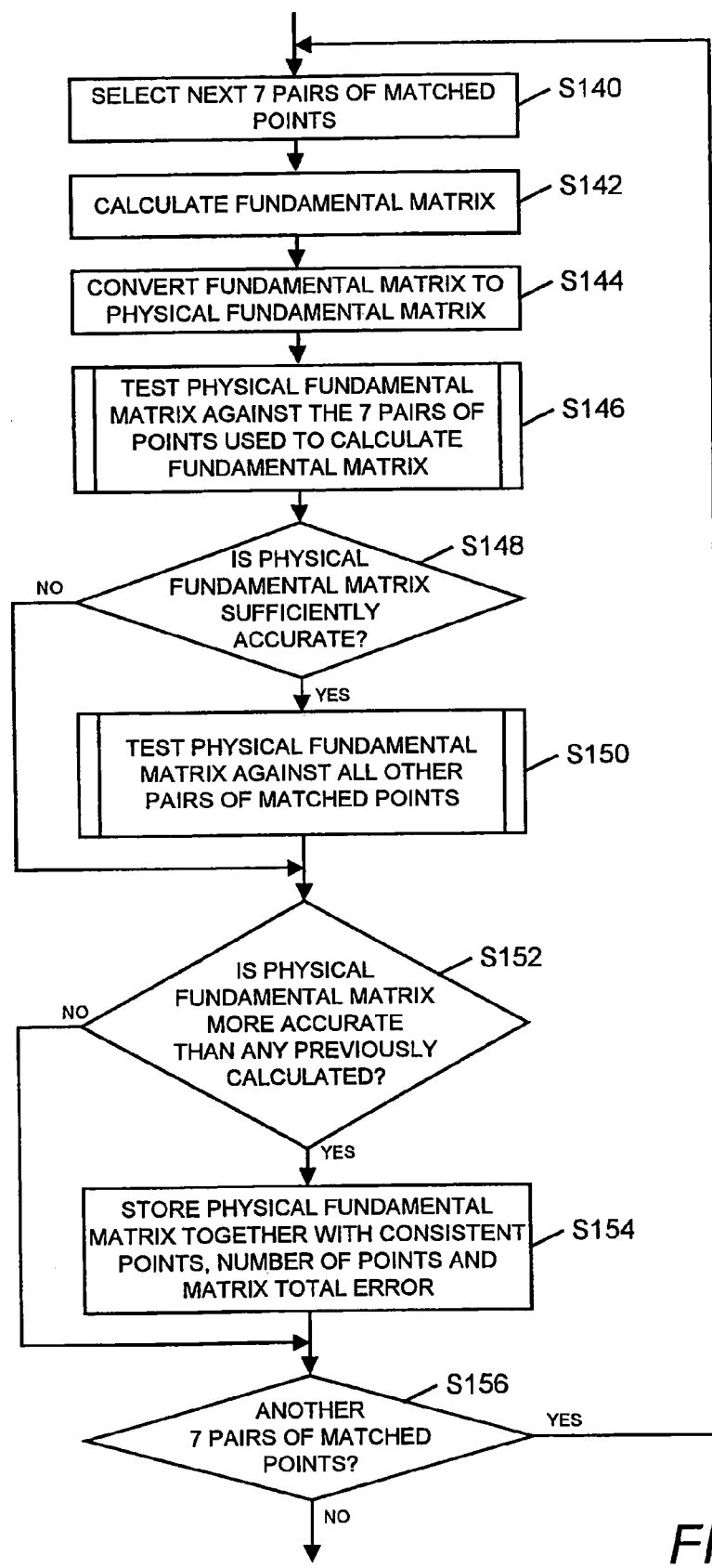
FIG. 10 shows the processing operations performed at step S130 in FIG. 9.

FIG. 10 shows the processing operations performed at step S130.

Referring to FIG. 10, at step S140, the next seven pairs of matched points in the combined set created at step S96 are selected (this being the first seven pairs the first time step S140 is performed).

At step S142, the selected seven pairs of points and the measurement matrix set at step S98 are used to calculate the fundamental matrix, F, representing the geometrical relationship between the cameras, F being a three by three matrix satisfying the following equation:

$$(x' \; y' \; 1) F \begin{pmatrix} x \\ y \\ 1 \end{pmatrix} = 0 \quad (4)$$

where $(x, y, 1)$ are the homogeneous pixel coordinates of any of the seven selected points in the first image of the pair, and $(x', y', 1)$ are the corresponding homogeneous pixel coordinates in the second image of the pair.

The fundamental matrix is calculated in a conventional manner, for example using the technique disclosed in "Robust Detection of Degenerate Configurations Whilst Estimating the Fundamental Matrix" by P. H. S. Torr, A. Zisserman and S. Maybank, Oxford University Technical Report 2090/96.

It is possible to select more than seven pairs of matched points at step S140 and to use these to calculate the fundamental matrix at step S142. However, seven pairs of points are used in this embodiment, since this has been shown empirically to produce satisfactory results, and also represents the minimum number of pairs needed to calculate the parameters of the fundamental matrix, reducing processing requirements.

At step S144, the fundamental matrix, F, is converted into a physical fundamental matrix, $F_{phys}$, using the camera data stored at step S44 (FIG. 7). This is again performed in a conventional manner, for example as described in "Motion and Structure from Two Perspective Views: Algorithms, Error Analysis and Error Estimation" by J. Weng, T. S. Huang and N. Ahuja, IEEE Transactions on Pattern Analysis and Machine Intelligence, vol. 11, No. 5, May 1989, pages 451–476, and as summarised below.

First the essential matrix, E, which satisfies the following equation is calculated:

$$(x*' \; y*' \; f) E \begin{pmatrix} x* \\ y* \\ f \end{pmatrix} = 0 \quad (5)$$

where $(x^*, y^*, f)$ are the coordinates of any of the selected seven points in the first image in a millimeter coordinate system whose origin is at the centre of the image, the z coordinate having being normalised to correspond to the focal length, f, of the camera, and $(x^{*\prime}, y^{*\prime}, f)$ are the corresponding coordinates of the matched point in the second image of the pair. The fundamental matrix, F, is converted into the essential matrix, E, using the following equations:

$$A = \begin{pmatrix} 1/h & 0 & c_x/f \\ 0 & 1/v & -c_y/f \\ 0 & 0 & 1/f \end{pmatrix} \quad (6)$$

$$M = A^T F A \quad (7)$$

$$E = \sqrt{\frac{2}{tr(M^T M)}} \times M \quad (8)$$

where the camera parameters "h", "v", "$c_x$", "$c_y$" and "f" are as defined previously, the symbol T denotes the matrix transpose, and the symbol "tr" denotes the matrix trace.

The calculated essential matrix, E, is then converted into a physical essential matrix, "$E_{phys}$", by finding the closest matrix to E which is decomposable directly into a translation vector (of unit length) and rotation matrix (this closest matrix being $E_{phys}$).

Finally, the physical essential matrix is converted into a physical fundamental matrix, using the equation:

$$F_{phys} = A^{-1T} E_{phys} A^{-1} \quad (9)$$

where the symbol "−1" denotes the matrix inverse.

Each of the physical essential matrix, $E_{phys}$, and the physical fundamental matrix, $F_{phys}$ is a "physically realisable matrix", that is, it is directly decomposable into a rotation matrix and translation vector.

The physical fundamental matrix, $F_{phys}$, defines a curved surface in a four-dimensional space, represented by the coordinates (x, y, x', y') which are known as "concatenated image coordinates". The curved surface is given by Equation (4) above, which defines a 3D quadric in the 4D space of concatenated image coordinates.

At step S146, the calculated physical fundamental matrix is tested against each pair of points that were used to calculate the fundamental matrix at step S142. This is done by calculating an approximation to the 4D Euclidean distance (in the concatenated image coordinates) of the 4D point representing each pair of points from the surface representing the physical fundamental matrix. This distance is known as the "Sampson distance", and is calculated in a conventional manner, for example as described in "Robust Detection of Degenerate Configurations Whilst Estimating the Fundamental Matrix" by P. H. S. Torr, A. Zisserman and S. Maybank, Oxford University Technical Report 2090/96.

Figure 11:
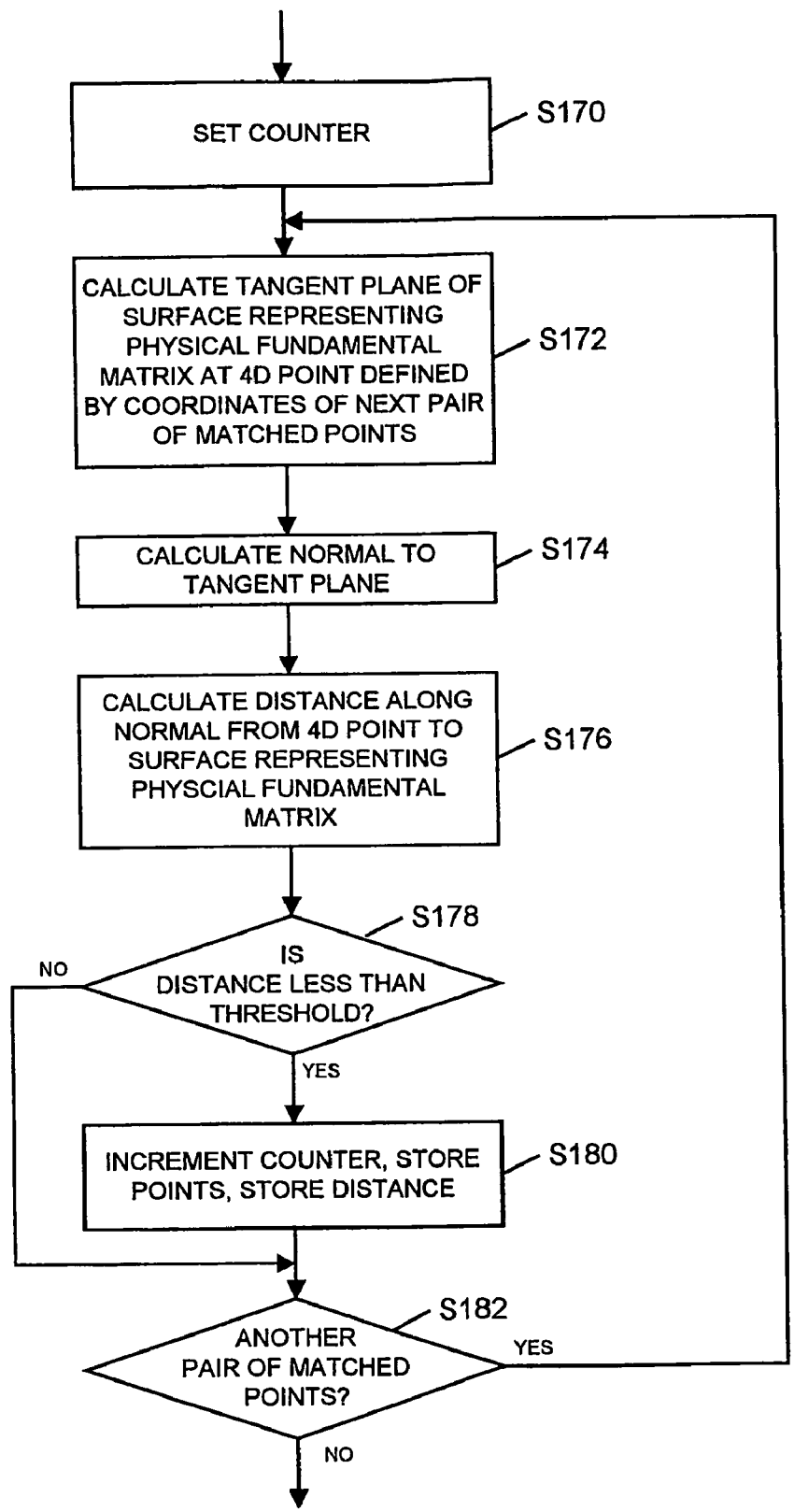
FIG. 11 shows the processing operations performed at step S146 and step S150 in FIG. 10.

FIG. 11 shows the processing operations performed at step S146 to test the physical fundamental matrix.

Referring to FIG. 11, at step S170, a counter is set to zero. At step S172, the tangent plane of the surface representing the physical fundamental matrix at the four-dimensional point defined by the coordinates of the next pair of points in the seven pairs of points (the two coordinates defining each point in the pair being used to define a single point in the four-dimensional space of the concatenated image coordinates) is calculated. Step S172 effectively comprises shifting the surface to touch the point defined by the coordinates of the pair of points, and calculating the tangent plane at that point. This is performed in a conventional manner, for example as described in "Robust Detection of Degenerate Configurations Whilst Estimating the Fundamental Matrix" by P. H. S. Torr, A. Zisserman and S. Maybank, Oxford University Technical Report 2090/96.

At step S174, the normal to the tangent plane determined at step S172 is calculated, and, at step S176, the distance along the normal from the point in the 4D space defined by the coordinates of the pair of matched points to the surface representing the physical fundamental matrix (the "Sampson distance") is calculated.

At step S178, the calculated distance is compared with a threshold which, in this embodiment, is set at 1.0 pixels. If the distance is less than the threshold, then the point lies sufficiently close to the surface, and the physical fundamental matrix is considered to accurately represent the relative positions of the cameras 26 and 28 for the particular pair of matched points being considered. Accordingly, if the distance is less than the threshold, at step S180, the counter which was initially set to zero at step S170 is incremented, the points are stored, and the distance calculated at step S176 is stored.

At step S182, it is determined whether there is another pair of points in the seven pairs of points used to calculate the fundamental matrix, and steps S172 to S182 are repeated until all such points have been processed as described above.

Referring again to FIG. 10, at step S148, it is determined whether the physical fundamental matrix calculated at step S144 is sufficiently accurate to justify further processing to test it against all of the pairs of matched points in the combined set. In this embodiment, step S148 is performed by determining whether the counter value set at step S180 (indicating the number of pairs of points which have a distance less than the threshold tested at step S178, and hence are considered to be consistent with the physical fundamental matrix) is equal to 7. That is, it is determined whether the physical fundamental matrix is consistent with all of the points used to calculate the fundamental matrix from which the physical fundamental matrix was derived. If the counter is less than 7, the physical fundamental matrix is not tested further, and processing proceeds to step S152. On the other hand, if the counter value is equal to 7, at step S150, the physical fundamental matrix is tested against each other pair of matched points. This is performed in the same way as step S146 described above, with the following exceptions: (i) at step S170, the counter is set to 7 to reflect the seven pairs of points already tested at step S146 and determined to be consistent with the physical fundamental matrix, and (ii) the total error for all points stored at step S180 (including those stored during processing at step S146) is calculated, using the following equation:

$$\text{Total error} = \frac{\sqrt{\sum \frac{e_i^2}{p}}}{e_{th}} \quad (10)$$

where $e_i$ is the distance for the "i"th pair of matched points between the 4D point represented by their coordinates and the surface representing the physical fundamental matrix calculated at step S176, this value being squared so that it is unsigned (thereby ensuring that the side of the surface representing the physical fundamental matrix on which the point lies does not affect the result), p is the total number of points stored at step S180, and $e_{th}$ is the distance threshold used in the comparison at step S178.

The effect of step S150 is to determine whether the physical fundamental matrix calculated at step S144 is accurate for each pair of matched points in the combined set, with the value of the counter at the end (step S180) indicating the total number of the points for which the calculated matrix is sufficiently accurate.

At step S152, it is determined whether the physical fundamental matrix tested at step S150 is more accurate than any previously calculated using the perspective calculation technique. This is done by comparing the counter value stored at step S180 in FIG. 11 for the last-calculated physical fundamental matrix (this value representing the number of points for which the physical fundamental matrix is an accurate camera solution) with the corresponding counter value stored for the most accurate physical fundamental matrix previously calculated. The matrix with the highest number of points (counter value) is taken to be the most accurate. If the number of points is the same for two matrices, the total error for each matrix (calculated as described above) is compared, and the most accurate matrix is taken to be the one with the lowest error. If it is determined at step S152 that the physical fundamental matrix is more accurate than the currently stored one, then, at step S154 the previous one is discarded, and the new one is stored together with the number of points (counter value) stored at step S180 in FIG. 11, the points themselves, and the total error calculated for the matrix.

At step S156, it is determined whether there is another pair of matched points which has not yet been considered, such that there is another unique set of seven pairs of matched points in the combined set to be processed. Steps S140 to S156 are repeated until each unique set of seven pairs of matched points has been processed in the manner described above.

Referring again to FIG. 9, at step S132, an affine relationship for the matched points in the combined set is calculated, tested and stored.

Figure 12:
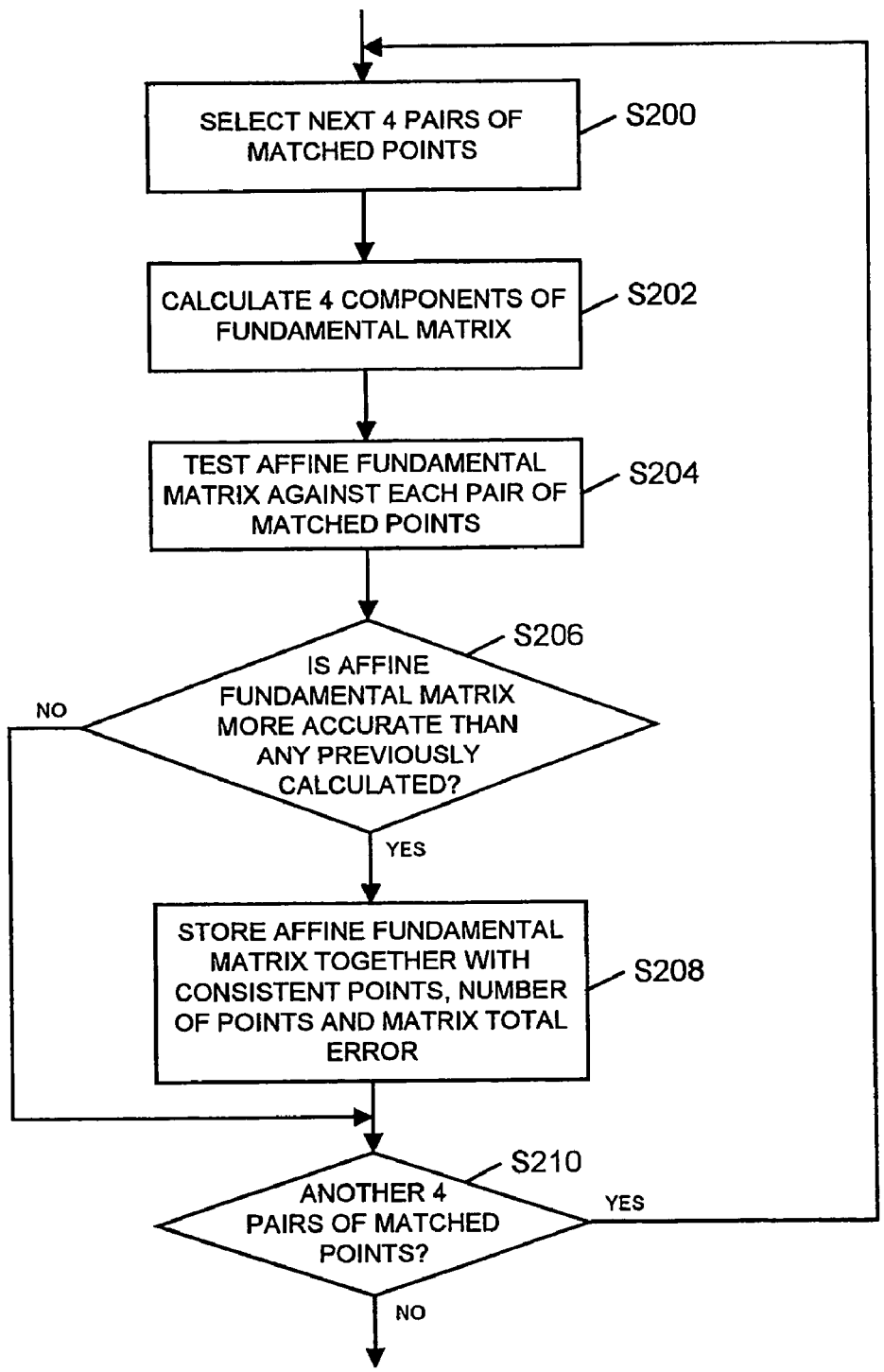
FIG. 12 shows the processing operations performed at step S132 in FIG. 9.

FIG. 12 shows the processing operations performed at step S132.

Referring to FIG. 12, at step S200, the next four pairs of matched points are selected for processing (this being the first four pairs the first time step S200 is performed).

When performing the perspective calculations (step S130 in FIG. 9), it is possible to calculate all of the components of the fundamental matrix, F. However, when the relationship between the cameras is an affine relationship, it is possible to calculate only four independent components of the fundamental matrix, these four independent components defining what is commonly known as an "affine" fundamental matrix.

Accordingly, at step S202, the four pairs of points selected at step S200 and the measurement matrix set at step S96 are used to calculate four independent components of the fundamental matrix (giving the "affine" fundamental matrix) using a technique such as that described in "Affine Analysis of Image Sequences" by L. S. Shapiro, Section 5, Cambridge University Press 1995, ISBN 0-521-55063-7. It is possible to select more than four pairs of points at step S200 and to use these to calculate the affine fundamental matrix at step S202. However, in the present embodiment, only four pairs are selected since this has been shown empirically to produce satisfactory results, and also represents the minimum number required to calculate the components of the affine fundamental matrix, reducing processing requirements.

At step S204, the affine fundamental matrix is tested against each pair of matched points in the combined set using a technique such as that described in "Affine Analysis of Image Sequences" by L. S. Shapiro, Section 5, Cambridge University Press, 1995, ISBN 0-521-55063-7. The affine fundamental matrix represents a flat surface (hyperplane) in four-dimensional, concatenated image space, and this test comprises determining the distance between a point in the four-dimensional space defined by the coordinates of a pair of matched points and the flat surface representing the affine fundamental matrix. As with the tests performed during the perspective calculations at step S146 and s150 (FIG. 10), the test performed at step S204 generates a value for the number of pairs of points for which the affine fundamental matrix represents a sufficiently accurate solution to the camera transformation and a total error value for these points.

At step S206, it is determined whether the affine fundamental matrix calculated at step S202 and tested at step S204 is more accurate than any previously calculated. This is done by comparing the number of points for which the matrix represents an accurate solution with the number of points for the most accurate affine fundamental matrix previously calculated. The matrix with the highest number of points is the most accurate. If the number of points is the same, the matrix with the lowest error is the most accurate. If the affine fundamental matrix is more accurate than any previously calculated, then at step S208, it is stored together with the points for which it represents a sufficiently accurate solution, the total number of these points and the matrix total error.

At step S210, it is determined whether there is another pair of matched points to be considered, such that there exists another unique set of four pairs of matched points in the combined set to be processed. Steps S200 to S210 are repeated until each unique set of four pairs of matched points are processed in the manner described above.

Referring again to FIG. 9, at step S134, the most accurate transformation is selected from the perspective transformation calculated at step S130 and the affine transformation calculated at step S132. This step is performed by comparing the number of points which are consistent with the most accurate perspective transformation (stored at step S154) with the number of points which are consistent with the most accurate affine transformation (stored at step S208), and selecting the transformation which has the highest number of consistent points (or the transformation having the lowest matrix total error if the number of consistent points is the same for both transformations).

At step S104, it is determined whether the affine transformation is the most accurate camera transformation. If it is determined at step S104 that the affine transformation is not the most accurate transformation, then, at step S106, the perspective transformation which was determined at step S100 is selected for use during the video conference.

At step S108, the physical fundamental matrix for the perspective transformation is converted to a camera rotation matrix and translation vector. This conversion is performed in a conventional manner, for example as described in the above-referenced "Motion and Structure from Two Perspective Views: Algorithms, Error Analysis and Error Estimation" by J. Weng, T. S. Huang and N. Ahuja, IEEE Transactions on Pattern Analysis and Machine Intelligence, Vol. 11, No. 5, May 1989, pages 451–476.

In the processing described above with respect to FIG. 10, a fundamental matrix is calculated (steps S142) and converted to a physical fundamental matrix (step S144) for testing against the matched points (steps S146 and 5150). This has the advantage that, although additional processing is required to convert the fundamental matrix to a physical fundamental matrix, the physical fundamental matrix ultimately converted at step S108 has itself been tested. If the fundamental matrix was tested, this would then have to be converted to a physical fundamental matrix which would not, itself, have been tested.

On the other hand, if it is determined at step S104, that the affine transformation is the most accurate transformation, then, at step s110, the affine transformation is selected for use during the video conference.

At step S112, the affine fundamental matrix is converted into three physical variables describing the camera transformation, namely the magnification, "m", of the object between images recorded by the cameras, the axis, $\phi$, of rotation of the camera, and the cyclotorsion rotation, $\phi$, of the camera. The conversion of the affine fundamental matrix into these physical variables is performed in a conventional manner, for example as described in "Affine Analysis of Image Sequences" by L. S. Shapiro, Cambridge University Press, 1995, ISBN 0-521-55063-7, Section 7.

Figure 13:
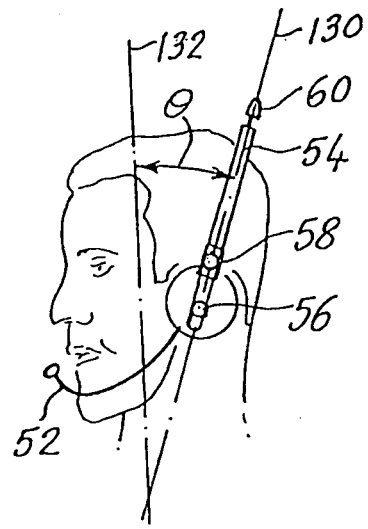
FIG. 13 illustrates the offset angle θ between the plane of the user's head and the plane of his headset calculated at step S64 in FIG. 7.

Referring again to FIG. 7, at step S64, the position of the headset LEDs 56, 58, 60, 62 and 64 relative to the head of user 44 is determined. This step is performed since this relative position will depend on how the user has placed the headset 30 on his head. More particularly, as illustrated in FIG. 13, the plane 130 in which the headset LEDs lie is determined by the angle at which the user wears the headset 30. Accordingly, the plane 130 of the headset LEDs may be different to the actual plane 132 of the user's head. At step S64, therefore, processing is carried out to determine the angle $\theta$ between the plane 130 of the headset LEDs and the actual plane 132 of the user's head.

Figure 14:
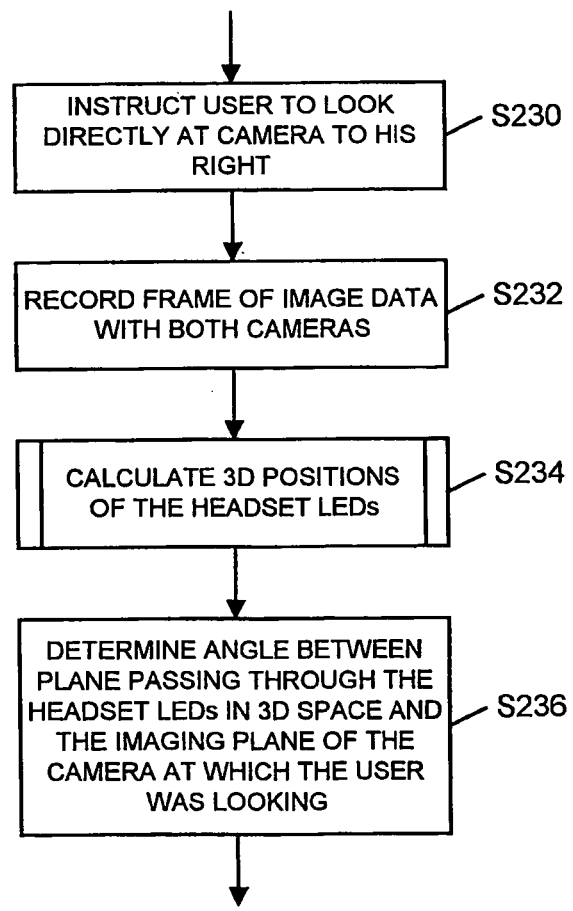
FIG. 14 shows the processing operations performed at step S64 in FIG. 7.

FIG. 14 shows the processing operations performed at step S64.

Referring to FIG. 14, at step S230, central controller 100 displays a message on monitor 34 instructing the user 44 to look directly at the camera to his right (that is, camera 28 in this embodiment).

At step 5232, a frame of image data is recorded with both camera 26 and camera 28 while the user is looking directly at camera 28.

At step 5234, the synchronous frames of image data recorded at step 5232 are processed to calculate the 3D positions of the headset LEDs 56, 58, 60, 62 and 64.

FIG. 15 shows the processing operations performed at step S324 to calculate the 3D positions of the headset LEDs.

Referring to FIG. 15, at step S250, the position of each headset LED 56, 58, 60, 62 and 64 is identified in each of the images recorded at step S232. The identification of the LED positions at step S250 is carried out in the same way as previously described with respect to step S92 (FIG. 8).

At step 5252, the positions of the next pair of LEDs matched between the pair of images are considered, and the camera transformation model previously determined at step 562 (FIG. 7) is used to calculate the projection of a ray from the position of the LED in the first image through the optical centre of the camera for the first image, and from the position of the matched LED in the second image through the optical centre of the camera for the second image. This is illustrated in FIG. 16. Referring to FIG. 16, ray 140 is projected from the position of an LED (such as LED 56) in the image 142 recorded by camera 26 through the optical centre of camera 26 (not shown), and ray 144 is projected from the position of the same LED in image 146 recorded by camera 28, through the optical centre of camera 28 (not shown).

Referring again to FIG. 15, at step S254, the mid-point 148 (FIG. 16) of the line segment which connects, and is perpendicular to, both of the rays projected in step S252 is calculated. The position of this mid-point represents the physical position of the LED in three dimensions.

At step S256, it is determined whether there is another one of the LEDs 56, 58, 60, 62 or 64 to be processed. Steps S252 to S256 are repeated until the three-dimensional coordinates of each of the LEDs has been calculated as described above.

Referring again to FIG. 14, at step S236, the plane 130 (FIG. 13) in which the three-dimensional positions of the headset LEDs lie is determined, and the angle $\theta$ between this plane and the imaging plane of the camera at which the user was looking when the frames of image data were recorded at step S232 is calculated. Since the user was looking directly at the camera to his right when the frames of image data were recorded at step S232, the direction of the imaging plane of the camera to the user's right corresponds to the direction of the plane 132 of the user's head (FIG. 13). Accordingly, the angle calculated at step S236 is the angle $\theta$ between the plane 130 of the headset LEDs and the plane 132 of the user's head.

Referring again to FIG. 7, at step S66, the position of the display screen of monitor 34 is determined and a coordinate system is defined relative to this position.

Figure 17:
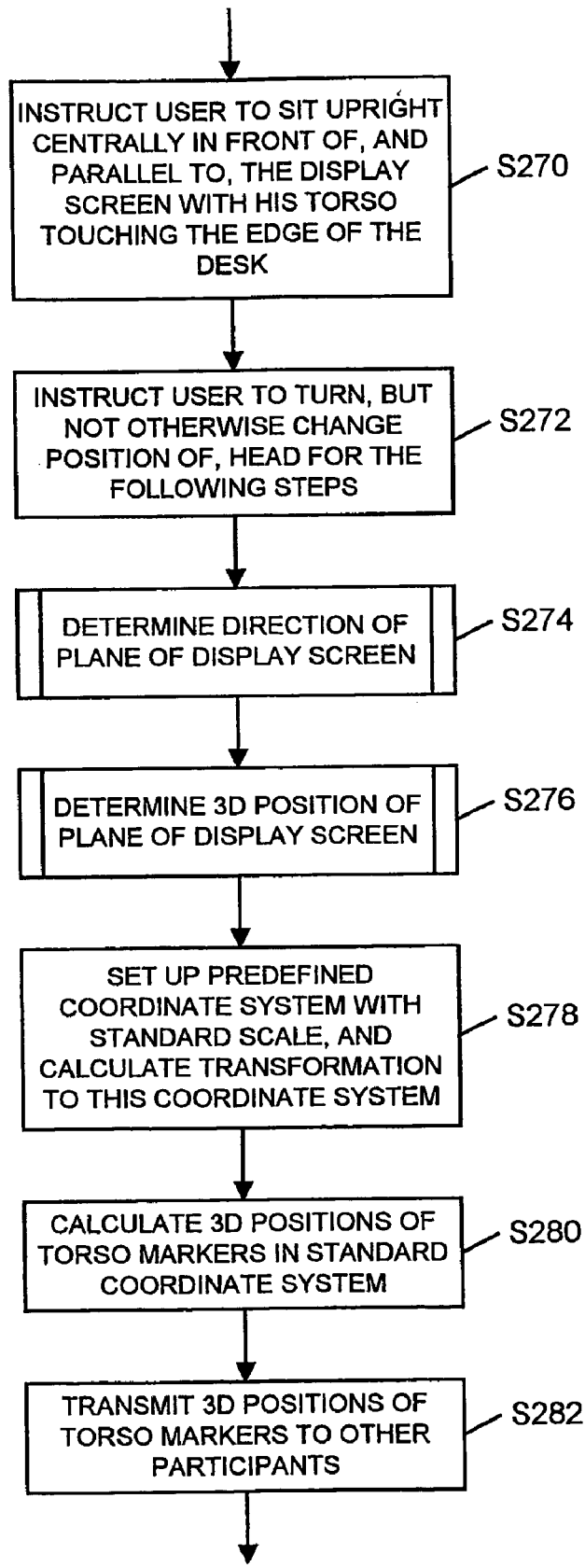
FIG. 17 shows the processing operations performed at step S66 in FIG. 7.

FIG. 17 shows the processing operations performed at step S66.

Referring to FIG. 17, at step S270, the central controller 100 displays a message on monitor 34 instructing the user to sit centrally and parallel to the display screen of the monitor 34, and to sit upright with his torso touching the edge of the desk on which PC 24 stands. At step S272, a further message is displayed instructing the user to turn but not otherwise change the position of, his head, so that the processing in the steps which follow can be carried out on the basis of a constant head position but changing head angle.

At step S274, the direction of the plane of the display screen of monitor 34 is determined. In this embodiment, this is done by determining the direction of a plane parallel to the display screen.

Figure 18:
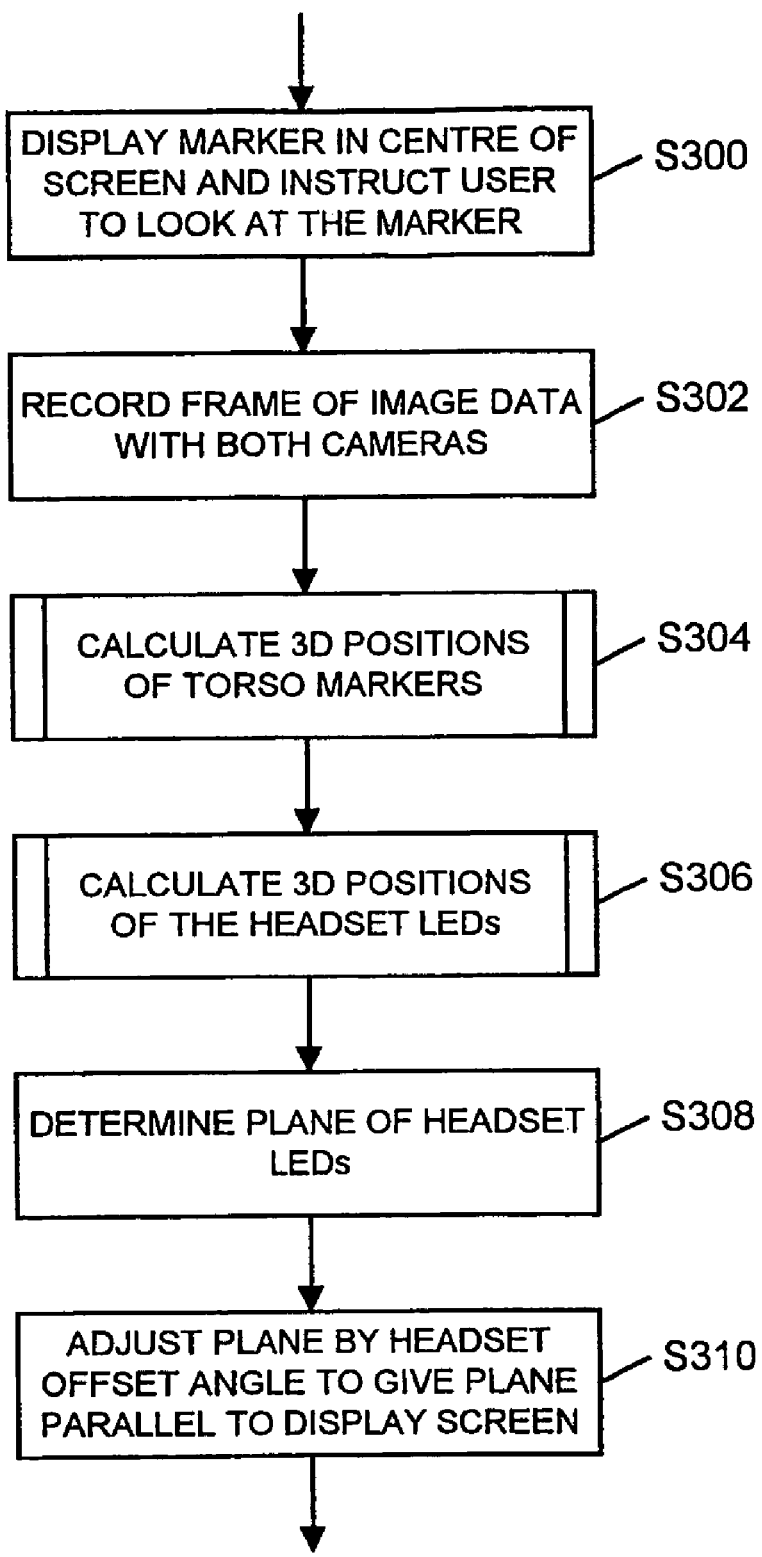
FIG. 18 shows the processing operations performed at step S274 in FIG. 17.

FIG. 18 shows the processing operations performed at step S274.

Referring to FIG. 18, at step S300, central controller 100 displays a marker in the centre of the display screen of monitor 34, and instructs the user to look directly at the displayed marker.

At step S302, a frame of image data is recorded with both camera 26 and 28 as the user looks at the displayed marker in the centre of the screen of monitor 34.

At step S304, the three-dimensional positions of the coloured markers 72 on the user's torso are determined. This step is carried out in the same way as step S234 in FIG. 14, which was described above with respect to FIGS. 15 and 16, the only difference being that, since the positions of the coloured markers 72 in each image are determined (rather than the positions of the headset LEDs), rays are projected from the positions of matched markers in each of the synchronised images. Accordingly, these steps will not be described again here.

At step S306, the three-dimensional positions of the user's headset LEDs are calculated. This step is also carried out in the same way as step S234 in FIG. 14, described above with respect to FIGS. 15 and 16.

At step S308, the plane in which the three-dimensional positions of the headset LEDs (determined at step S306) lie is calculated.

At step S310, the direction of the plane determined at step S308 is adjusted by the angle $\theta$ determined at step S64 (FIG. 7) between the plane of the headset LEDs and the plane of the user's head. The resulting direction is the direction of a plane parallel to the plane of the display screen, since the plane of the user's head will be parallel to the display screen when the user is looking directly at the marker in the centre of the screen.

Referring again to FIG. 17, at step S276, the position in three dimensions of the plane of the display screen of monitor 34 is determined.

Figure 19:
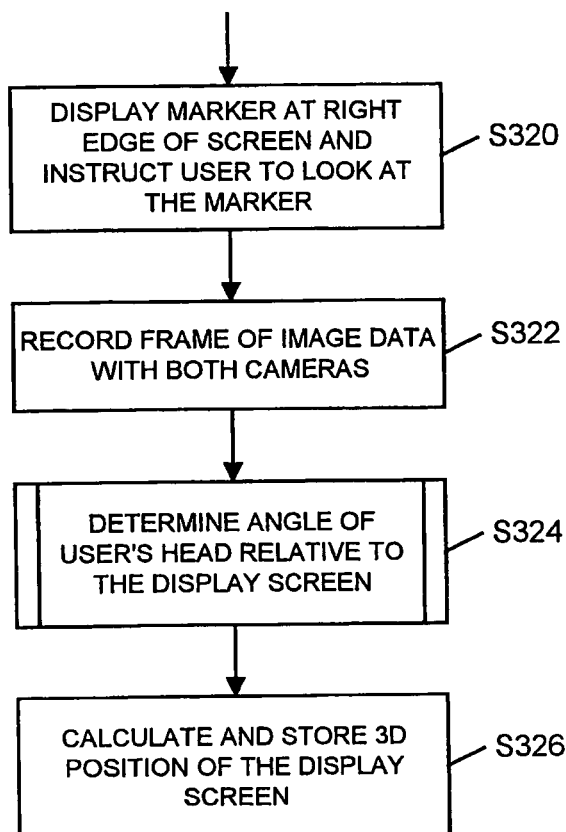
FIG. 19 shows the processing operations performed at step S276 in FIG. 17.

FIG. 19 shows the processing operations performed at step S276.

Referring to FIG. 19, at step S320, central controller 100 displays a marker in the centre of the right edge of the display screen of monitor 34, and displays a message instructing the user to look at the marker.

At step S322, a frame of image data is recorded with both camera 26 and 28 as the user looks at the marker displayed at the edge of the display screen.

At step S324, the angle of the user's head relative to the display screen about a vertical axis is determined.

Figure 20:
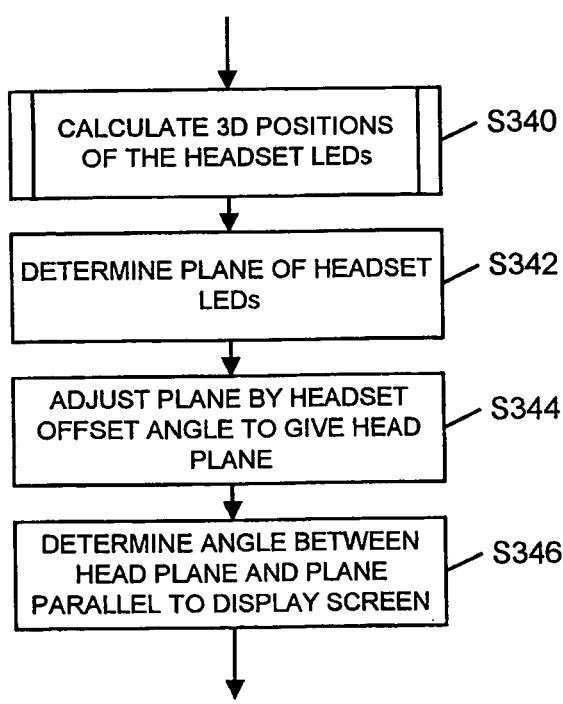
FIG. 20 shows the processing operations performed at step S324 in FIG. 19.

FIG. 20 shows the processing operations performed at step S324.

Referring to FIG. 20, at step S340, the three-dimensional positions of the headset LEDs are calculated. This step is carried out in the same manner as step S234 in FIG. 14, and described above with respect to FIGS. 15 and 16. Accordingly, the processing operations will not be described again here.

At step S342, the plane which passes through the three-dimensional positions of the headset LEDs is determined, and, at step S344, the position of this plane is adjusted by the headset offset angle θ (calculated at step S64 in FIG. 7) to give the plane of the user's head.

At step S346, the angle between the direction of the plane of the user's head determined at step S344 and the direction of the plane parallel to the display screen determined at step S274 (FIG. 17) is calculated. This calculated angle is the angle of the user's head relative to the plane of the display screen about a vertical axis, and is illustrated in FIG. 21 as angle α.

Referring again to FIG. 19, at step S326, the three-dimensional position of the display screen is calculated and stored for subsequent use. In this step, the width of the display screen previously input by the user at step S46 and stored at step S48 (FIG. 7) is used together with the angle determined at step S324 of the user's head when looking at a point at the edge of the display screen to calculate the 3D position of the display screen. More particularly, referring to FIG. 21, the distance "d" of the plane parallel to the display screen determined at step S274 (FIG. 17) is calculated using the angle α and one half of the width "W" of the display screen, thereby determining the three-dimensional position of the plane of the display screen. The extents of the display screen in the horizontal direction are then determined using the width "W".

Referring again to FIG. 17, at step S278, a three-dimensional coordinate system and scale is defined relative to the three-dimensional position of the display screen. This coordinate system will be used to define the three-dimensional position of points which are transmitted to the other participants during the video conference. Accordingly, each participant uses the same coordinate system and scale, and therefore transmits coordinates which can be interpreted by the other participants. Referring to FIG. 22, in this embodiment, the coordinate system is defined with the origin at the centre of the display screen, the "x" and "y" axes lying in the plane of the display screen in horizontal and vertical directions respectively, and the "z" axis lying in a direction perpendicular to the plane of the display screen in a direction towards the user. The scale for each axis is predefined (or could, for example, be transmitted to each user station by the conference coordinator).

Also at step S278, the transformation is calculated which maps three-dimensional coordinates calculated using the camera transformation model determined at step S62 to the new, standardised coordinate system and scale. This transformation is calculated in a conventional manner, with scale changes being determined by using the width of the user's head in real-life (determined at step S60 in FIG. 7) and the distance "a" between each of LEDs 56 and 64 and the inner surface of the earphones 48, 50 (FIG. 2C) to determine the distance between the LEDs 56 and 64 in real-life when the headset 30 is worn by the user, and by using this real-life LED separation to relate the distance between the three-dimensional coordinates of the headset LEDs 56 and 64 calculated using the camera transformation model at step S306 in FIG. 18 to the predefined scale of the standard coordinate system.

At step S280, the three-dimensional positions of the body markers 72 previously calculated at step S304 (FIG. 18) are transformed into the standard coordinate system defined at step S278.

At step S282, the three-dimensional positions of the body markers 72 in the standard coordinate system are transmitted to the other participants in the video conference, for subsequent use in positioning the user's avatar in the three-dimensional computer model of the conference room stored in the avatar and 3D conference model store 114 and in the three-dimensional computer model stored in the meeting archive database 126, as will be described below.

Referring again to FIG. 7, at step S68, a three-dimensional computer model is set up of the conference room table to be used for the video conference, and is stored in the avatar and 3D conference model store 114. In this embodiment, three-dimensional computer models are pre-stored of a rectangular and semi-circular conference room table, and the appropriate model is selected for use in dependence upon the instructions received from the conference room coordinator at step S40 defining the shape of the conference room table to be used.

In addition, name labels showing the name of each of the participants are placed on the conference room table in the three-dimensional computer model, with the name displayed on each label being taken from the names of the participants received from the conference coordinator at step S40. In order to determine the positions for the name labels on the conference table, the seating position of each participant is first determined using the seating plan received from the conference coordinator at step S40. Although the conference coordinator defined the seating plan by defining the order of the participants in a circle (step S24 in FIG. 5, and FIG. 6), at step S68 the positions of the avatars around the conference room table are set so that, when an image of the avatars and conference room table is displayed to the user, the avatars are spread apart across the width of the display screen of monitor 34. In this way, each avatar occupies its own part of the display screen in the horizontal direction and all of the avatars can be seen by the user.

FIGS. 23A, 23B, 23C, 23D and 23E illustrate how the positions of avatars are set in this embodiment for different numbers of participants in the video conference. Referring to FIGS. 23A, 23B, 23C, 23D and 23E in general, the avatars are spaced apart evenly around a semi-circle 164 in three dimensions. The diameter of the semi-circle 164 (which is the same irrespective of the number of participants in the video conference) and the viewing position from which images are rendered for display to the user are chosen so that each avatar occupies a unique position across the display screen and the outermost avatars are close to the edges of the display screen in the horizontal direction. In this embodiment, the avatars are positioned around semi-circle 164 and a viewing position is defined such that the positions at which the avatars appear in an image are shown in the table below.

TABLE 1

| NUMBER OF AVATARS DISPLAYED | POSITION OF AVATAR IN IMAGE (W = screen width) |
|---|---|
| 2 | ±0.46 W |
| 3 | 0.00 W; ±0.46 W |
| 4 | ±0.20 W; ±0.46 W |
| 5 | 0.00 W; ±0.20 W; ±0.46 W |
| 6 | ±0.12 W; ±0.34 W; ±0.46 W |

Figure 23A:
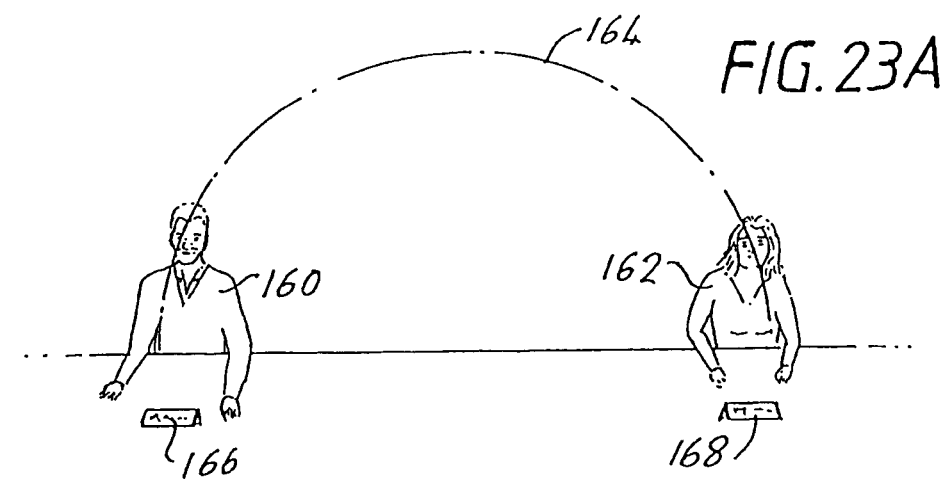

Referring to FIG. 23A, when there are three participants in the video conference, the avatars 160 and 162 for the two participants other than the user at the user station being described are positioned behind the same, straight edge of a conference room table at the ends of the semi-circle 164. As set out in the table above, avatar 160 is positioned so that it appears in an image at a distance −0.46W from the centre of the display screen in a horizontal direction, and avatar 162 is positioned so that it appears at a distance +0.46W from the centre. Name plates 166 and 168 showing the respective names of the participants are placed on the conference room table in front of the avatars facing the viewing position from which images of the conference room table and avatars will be rendered. In this way, the user, when viewing the display, can read the name of each participant.

Figure 23B:
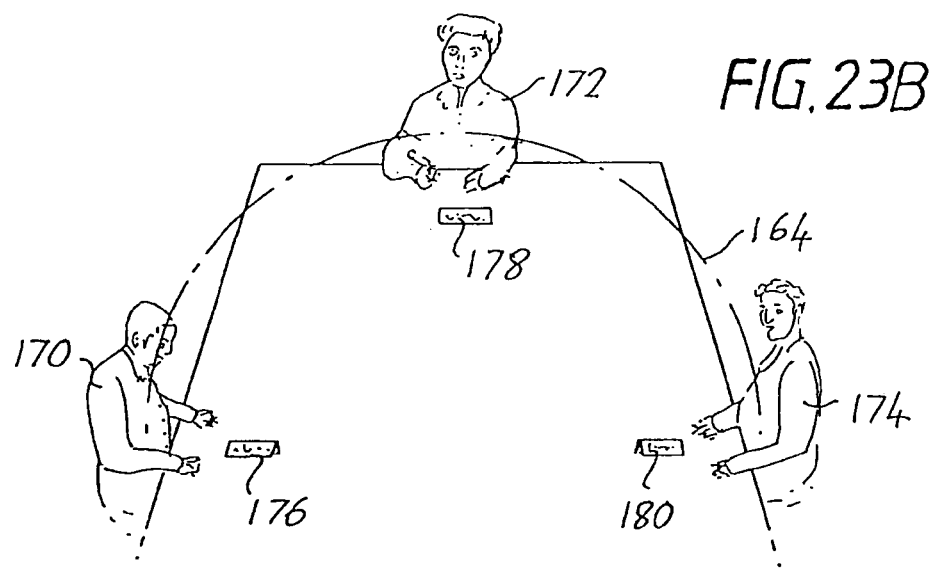

FIG. 23B shows an example in which there are four participants of the video conference and a rectangular conference room table has been selected by the conference organiser. Again, the avatars 170, 172 and 174 for the three participants other than the user at the user station are arranged around the semi-circle 164 with equal spacing. Avatar 170 is positioned so that it appears in an image at a distance −0.46W from the centre of the display screen in a horizontal direction, avatar 172 is positioned so that it appears at the centre of the display screen (in a horizontal direction), and avatar 174 is positioned so that it appears at a distance +0.46W from the centre. A name label 176, 178, 180 is placed on the conference room table facing the viewing position from which images of the conference room table and avatars will be rendered.

Figure 23C:
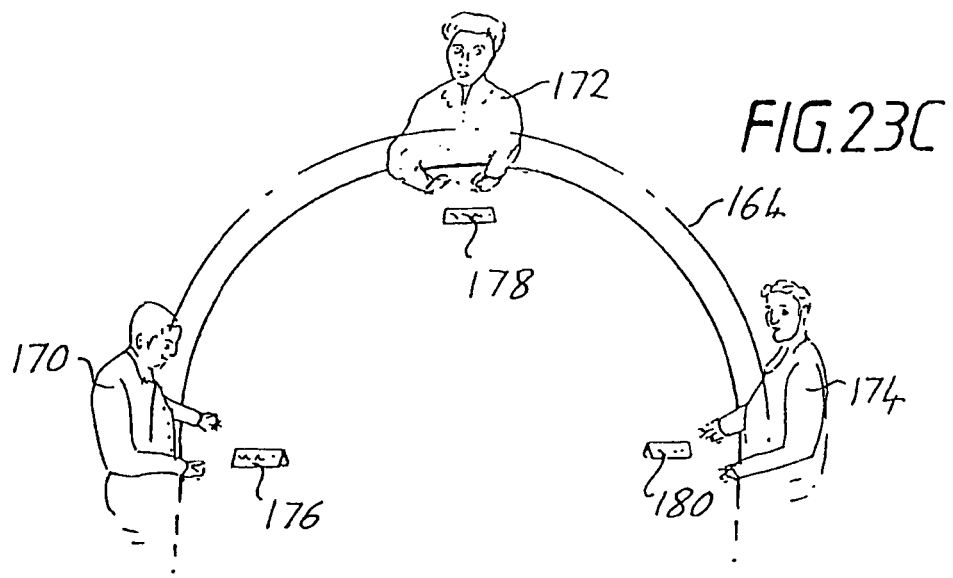

FIG. 23C shows an example in which there are four participants of the video conference, as in the example of FIG. 23B, but the conference coordinator has selected a circular conference room table. In this case, the edge of the model of the conference room table follows the semi-circle 164.

FIG. 23D shows an example in which there are seven participants in the video conference, and a rectangular conference room table is specified by the conference coordinator. The avatars 190, 192, 194, 196, 198, 200 for each of the participants other than the user at the user station are equally spaced around semi-circle 164, such that, when an image is rendered, the avatars occupy positions of −0.46W, −0.34W, −0.12W, +0.12W, +0.34W and +0.46W respectively from the centre of the display screen in a horizontal direction. A name label 202, 204, 206, 208, 210, 212 is provided for each participant facing the viewing position from which images will be rendered so that the participants' names are visible in the image displayed on monitor 34 to the user.

The relative positions and orientations of the avatars around the conference room table will be different for the participant at each user station. Referring to the seating plan shown in FIG. 6, and assuming that the user at the user station being described is participant 1, then participant 2 is to the left of the user and participant 7 is to the right of the user. Accordingly, as shown in FIG. 23D, the position of avatar 190 for participant 2 is set so that it appears on the left of the image, and the position of avatar 200 for participant 7 is set so that it appears on the right of the image.

The positions of avatars 192, 194, 196 and 198 for participants 3, 4, 5 and 6 respectively are arranged between the positions of avatars 190 and 200 in accordance with the order defined in the seating plan.

Similarly, by way of further example, the positions of the avatars would be set at the user station of participant 2 so that the order of the participants from left to right in an image is 3, 4, 5, 6, 7 and 1.

The example shown in FIG. 23E corresponds to that shown in FIG. 23D, except that a circular conference room table is specified by the conference coordinator.

Referring again to FIG. 7, at step S70, a respective transformation is defined for each participant which maps the avatar for the participant from the local coordinate system in which it was stored at step S40 into the three-dimensional computer model of the conference room created at step S68 so that the avatar appears at the correct position at the conference room table. In this step, the three-dimensional positions of the body markers 72 previously received from each participant (as transmitted at step S282 in FIG. 17) when the participant was sitting with his torso against the edge of his desk are used to determine the transformation such that the edge of the user's desk maps to the edge of the conference room table where the avatar is placed.

At step S72, data is stored, for example in memory 106, defining the relationship between each of the avatars which will be displayed to the user (that is, the avatars of the other participants) and the horizontal position on the display screen of monitor 34 at which the avatar will be displayed. As described above with respect to step S68, the avatars are positioned in the conference room model such that the position at which each avatar will appear across the display screen in a horizontal direction when an image is rendered is fixed. Accordingly, in this embodiment, data defining these fixed positions for each different number of participants is pre-stored in memory 106, and, at step S72, the data defining the fixed positions for the correct number of participants is selected and each of the fixed positions is assigned a participant number (received from the conference coordinator at step S40) defining the participant displayed at that position. More particularly, as will now be described with reference to FIG. 24, data defining a piece-wise linear function between the fixed positions of the avatars is stored and the participant numbers are associated with this data at step S72.

Figure 24:
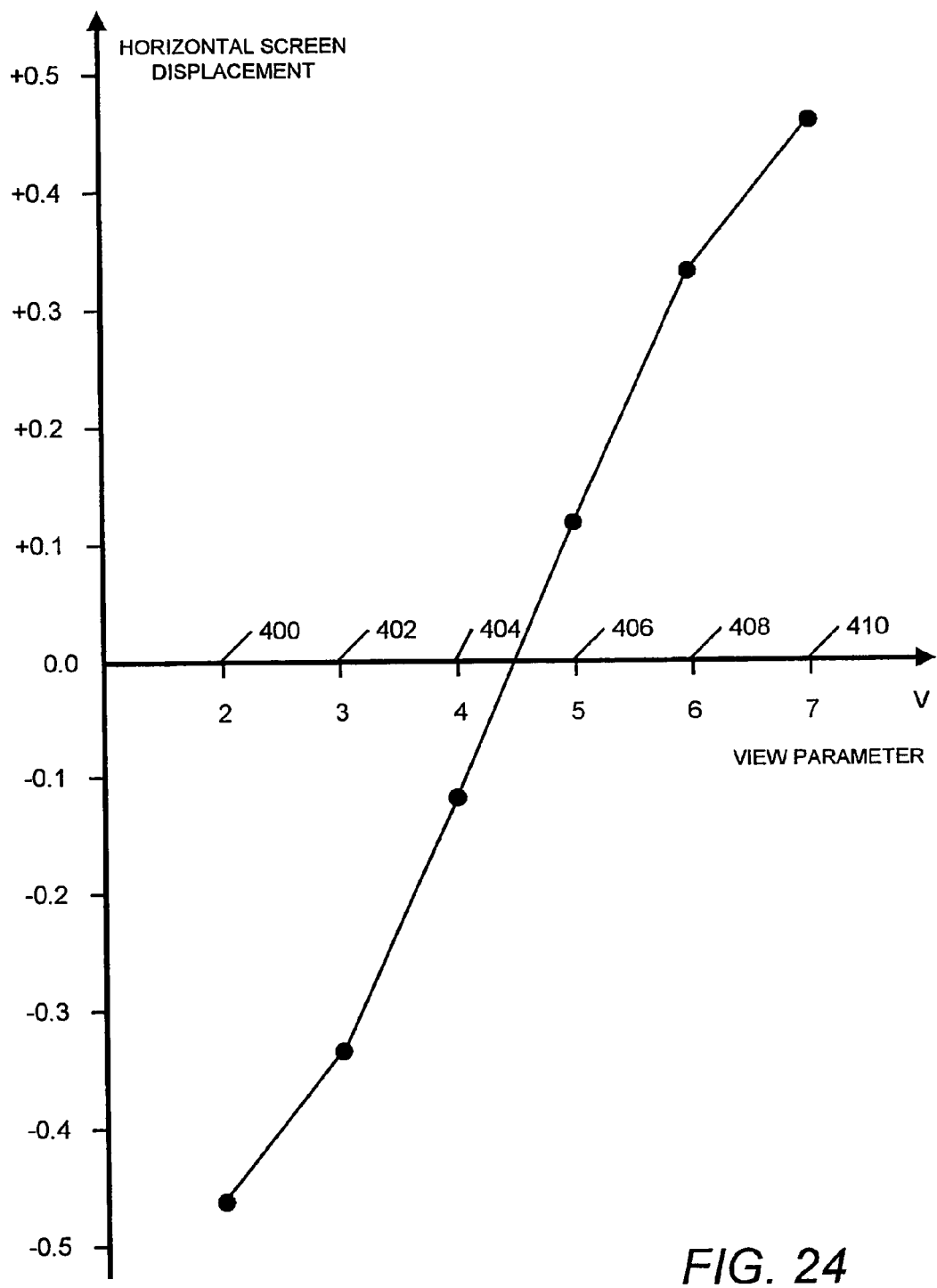
FIG. 24 shows a piece-wise linear function relating horizontal screen position to view parameter, which is stored at step S72 in FIG. 7.

Referring to FIG. 24, data for the display of six avatars is shown (corresponding to the examples described previously with respect to FIG. 23D and FIG. 23E). The vertical axis in FIG. 24 shows horizontal screen position, and values on this axis range from −0.5 (corresponding to a position on the left hand edge of the screen) to +0.5 (corresponding to a position on the right hand edge of the screen). The horizontal axis has six equally spaced divisions 400, 402, 404, 406, 408 and 410, each of which corresponds to a participant. Accordingly, the value of the function at each of these positions on the horizontal axis is −0.46, −0.34, −0.12, +0.12, +0.34 and +0.46 respectively (as shown by the dots in FIG. 24) since these are the horizontal screen positions at which the avatars for six participants will be displayed. Data is also stored defining a piece-wise linear function between each of these values. At step S72, each of the six positions on the horizontal axis is assigned a participant number corresponding to the participant whose avatar will be displayed at the associated horizontal screen position. Referring to the seating plane shown in FIG. 6, in this example, position 400 is allocated participant number 2, position 402 is allocated participant number 3, position 404 is allocated participant number 4, position 406 is allocated participant number 5, position 408 is allocated participant number 6 and position 410 is allocated participant number 7. It should be noted that the participant numbers for each of these positions will be different for each user station. By way of example, at the user station for participant 2, the participant numbers allocated to positions 400, 402, 404, 406, 408 and 410 will be 3, 4, 5, 6, 7 and 1 respectively.

As a result of allocating the participant numbers, the piece-wise linear function therefore defines, for each horizontal screen position a so-called "view parameter" V for the user which defines which participant in the conference room the user is looking at when he is looking at a particular position on the display screen of monitor 34. As will be explained below, during the video conference, processing is carried out to determine the horizontal position on the display screen which the user is looking, and this is used to read the "view parameter" V for the user, which is then transmitted to the other participants to control the user's avatar.

At step S74, a three-dimensional computer model is set-up comprising a circular conference room table and name labels showing the name of each of the participants, and is stored in the meeting archive database 126 for archive purposes. More particularly, a three-dimensional computer model of a conference room table is prestored and, in step S74, name labels showing the name of each of the participants are placed around the conference room table at equal spacing in accordance with the seating plan received from the conference coordinator at step S40.

At step S76, a respective transformation is defined for each participant which transforms the avatar for the participant from the local coordinate system within the meeting archive database 126 in which it was stored at step S40 into the three-dimensional computer model created at step S74 so that the avatar appears at the correct position at the conference room table. As in step S70, in step S76, the three-dimensional positions of the body marker 72 previously received from each participant (as transmitted at step S282 in FIG. 17) when the participant was sitting with his torso against the edge of his desk are used to determine the transformation such that the edge of the user's desk maps to the edge of the conference room table where the avatar is placed.

Referring again to FIG. 7, at step S78, when all of the preceding steps in FIG. 7 have been completed, a "ready" signal is transmitted to the conference coordinator indicating that the user station has been calibrated and is now ready to start the video conference.

Referring again to FIG. 4, at step S8, the video conference itself is carried out.

Figure 25:
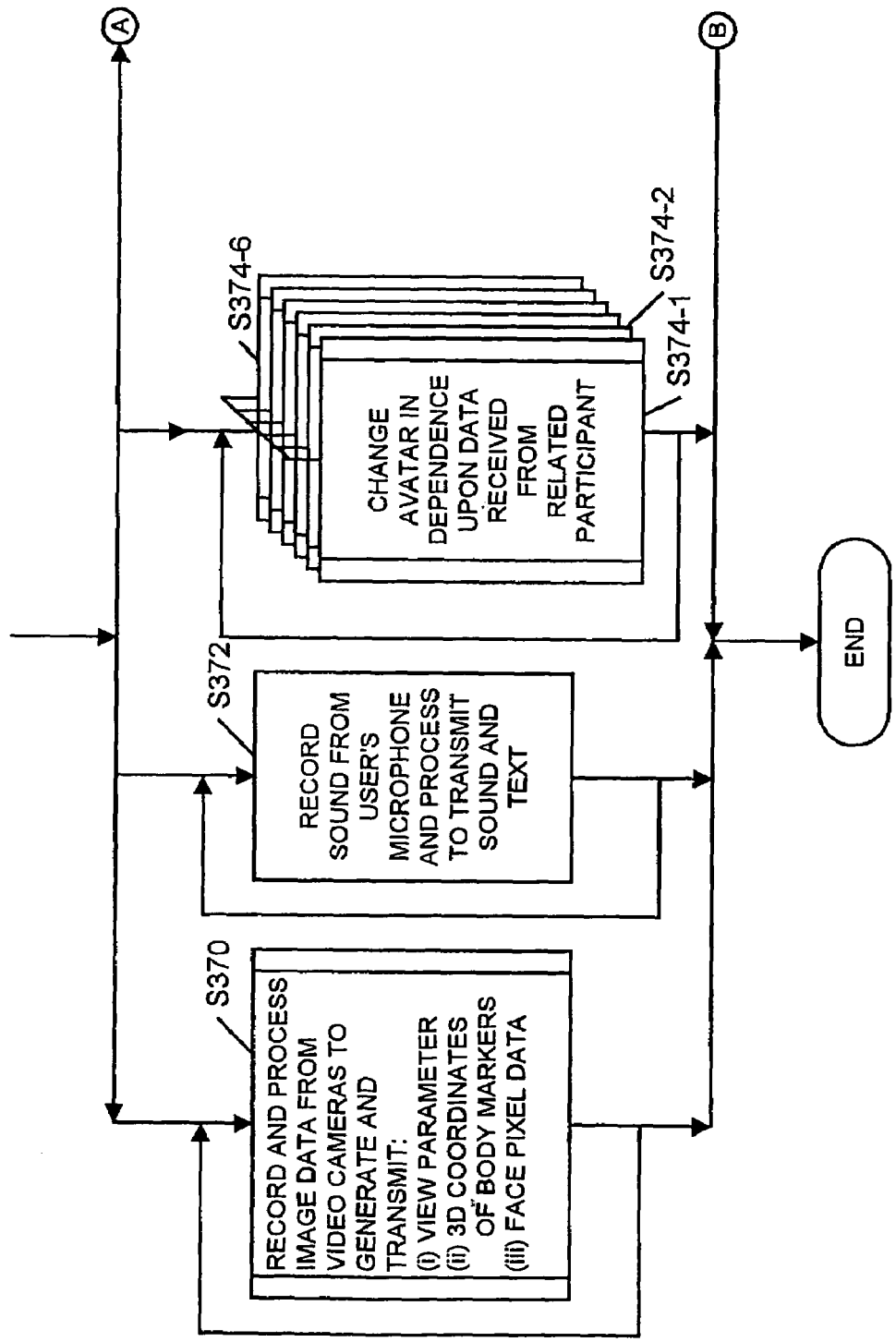
FIGS. 25A and 25B show the processing operations performed at step S8 in FIG. 4.
Figure 25:
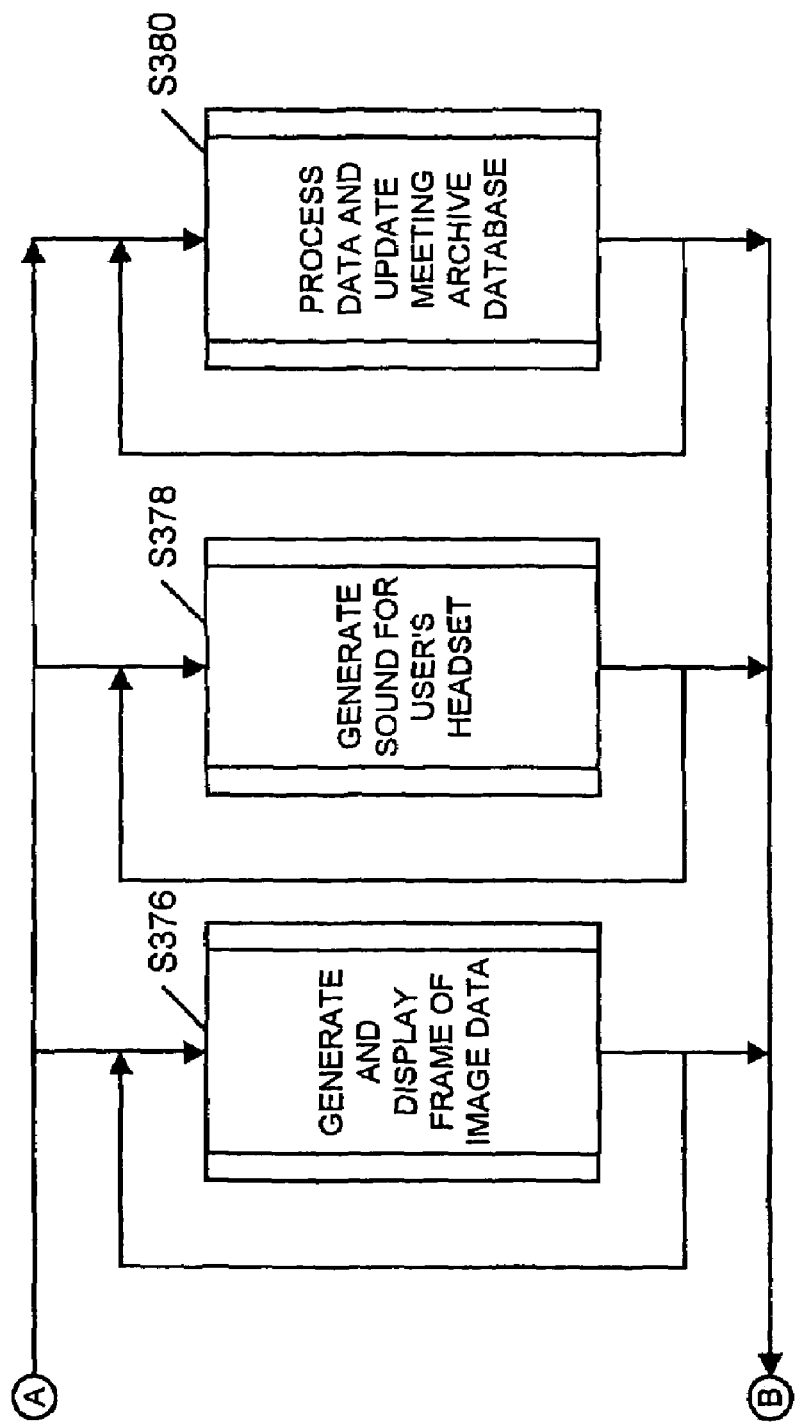

FIG. 25 shows the processing operations which are performed to carry out the video conference.

Referring to FIG. 25, the processes at steps S370, S372, S374-1 to S374-6, S376, S378 and S380 are carried out simultaneously and repeatedly.

At step S370, frames of image data are recorded by cameras 26 and 28 as the user participates in the video conference, that is as the user views the images of the avatars of the other participants on monitor 34, listens to the sound data from the other participants and speaks into microphone 52. Synchronous frames of image data (that is, one frame from each camera which were recorded at the same time) are processed by image data processor 104 at video frame rate to generate in real-time data defining the three-dimensional coordinates of the body markers 70, 72, the view parameter V defining where the user was looking in the conference room when the images were recorded, and pixel data for the face of the user. This data is then transmitted to all of the other participants. Step S370 is repeated for subsequent pairs of frames of image data until the video conference ends.

Figure 26:
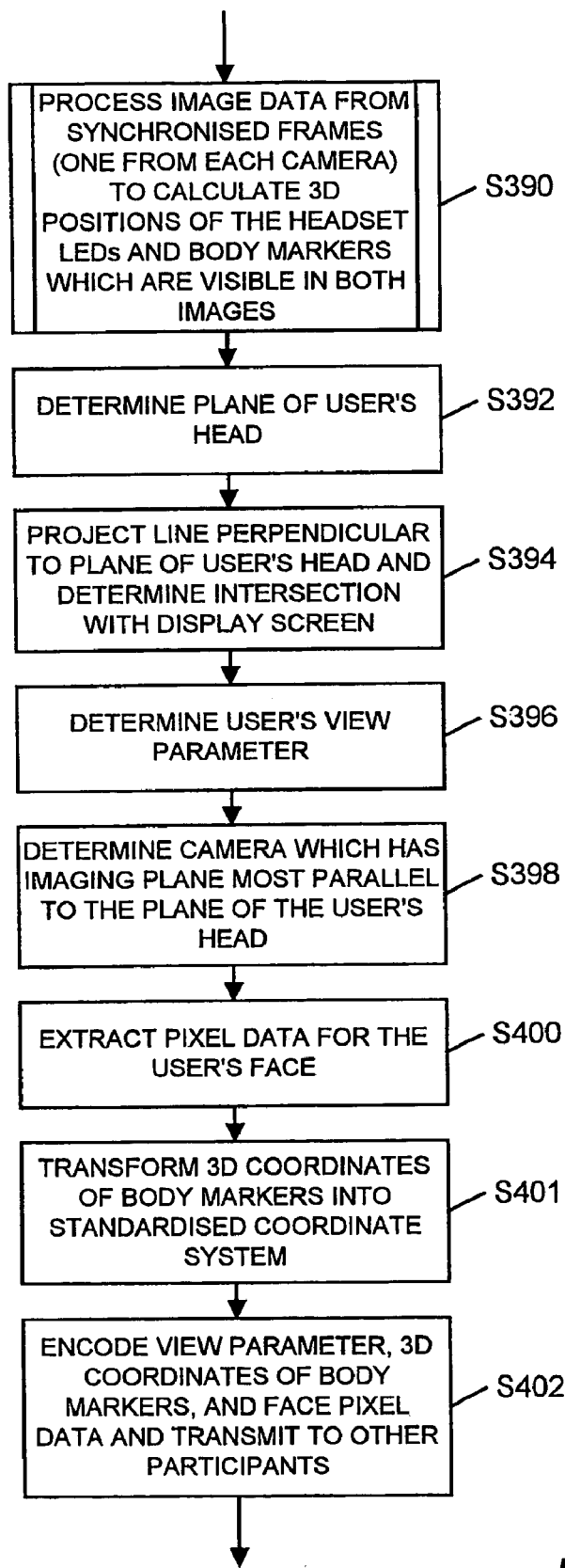
FIG. 26 shows the processing operations performed at step S370 in FIG. 25.

FIG. 26 shows the processing operations performed at step S370 for a given pair of synchronised frames of image data.

Referring to FIG. 26, at step S390, synchronous frames of image data are processed to calculate the three-dimensional coordinates of the headset LEDs 56, 58, 60, 62, 64 and body markers 70, 72 which are visible in both of the images. This step is carried out in the same way as step S234 in FIG. 14, and described above with respect to FIGS. 15 and 16, except that the processing is performed for the body markers 70, 72 in addition to the headset LEDs. Accordingly, this processing will not be described again here.

At step S392, the plane of the user's head is determined by finding the plane which passes through the three-dimensional positions of the headset LEDs calculated at step S390 and adjusting this plane by the headset offset angle $\theta$ previously determined at step S64 (FIG. 7).

At step S394, a line is projected from the plane of the user's head in a direction perpendicular to this plane, and the intersection of the projected line with the display screen of monitor 34 is calculated. This is illustrated in FIGS. 27A, 27B and 27C.

Figure 27A:
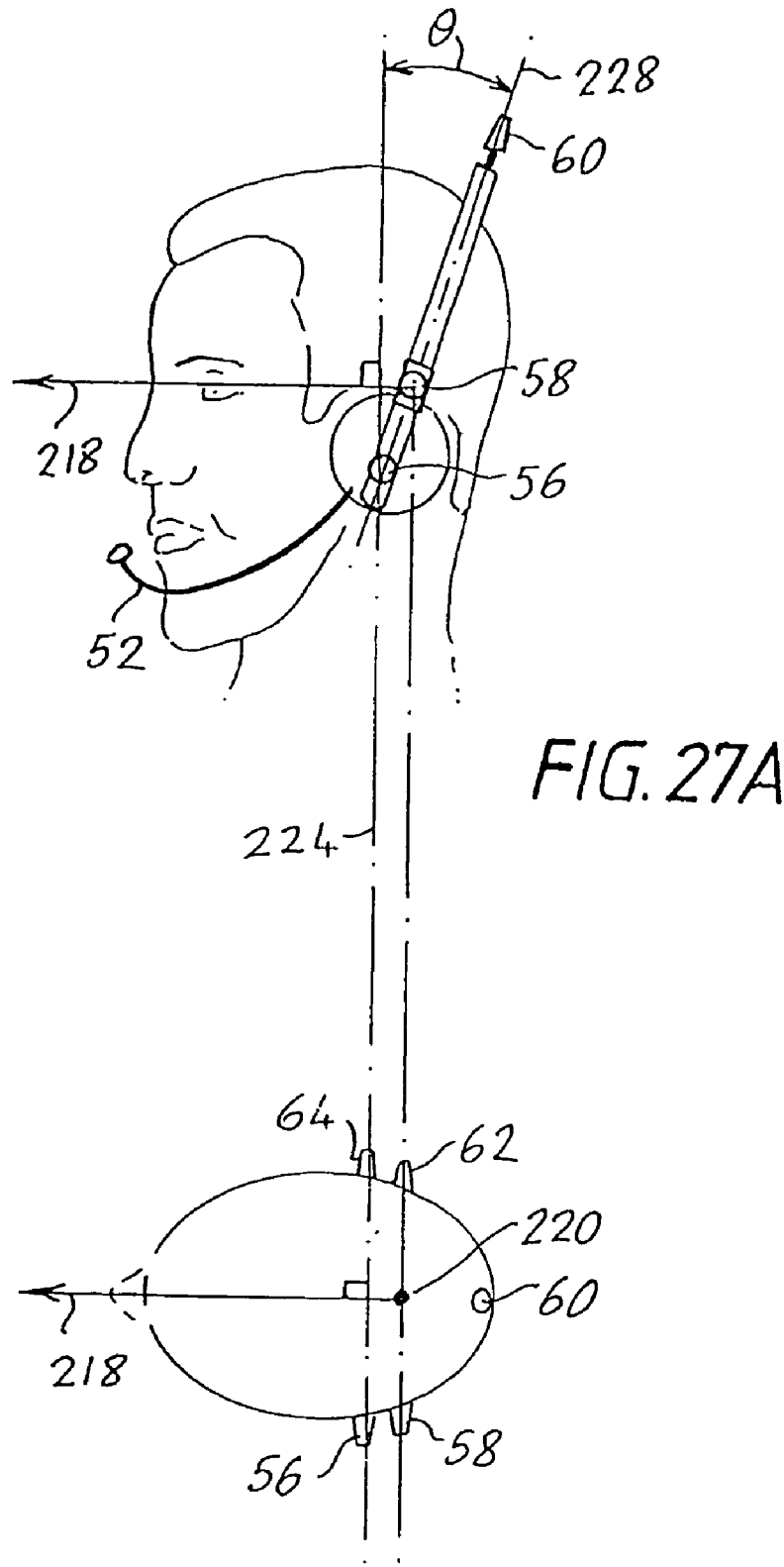
FIGS. 27A, 27B and 27C illustrate the calculation at step S394 in FIG. 26 of the point at which the user is looking by projecting a line from the plane of the user's head and determining the intersection of the line with the display screen.

Referring to FIG. 27A, in this embodiment, the mid-point 220 of the line between the three-dimensional coordinates of the headset LEDs 58 and 62 is determined and a line 218 is projected from the calculated mid-point 220 perpendicular to the plane 224 of the user's head (which was calculated at step S392 by determining the plane 228 of the headset LEDs and adjusting this by the headset offset angle $\theta$). As described above with respect to step S50 (FIG. 7), the headset LEDs 58 and 62 are aligned with the user's eyes so that, in this embodiment, the projected line 218 is not only perpendicular to the plane 224 of the user's head, but also passes through a point on this plane representative of the position of the user's eyes.

Figure 27B:
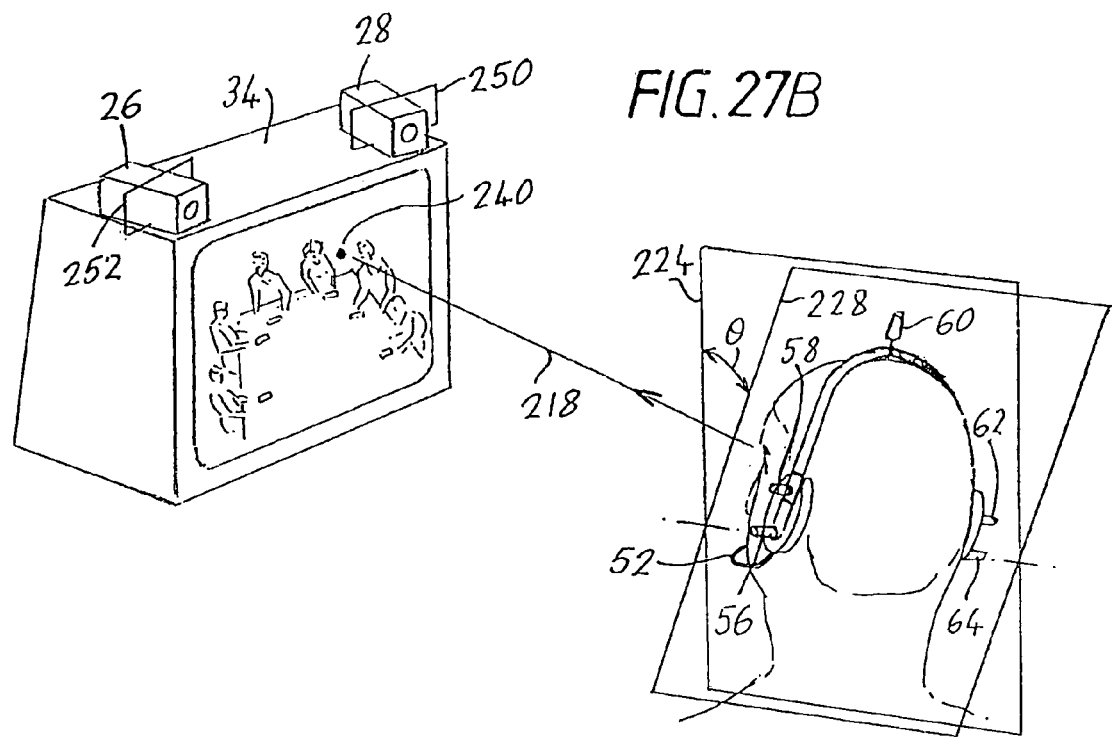
Figure 27C:
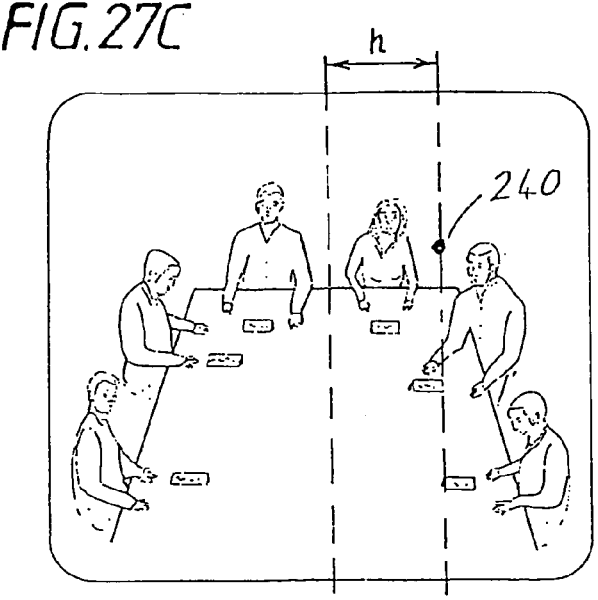

Referring to FIG. 27B, the projected line 218 intersects the plane of the display screen of monitor 34 at a point 240. In step S394, the horizontal distance "h" shown in FIG. 27C of the point 240 from the centre of the display screen (that is, the distance between the vertical line in the plane of the display screen on which point 240 lies and the vertical line in the plane of the display screen on which the centre point of the display lies) is calculated using the three-dimensional coordinates of the display screen previously determined at step S66 (FIG. 7) during calibration.

Referring again to FIG. 26, at step S396, the view parameter V defining where the user was looking when the frames of image data being processed were recorded is determined. More particularly, the ratio of the distance "h" calculated at step 5394 to the width "W" of the display screen stored at step 548 (FIG. 7) is calculated and the resulting value is used to read a value for the view parameter V from the data stored at step S72 during calibration. By way of example, if the distance "h" is calculated to be 2.76 inches and the width "W" of the display screen is 12 inches (corresponding to a 15 inch monitor), then a ratio of 0.23 would be calculated and, referring to FIG. 24, this would cause a view parameter "V" of 5.5 to be generated. As can be seen from the example shown in FIGS. 27B and 27C, the projected ray 218 indicates that the user 44 is looking between participants 5 and 6, and hence a view parameter of 5.5 would define this position.

Referring again to FIG. 26, at step S398, the direction of the imaging plane of each of the cameras 26 and 28 (that is, the plane in which the CCD of the camera lies) is compared with the direction of the plane of the user's head calculated at step S392 to determine which camera has an imaging plane most parallel to the plane of the user's head. Referring again to FIG. 27B, for the example illustrated, it will be seen that the imaging plane 250 for camera 28 is more parallel to the plane 224 of the user's head than the imaging plane 252 of camera 26. Accordingly, in the example illustrated in FIG. 27B, camera 28 would be selected at step S398.

At step S400, the frame of image data from the camera selected at step S398 is processed to extract the pixel data representing the user's face in the image. In this embodiment, this step is performed using the three-dimensional positions of the headset LEDs 56 and 64 calculated at step S390, the size and ratio of the user's head determined at step S60 (FIG. 7) and the distance "a" between each LED 56, 64 and the inner surface of the corresponding earpiece 48, 50 (which, as noted above, is pre-stored in PC 24). More particularly, using the three-dimensional positions of the headset LEDs 56 and 64, and the distance "a", the points representing the extents of the width of the user's head in three dimensions are determined. These extent points are then projected back into the image plane of the camera selected at step S398 using the camera transformation determined at step S62 (FIG. 7). The projected points represent the extents of the width of the user's head in the image, and, using the value of this width and the ratio of the user's head length, the extents of the user's head length in the image are determined. Pixels representing the image between the extents of the width of the user's head and the extents of the length of the user's head are then extracted. In this way, image data is not extracted which shows the headset 30 which the user is wearing.

At step S401, the three-dimensional coordinates of the body markers 70, 72 calculated at step S390 are transformed into the standardised coordinate system previously defined at step S66 in FIG. 7.

At step 5402, MPEG 4 encoder 108 encodes the face pixel data extracted at step S400, the 3D coordinates of the body markers 70, 72 generated at step 5401 and the view parameter determined at step S396 in accordance with the MPEG 4 standard. More particularly, the face pixel data and the 3D coordinates are encoded as a Movie Texture and Body Animation Parameter (BAP) set and, since the MPEG 4 standard does not directly provide for the encoding of a view parameter, this is encoded in a general user data field. The encoded MPEG 4 data is then transmitted to the user stations of each of the other participants via input/output interface 110 and the Internet 20.

Referring again to FIG. 25, at step S372, sound produced by user 44 is recorded with microphone 52 and encoded by MPEG 4 encoder 108 in accordance with the MPEG 4 standard. In addition, the text corresponding to the user's speech generated by voice recognition processor 107 is also encoded as a text stream in accordance with the MPEG 4 standard. The encoded sound and text is then transmitted to the other participants by input/output interface 110 and the Internet 20.

At steps S374-1 to S374-6, MPEG decoder 112, model processor 116 and central controller 100 perform processing to change the avatar models stored in avatar and 3D conference model store 114 in dependence upon the MPEG 4 encoded data received from the other participants. More particularly, in step S374-1 processing is performed to change the avatar of the first external participant using the data received from that participant, in step S374-2 the avatar of the second external participant is changed using data received from the second external participant etc. Steps S374-1 to S374-6 are performed simultaneously, in parallel.

Figure 28:
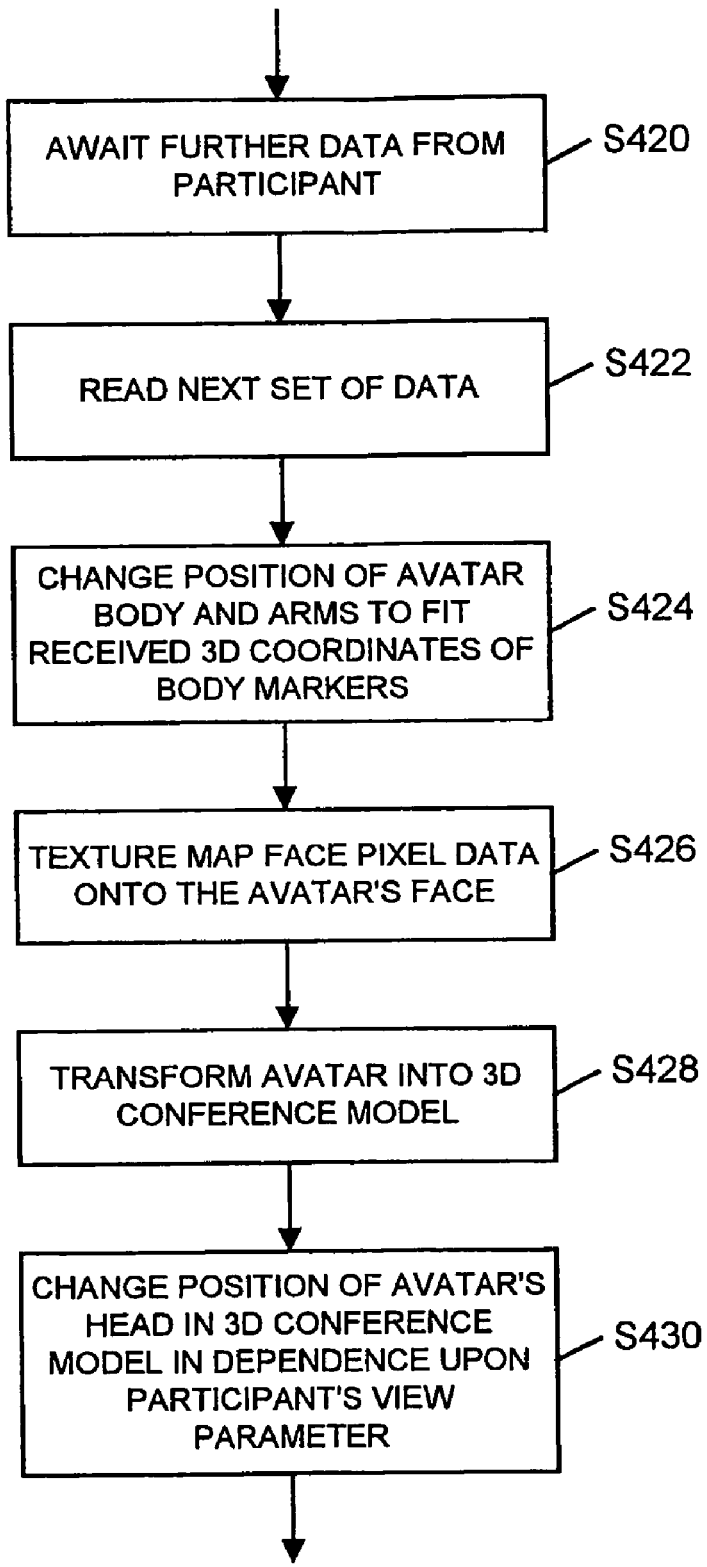
FIG. 28 shows the processing operations performed in each of steps S374-1 to S374-6 in FIG. 25.

FIG. 28 shows the processing operations performed in each of steps S374-1 to S374-6.

Referring to FIG. 28, at step S420, MPEG 4 decoder 112 awaits further data from the participant whose avatar is to be updated. When data is received, it is decoded by the MPEG 4 decoder, and the decoded data is then passed to model processor 116 at step S422, where it is read to control subsequent processing by model processor 116 and central controller 100.

At step S424, the position of the avatar body and arms are changed in the three-dimensional coordinate system in which it is stored in avatar and 3D conference model store 114 so that the body and arms of the avatar fit the received three-dimensional coordinates of the body markers 70, 72 of the actual participant. In this way, the pose of the avatar is made to correspond to the real-life pose of the actual participant which the avatar represents.

At step S426, the face pixel data in the bitstream received from the participant is texture mapped onto the face of the avatar model in three dimensions.

At step S428, the avatar is transformed from the local coordinate system in which it is stored into the three-dimensional model of the conference room using the transformation previously defined at step S70 (FIG. 7).

At step S430, the head of the transformed avatar in the three-dimensional conference room model is changed in dependence upon the view parameter, V, of the participant defined in the received bitstream. More particularly, the head of the avatar is moved in three dimensions so that the avatar is looking at the position defined by the view parameter. For example, if the view parameter, V, is 5, then the avatar's head is moved so that the avatar is looking at the position in the three-dimensional conference room at which participant 5 is seated. Similarly, if, for example, the view parameter is 5.5, then the avatar's head is rotated so that the avatar is looking mid-way between the positions at which the fifth and sixth participants sit in the three-dimensional conference room.

Figure 29A:
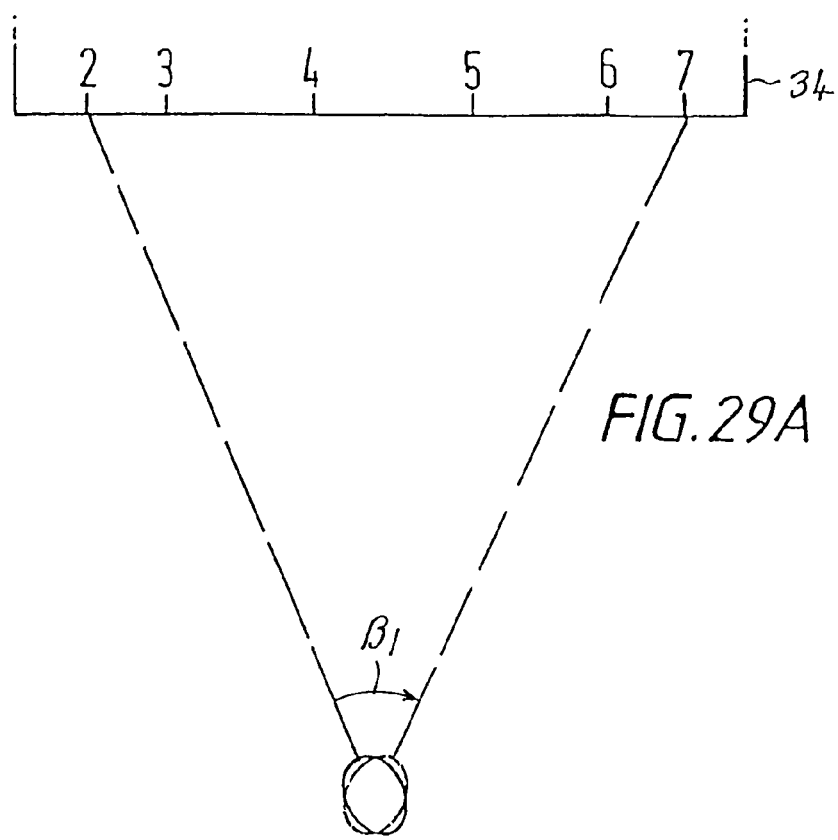
FIGS. 29A, 29B and 29C illustrate how the position of an avatar's head is changed in dependence upon changes of the corresponding participant's head in real-life at step S430 in FIG. 28.
Figure 29B:
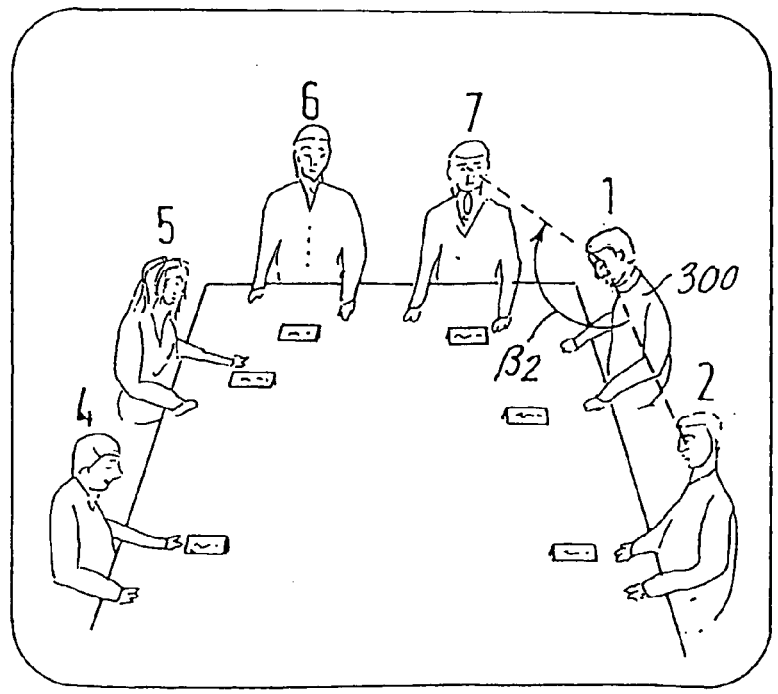
Figure 29C:
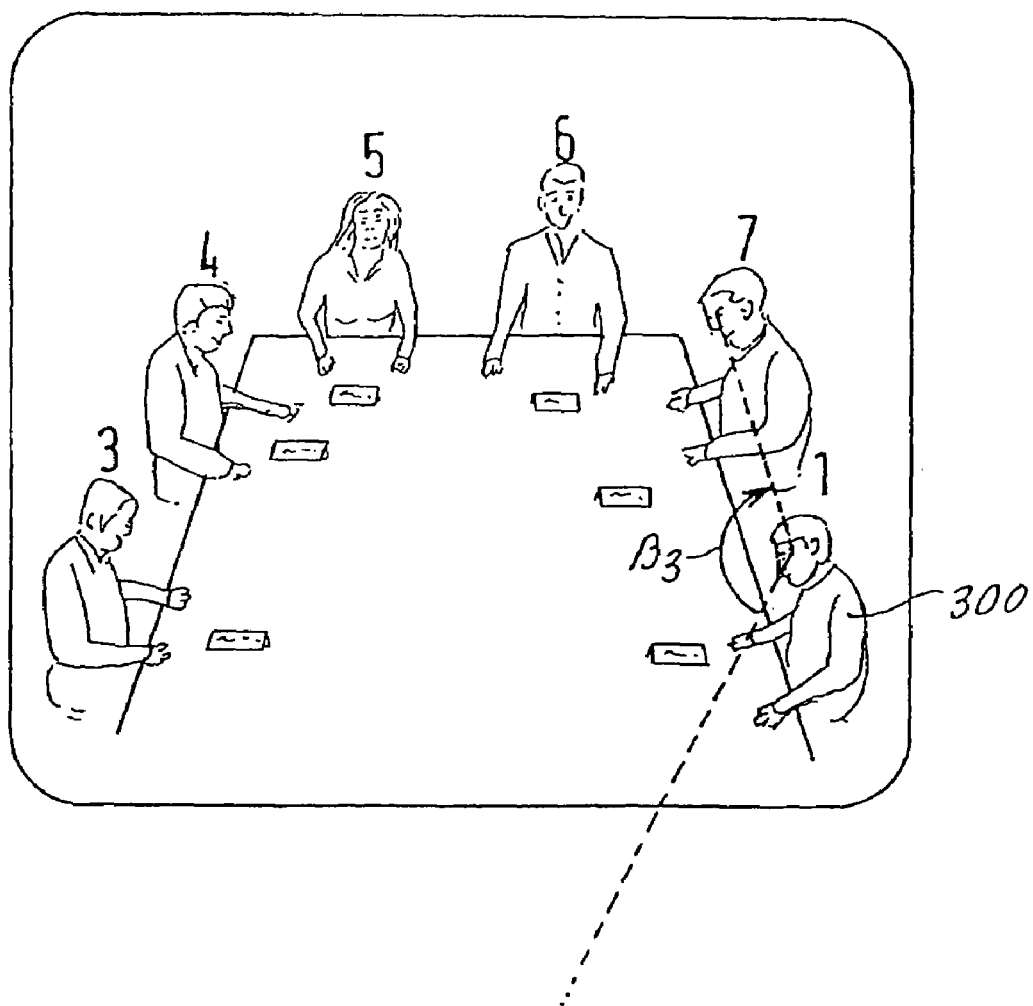

FIGS. 29A, 29B and 29C illustrate how the position of the avatar's head is changed in the conference room model in dependence upon changes of the participant's head in real-life.

Referring to FIG. 29A, an example is shown in which participant 1 in real-life is initially looking at participant 2 (or more particularly, the avatar of participant 2) on the display screen of his monitor, and then rotates his head through an angle β1 to look at participant 7 on the display screen. In real-life, the angle of rotation β1 would be approximately 20°–30° for typical screen sizes and seating positions from the screen.

FIG. 29B represents the images seen by participant 3 of the video conference. When the head of participant 1 in real-life is looking at participant 2, then the head of the avatar 300 of participant 1 is positioned so that it, too, is looking at the avatar of participant 2 in the three-dimensional model of the conference room stored at the user station of participant 3. As the first participant rotates his head in real-life to look at participant 7, the head of the avatar 300 undergoes a corresponding rotation to look at the avatar of participant 7 in the three-dimensional conference room model. However, the angle β2 through which the head of avatar 300 moves is not the same as angle β1 through which the head of the first participant moves in real-life. In fact, in this example, the angle β2 is much larger than the angle β1 due to the relative positions of the avatars in the conference room model. Consequently, the motion of the heads of the avatars does not take place in the same coordinate system as that of the motion of the heads of the actual participants in real-life.

The change in angle of the head of avatar 300 will be different for each user station since the arrangement of the avatars in the three-dimensional conference room model is different at each user station. FIG. 29C illustrates how the head of avatar 300 moves in the image displayed at the user station of participant 2 as participant 1 moves his head in real-life through the angle β1 to look from participant 2 to participant 7. Referring to FIG. 29C, since participant 1 is originally looking at participant 2, the head of avatar 300 is originally directed towards the viewing position from which the image is rendered for display to participant 2. As participant 1 rotates his head through angle β1 in real-life, the head of avatar 300 is rotated through angle β3 so that the head is looking at the avatar of participant 7 in the three-dimensional model of the video conference room stored at the user station of participant 2. The angle β3 is different to both β1 and β2.

Referring again to FIG. 25, at step S376, image renderer 118 and central controller 100 generate and display a frame of image data on monitor 34 showing the current status of the three-dimensional conference room model and the avatars therein. The processing performed at step S376 is repeated to display images at video rate, showing changes as the avatars are updated in response to changes of the participants in real-life.

Figure 30:
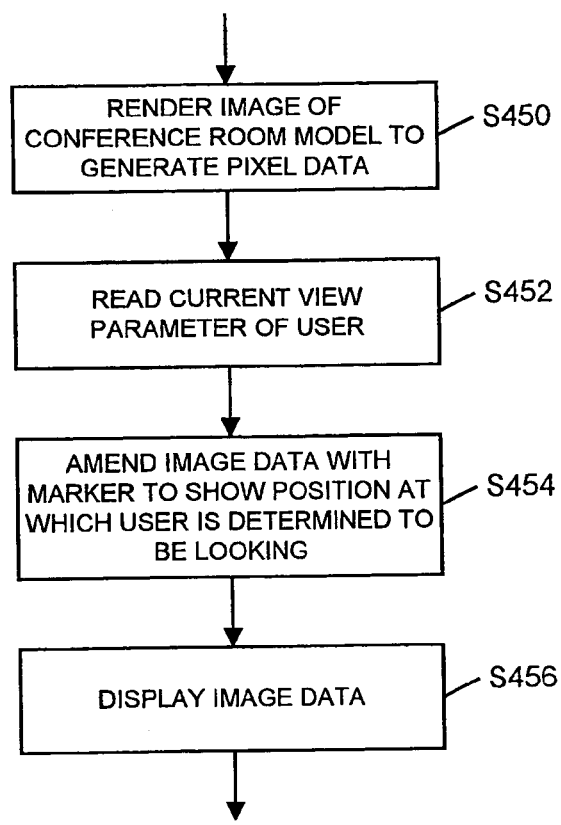
FIG. 30 shows the processing operations performed at step S376 in FIG. 25.

FIG. 30 shows the processing operations performed at step S376.

Referring to FIG. 30, at step S450, an image of the three-dimensional conference room model stored in avatar and 3D conference model store 114 is rendered in a conventional manner to generate pixel data, which is stored in frame buffer 120.

At step 5452, the current view parameter V determined at step S370 in FIG. 25 (which occurs in parallel) is read. As noted above, this view parameter defines the position on the monitor at which the user is determined to be looking, relative to the avatars displayed.

At step 5454, the image data generated and stored at step S450 is amended with data for a marker to show the position at which the user is determined to be looking in accordance with the view parameter read at step 5452.

At step 5456, the pixel data now stored in frame buffer 120 is output to monitor 34 to display an image on the display screen.

Figure 31:
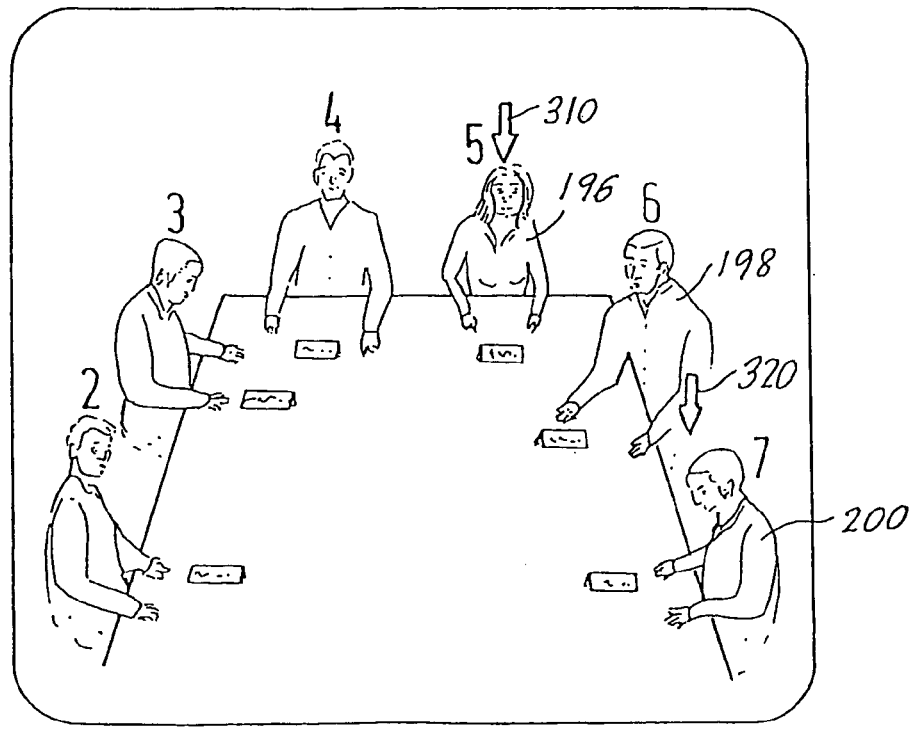
FIG. 31 illustrates examples of markers displayed in images at steps S454 and S456 in FIG. 30.

FIG. 31 illustrates the display of markers in accordance with the users current view parameter V.

Referring to FIG. 31, if for example it is determined at step S452 that the users current view parameter is 5, then at step S454, image data for arrow 310 is added so that, when the image is displayed at step S456, the user sees arrow 310 indicating that he is determined to be looking at participant 5 and that this is the information which will be transmitted to all of the other participants. Accordingly, if the displayed marker does not accurately indicate the user's intended viewing direction, the user can change the position of his head whilst watching the position of the marker change until the correct viewing direction is determined and transmitted to the other users.

By way of further example, if the user's view parameter is 6.5, then arrow 320 would be displayed (instead of arrow 310) indicating a position mid-way between the avatars of participants 6 and 7.

Referring again to FIG. 25, at step S378, MPEG 4 decoder 112, central controller 100 and sound generator 122 perform processing to generate sound for the user's headset 30.

Figure 32:
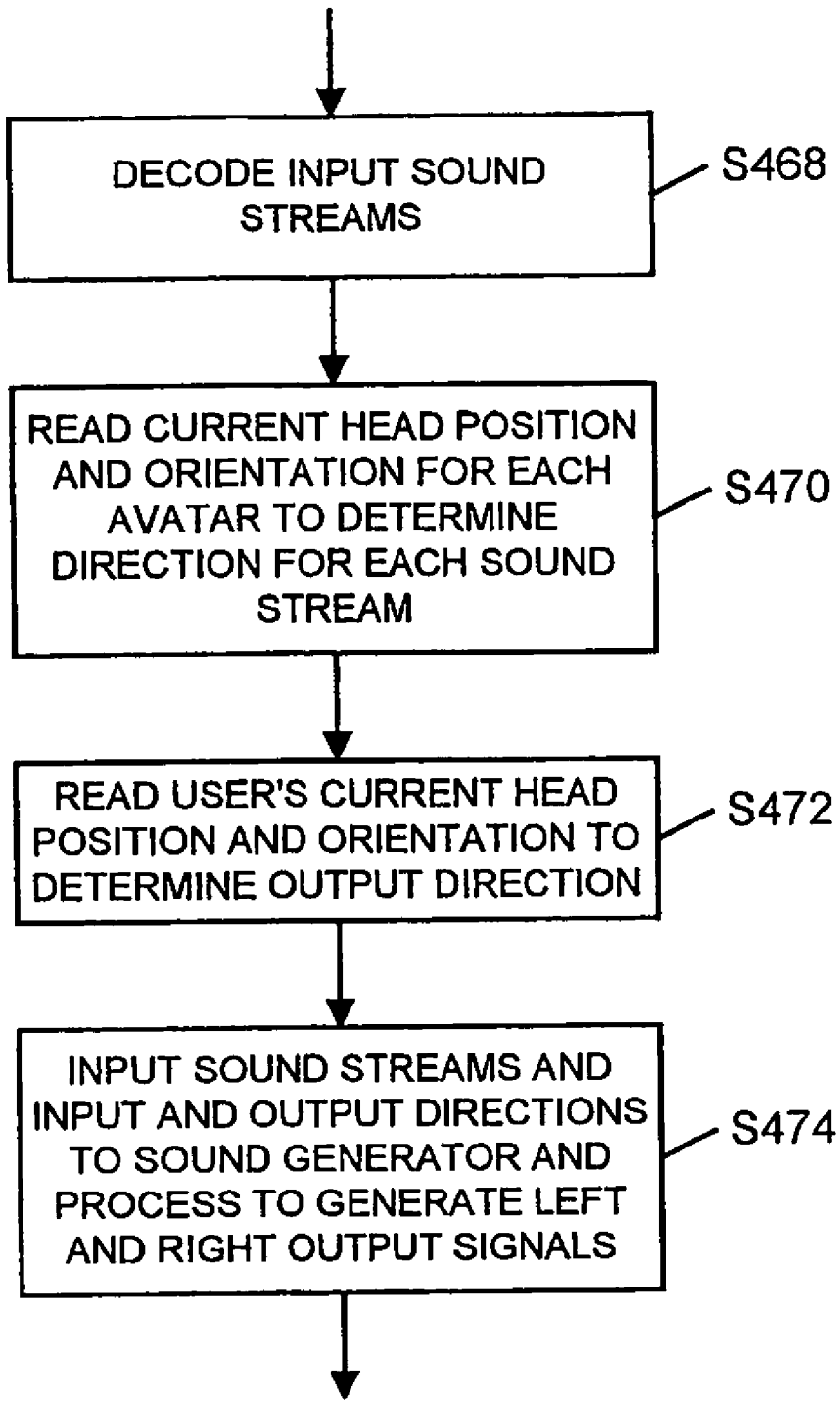
FIG. 32 shows the processing operations performed at step S378 in FIG. 25.

FIG. 32 shows the processing operations performed at step S378.

Referring to FIG. 32, at step S468 the input MPEG 4 bitstreams received from each participant are decoded by MPEG 4 decoder 112 to give a sound stream for each participant.

At step 5470, the current head position and orientation for each avatar in the coordinate system of the three-dimensional computer model of the conference room are read, thereby determining a sound direction for the sound for each of the avatars.

At step S472, the current head position and orientation of the user (to whom the sound will be output) is read (this having being already determined at step 5370 in FIG. 25), thereby defining the direction for which the output sound is to be generated.

At step S474, the input sound streams decoded at step S468, the direction of each sound stream determined at step S470 and the output direction for which sound is to be generated determined at step S472 are input to the sound generator 122, where processing is carried out to generate left and right output signals for the user's headset 30. In this embodiment, the processing in sound generator 122 is performed in a conventional manner, for example such as that described in "The Science of Virtual Reality and Virtual Environments" by R. S. Kalawsky, Addison-Wesley Publishing Company, ISBN 0-201-63171-7, pages 184–187.

In the processing described above, at step S472, the user's current head position and orientation are used to determine an output direction which is subsequently used in the processing of the sound streams at step S474. In this way, the sound which is output to the headset 30 of the user changes in dependence upon the user's head position and orientation, even though the images which are displayed to the user on monitor 34 do not change as his head position and orientation change (other than the displayed marker indicating where the user is looking).

Referring again to FIG. 25, at step S380, archive processor 124 and central controller 100 process the decoded MPEG 4 bitstreams received from each of the other participants and also the user's own decoded MPEG 4 bitstream to update the data stored in the meeting archive database 126.

FIG. 33 shows the processing operations performed at step S380.

Referring to FIG. 33, at step S500, archive processor 124 and central controller 100 use the decoded view parameter and the 3D coordinates of the body markers from each decoded MPEG 4 bitstream to update the three-dimensional computer model stored in the meeting archive database 126.

Figure 34:
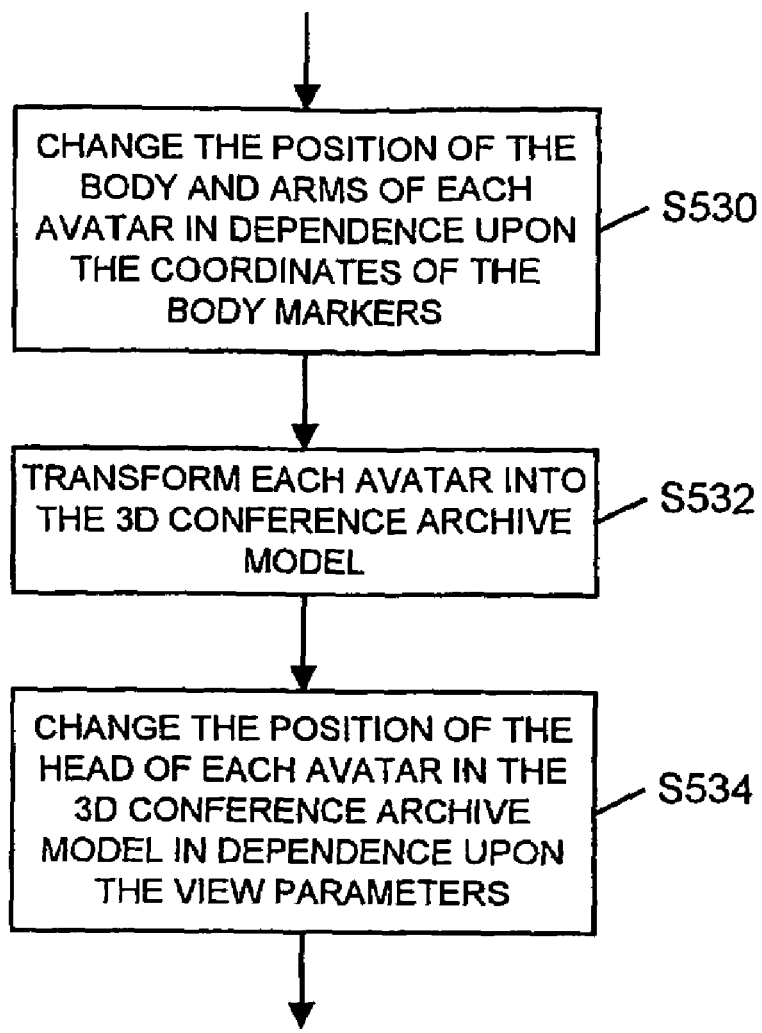
FIG. 34 shows the processing operations performed at step S500 in FIG. 33.

FIG. 34 shows the processing operations performed at step S500.

Referring to FIG. 34, at step 5530, the position of the body and arms of each avatar are changed in the respective three-dimensional coordinate systems in which they were stored in meeting archive database 126 so that the body and arms of the avatars fit the received three-dimensional coordinates of the body markers 70, 72 of the actual participants. In this way, the pose of each avatar is made to agree with the real-life pose of the corresponding actual participant.

Figure 35:
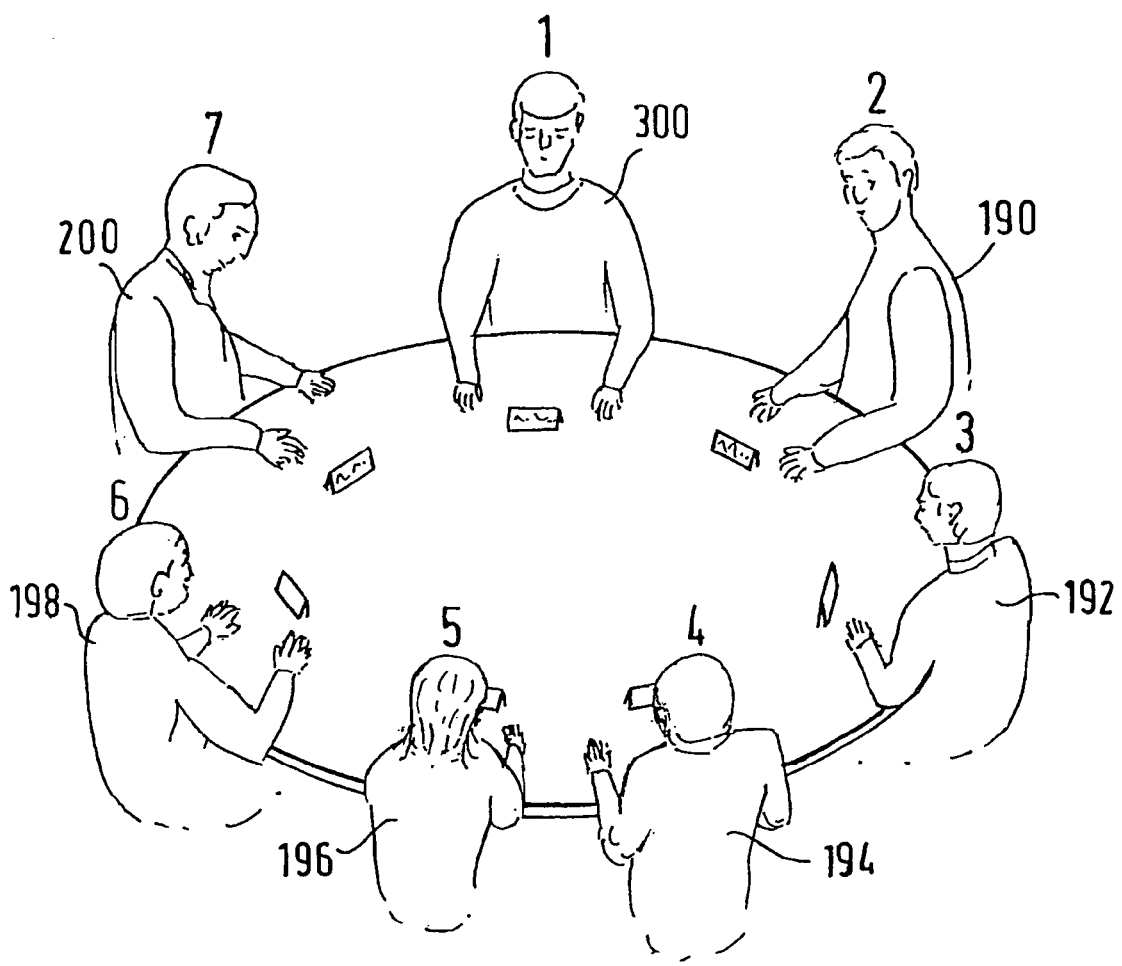
FIG. 35 illustrates the three-dimensional computer model of the conference, including the participants' avatars, which is updated at step S500 in FIG. 33.

At step S532, each avatar is transformed from its own local coordinate system into the three-dimensional conference model using the transformations previously calculated at step S76 (FIG. 7). This results in a three-dimensional computer model in which the avatars of the participants are spaced evenly around a circular conference room table in the seating order defined in the data received from the conference coordinator at step S40 (FIG. 7). An example of such a model is shown in FIG. 35.

At step S534, the head of each transformed avatar in the three-dimensional conference model is changed in dependence upon the associated view parameter, V, defined in the received bitstream. More particularly, the head of each avatar is moved in three-dimensions so that the avatar is looking at the position defined by the view parameter.

Referring again to FIG. 33, at step S502, data defining the updated meeting model produced at step S500, the face pixel data for each participant from the decoded MPEG 4 bitstreams and the sound data of each participant from the decoded MPEG 4 bitstreams is encoded as MPEG 4 data and stored in the meeting archive database 126.

FIGS. 36A and 36B schematically illustrate the storage of data in meeting archive database 126. The storage structure shown in FIGS. 36A and 36B is notional and is provided for illustration purposes only to assist understanding; it does not necessarily represent the exact way in which data is stored in meeting archive database 126.

Referring to FIGS. 36A and 36B, meeting archive database 126 stores data 480 defining the relationship between participant number and participant name, and data 490 comprising an archive record of the video conference. The data 490 includes timing information represented by the horizontal axis 500, on which each unit represents a predetermined amount of time, for example one frame of MPEG 4 data. The updated meeting model, face pixel data and sound data encoded at step S402 is stored as MPEG 4 data 502 in the database, together with timing information (this timing information being schematically represented in FIG. 36B by the position of the MPEG 4 data 502 along the horizontal axis 500).

Referring again to FIG. 33, at step S504, the view parameter, V, of each participant is quantised. More particularly, in this embodiment, the quantisation is carried out such that, if a viewing parameter is within 0.25 of a participant number, then the viewing parameter is quantised to be equal to the viewing participant number, otherwise it is determined that the corresponding participant is not looking at any of the other participants in particular, and accordingly the viewing parameter is set to "0". That is, quantisation is performed using the following equations:

$$i-0.25 \leq V \leq i+0.25 \text{ then set } V \quad (11)$$

$$\text{Otherwise set } V=0 \quad (12)$$

where "i" is an integer participant number (i=1, 2, 3, . . . ).

At step S506, the decoded text stream of each participant is checked to determine whether any text is present, indicating that the participant is speaking, and, at step S508, the quantised viewing parameter produced at step S504 is stored for each participant that is speaking for subsequent analysis, for example in cache memory.

At step S510, the decoded text data for each participant is stored in the meeting archive database 126 (indicated at 504 in FIG. 36B). As will be appreciated, however, there will not be any text data for storage from participants who are not speaking. In the example shown in FIG. 36B, text is stored for the first five time slots for participant 1 (indicated at 506), for the seventh to twelfth time slots for participant 4 (indicated at 508), and for the eleventh to twentieth time slots for participant 5 (indicated at 510). No text is stored for participants 2, 3, 6 and 7 since none of these participants spoke during the time slots in the example shown in FIG. 36B.

At step S512, the quantised viewing parameters calculated at step S504 are stored in the meeting archive database 126. Referring to FIG. 36B, the stored quantised viewing parameters are indicated at 512. For each participant, a quantised viewing parameter is stored for each time slot. Thus, referring to the quantised viewing parameters of participant 1 by way of example, the parameters indicate that participant 1 was looking at participant 3 during the first two time slots, participant 4 for the next three time slots, and at none of the other participants for the following two time slots etc.

At step S514, central controller 100 and archive processor 124 determine whether one or more of the participants has stopped speaking. In this embodiment, this check is performed by examining the text data 504 to determine whether text data for a given participant was present for the previous time slot, but is not present for the current time slot. If this condition is satisfied for any participant (that is, a participant has stopped speaking), then, at step S516, the quantised viewing parameter values previously stored at step S508 are processed for each participant which has stopped speaking to generate data defining a viewing histogram. More particularly, the quantised viewing parameters for the period in which the participant was speaking are processed to generate data defining the percentage of time during that period that the speaking participant was looking at each of the other participants.

FIGS. 37A, 37B and 37C show the viewing histograms corresponding to the periods of text 506, 508 and 510 in FIG. 36B, respectively. Referring to FIG. 36B and FIG. 37A, during the period 506 when participant 1 was speaking, he was looking at participant 3 for two of the five time slots (that is, 40% of the total length of the period for which he was talking), which is indicated at 520 in FIG. 37A, and at participant 4 for three of the five time slots (that is, 60% of the time), which is indicated at 524 in FIG. 37A.

Similarly, during period 508, participant 4 was looking at participant 1 for approximately 83% of the time, which is indicated at 526 in FIG. 37B, and at user 5 for approximately 17% of the time, which is indicated at 528 in FIG. 37B.

During period 510, participant 5 was looking at user 1 for 70% of the time, indicated at 530 in FIG. 37C, and at participant 4 for 30% of the time, indicated at 532 in FIG. 37C.

Referring again to FIG. 33, at step S518, the viewing histograms generated at step S516 are stored in the meeting archive database 126 linked to the associated period of text for which they were generated. Referring to FIG. 36B, the stored viewing histograms are indicated at 540, with the data defining the histogram for text period 506 indicated at 552, the data defining the histogram for text period 508 indicated at 554, and the data defining the histogram for text period 510 indicated at 556.

On the other hand, if it is determined at step S514 in FIG. 33 that, for the current time period, one of the participants has not stopped speaking, then steps S516 and S518 are omitted.

Referring again to FIG. 4, at step S10, the meeting archive database 126 is interrogated to retrieve data relating to the meeting.

FIG. 38 shows the processing operations performed at step S10.

Referring to FIG. 38, at step S550, central controller 100 causes a message to be displayed on display device 34 prompting the user to enter information defining the search of meeting archive database 126 which is required. More particularly, in this embodiment, central controller 100 causes the display shown in FIG. 39A to appear on display device 34.

Referring to FIG. 39A, the user is requested to enter information defining the part or parts of the meeting which he wishes to find in the meeting archive database 126. More particularly, in this embodiment, the user is requested to enter information 600 defining a participant who was talking, information 610 comprising one or more key words which were said by the participant identified in information 600, and information 620 defining the participant to whom the participant identified in information 600 was talking. In addition, the user is able to enter time information defining a portion or portions of the meeting for which the search is to be carried out. More particularly, the user can enter information 630 defining a time in the meeting beyond which the search should be discontinued (that is, the period of the meeting before the specified time should be searched), information 640 defining a time in the meeting after which the search should be carried out, and information 650 and 660 defining a start time and end time respectively between which the search is to be carried out. In this embodiment, information 630, 640, 650 and 660 may be entered either by specifying a time in absolute terms, for example in minutes, or in relative terms by entering a decimal value which indicates a proportion of the total meeting time. For example, entering the value 0.25 as information 630 would restrict the search to the first quarter of the meeting.

In this embodiment, the user is not required to enter all of the information 600, 610 and 620 for one search, and instead may omit one or two pieces of this information. If the user enters all of the information 600, 610 and 620, then the search will be carried out to identify each part of the meeting in which the participant identified in information 600 was talking to the participant identified in information 620 and spoke the key words defined in information 610. On the other hand, if information 610 is omitted, then a search will be carried out to identify each part of the meeting in which the participant defined in information 600 was talking to the participant defined in information 620 irrespective of what was said. If information 610 and 620 is omitted, then a search is carried out to identify each part of the meeting in which the participant defined in information 600 was talking, irrespective of what was said and to whom. If information 600 is omitted, then a search is carried out to identify each part of the meeting in which any of the participants spoke the key words defined in information 610 to the participant defined in information 620. If information 600 and 610 is omitted, then a search is carried out to identify each part of the meeting in which any of the participants spoke to the participant defined in information 620. If information 620 is omitted, then a search is carried out to identify each part of the meeting in which the participant defined in information 600 spoke the key words defined in information 610, irrespective of to whom the key word was spoken. Similarly, if information 600 and 620 is omitted, then a search is carried out to identify each part of the meeting in which the key words identified in information 610 were spoken, irrespective of who said the key words and to whom.

In addition, in this embodiment, the user may enter all of the time information 630, 640, 650 and 660 or may omit one or more pieces of this information.

Once the user has entered all of the required information to define the search, he begins the search by clicking on area 670 using a user input device such as the mouse 38.

Referring again to FIG. 38, at step S552, the search information entered by the user is read by central controller 100 and the instructed search is carried out. More particularly, in this embodiment, central controller 100 converts any participant names entered in information 600 or 620 to participant numbers using the table 480 (FIG. 36A), and considers the text information 504 for the participant defined in information 600 (or all participants if information 600 is not entered). If information 620 has been entered by the user, then, for each period of text, central controller 100 checks the data defining the corresponding viewing histogram to determine whether the percentage of viewing time in the histogram for the participant defined in information 620 is equal to or above a threshold which, in this embodiment, is 25%. In this way, periods of speech (text) are considered to satisfy the criteria that a participant defined in information 600 was talking to the participant defined in information 620 even if the speaking participant looked at other participants while speaking, provided that the speaking participant looked at the participant defined in information 620 for at least 25% of the time of the speech. Thus, the period of speech in which the value of the viewing histogram is equal to or above 25% for two or more participants would be identified if any of these participants were specified in information 620. If the information 610 has been input by the user, then central controller 100 and text searcher 128 search each portion of text previously identified on the basis of information 600 and 620 (or all portions of text if information 600 and 620 was not entered) to identify each portion containing the key word(s) identified in information 610. If any time information has been entered by the user, then the searches described above are restricted to the meeting times defined by those limits.

At step S554, central controller 100 displays a list of relevant speeches identified during the search to the user on display device 34. More particularly, central controller 100 displays information such as that shown in FIG. 39B to the user. Referring to FIG. 39B, a list is produced of each speech which satisfies the search parameters, and information is displayed defining the start time for the speech both in absolute terms and as a proportion of the full meeting time. The user is then able to select one of the speeches for playback by clicking on the required speech in the list using the mouse 38.

At step S556, central controller 100 reads the selection made by the user at step S554, and plays back the stored MPEG 4 data 502 for the relevant part of the meeting from meeting archive database 126. More particularly, central controller 100 and MPEG 4 decoder 112 decode the MPEG 4 data 502 and image renderer 118, frame buffer 120 and sound generator 122 are used to output the image data and sound. The image data comprises images rendered from the three-dimensional conference model which comprises the conference room table with the participant avatars equally spaced around it. This model may be viewed from any viewing position and direction by the user, by inputting instructions using the user input devices 36, 38, and the viewing position and/or direction can be changed during viewing.

A number of modifications are possible to the first embodiment of the invention as described above.

For example, in the first embodiment described above, the cameras 26 and 28 at each user station record images of a single user at the user station and processing is performed to determine transmission data for the single user. However, the cameras 26 and 28 may be used to record images of more than one user at each user station and processing may be carried out to generate the face pixel data, the three-dimensional coordinates of the body markers and the view parameter for each of the users at the user station, and to transmit this data to the other participants to facilitate the animation of an avatar corresponding to each one of the users.

In the embodiment above at steps S42 and 544 (FIG. 7), camera parameters are input by the user. However, each of the cameras 26, 28 may be arranged to store these parameters and to pass it to PC 32 when the camera is connected to the PC.

In the embodiment above, LEDs 56, 58, 60, 62 and 64 are provided on headset 30. However, other forms of lights or identifiable markers may be provided instead.

In the embodiment described above, the headset LEDs 56, 58, 60, 62, 64 are continuously illuminated and have different colours to enable them to be identified in an image. Instead of having different colours, the LEDs could be arranged to flash at different rates to enable them to be distinguished by comparison of images over a plurality of frames, or the LEDs may have different colours and be arranged to flash at different rates.

In the embodiment above, the coloured body markers 70, 72 may be replaced by LEDs. Also, instead of using coloured markers or LEDs, the position of the user's body may be determined using sensors manufactured by Polhemus Inc., Vermont, USA, or other such sensors.

In the embodiment above, in the processing performed at step S370 (FIG. 25) data for the whole of each image is processed at step S390 (FIG. 26) to determine the position of each LED and each coloured body marker in the image. However, the position of each LED and each body marker may be tracked through successive frame of image data using conventional tracking techniques, such as Kalman filtering techniques, for example as described in "Affine Analysis of Image Sequences" by L. S. Shapiro, Cambridge University Press, 1995, ISBN 0-521-55063-7, pages 24–34.

In the embodiment above, at step S72 (FIG. 7), data is stored defining the relationship between horizontal screen position and the view parameter V. Further, at step S396 (FIG. 26), this stored data is used to calculate the view parameter to be transmitted to the other participants in dependence upon the horizontal distance between the point on the display screen at which the user is looking and the centre of the display screen. This method of determining the view parameter V is accurate when the viewing position from which the 3D model of the conference room and avatars is rendered is such that the participants are displayed to the user with their heads at substantially the same vertical height on the screen. However, errors can occur when the viewing position is such that the heads of the participants are at different heights on the display screen. To address this, it is possible to store data at step S72 defining the relationship between the view parameter V and the distance of each avatar around the arc 164 (from any fixed point), and at step S396 to calculate the point on arc 164 which is nearest to the point on the screen at which the user is looking and use the calculated point on arc 164 to read the view parameter V which is to be transmitted to the other participants from the stored data. Further, although in the embodiment above the viewing position from which the 3D conference room model and avatars are rendered is fixed, it is possible to allow the user to vary this position. The view parameter V would then be calculated most accurately using the positions of the avatars around arc 164 as described above.

In the embodiment above, in the processing performed at step S370 (FIG. 25), the user's view parameter is determined in dependence upon the orientation of the user's head. In addition, or instead, the orientation of the user's eyes may be used.

In the embodiment above, the sound from the user's own microphone 52 is fed to the user's headphones 48, 50. However, the user may be able to hear his own voice even when wearing the headphones, in which case such processing is unnecessary.

In the processing performed at step S62 (FIG. 7) in the embodiment above, both a perspective camera transformation and an affine transformation are calculated and tested (steps S130 and S132 in FIG. 9). However, it is possible to calculate and test just an affine transformation and, if the test reveals acceptable errors, to use the affine transformation during the video conference, or, if the test reveals unacceptable errors, to calculate and use a perspective transformation.

In the embodiment above, the names of the participants displayed on the name plates are based on the information provided by each participant to the conference coordinator at step S20 (FIG. 5). However, the names may alternatively be based on other information, such as the log-on information of each participant at a user station, the telephone number of each user station, or information provided in the data defining the avatar of each participant.

In the embodiment above, at step S68 (FIG. 7), the positions of the avatars around the conference room table in the avatar and 3D conference model store 114 are set using the values given in Table 1. However, other positions may be used. For example, the avatars may be arranged so that theirhorizontal positions on the display screen are given by the following equation:

$$W_n = 0.46W\cos\left(\frac{180i}{N-1}\right) \quad (13)$$

where:

N is the number of avatars displayed on the screen $W_n$ is the position of the nth avatar (n=1 ... N)

i=n−1

W is the screen width

In the embodiment above, at step S400 (FIG. 26), the face pixel data is extracted following processing to determine the extents of the user's head such that the extracted pixel data will not contain pixels showing the headset 30. Instead, the pixel data may be extracted from an image by simply extracting all data bounded by the positions of the LEDs 56, 60 and 64 and using the user's head ratio to determine the data to extract in the direction of the length of the user's face. Conventional image data interpolation techniques could then be used to amend the pixel data to remove the headset 30.

In the embodiment above, a view parameter V is calculated to define the position of the head of an avatar. In this way, movements of the user's head in real-life are appropriately scaled to give the correct movement of the avatar's head in the three-dimensional conference room models in the avatar and 3D conference model store 114 and the meeting archive database 126 at the user stations of the other participants. In addition, it is also possible to perform corresponding processing for user gestures, such as when the user points, nods his head, etc. at a particular participant (avatar) on his display screen.

In the embodiment above, two cameras 26 and 28 are used at each user station to record frames of image data of the user 44. The use of two cameras enables three-dimensional position information to be obtained for the headset LEDs and body markers. However, instead, a single camera could be used together with a range finder to provide depth information. Further, a single calibrated camera could be used on its own, with depth information obtained using a standard technique, for example as described in "Computer and Robot vision, Volume 2" by R. M. Haralick and L. G. Shapiro, Addison-Wesley Publishing Company, 1993, ISBN 0-201-56943-4, pages 85–91.

Instead of using LEDs or coloured markers to determine the position of the user's head, arms and torso, conventional feature matching techniques could be used to match natural features of the user in each of the images in a pair of synchronised images. Examples of conventional techniques are given in "Fast visual tracking by temporal consensus" by A. H. Gee and R. Cipolla in Image and Vision Computing, 14(2): 105–114, 1996, in which nostrils and eyes are tracked and "Learning and Recognising Human Dynamics in Video Sequences" by C. Bregler, Proceedings IEEE Conference on Computer Vision and Pattern Recognition, June 1997, pages 568–574, in which blobs of motion and colour similarity corresponding to arms, legs and torso are tracked.

In the embodiment above, the view parameter, V, for a given participant defines at which other participant the participant is looking. However, the view parameter may also be used to define at which object the participant is looking, for example a display board or the participant's notes etc. Thus, in FIG. 39A, information 620 would be used to specify at whom or at what the participant was looking when he was talking.

In the embodiment above, at step S504 (FIG. 33), the view parameter, V, of each participant is quantised using equations 11 and 12. The view parameter may be quantised in different ways, however. For example, the view parameter may be quantised taking into account the position at which the participant is looking on his display screen and the distance between the avatars displayed on the display screen. More particularly, referring to FIG. 40, the distance "d" between the point 240 at which it is determined that the participant is looking on the display screen and the centre of the head of the nearest avatar 194 is calculated, together with the distance "l" between the centre of the head of the nearest avatar 194 and the centre of the head of the avatar 196 which is the second nearest avatar to the point 240 at which the user is looking. Quantisation of the view parameter, V, is then calculated using the following equations:

If d<0.31 then set V=i $\quad (14)$

Otherwise set d=0 $\quad (15)$ where i is the participant number of the nearest avatar.

In the embodiment above, the three-dimensional conference model stored in meeting archive database 126 is different to the three-dimensional model stored in avatar and 3D conference model store 114. However, the same computer model may be used both during the video conference and for meeting archive purposes.

In the embodiment above, at step S552 (FIG. 38), the viewing histogram of a particular portion of text is considered and it is determined that the participant was talking to a further participant if the percentage of gaze time for the further participant in the viewing histogram is equal to or above a predetermined threshold.

Instead however, rather than using a threshold, the participant to whom the speaking participant was looking during the period of text may be defined to be the participant having the highest percentage gaze value in the viewing histogram (for example participant 4 in FIG. 37A, participant 1 in FIG. 37B and participant 1 in FIG. 37C).

In the embodiment above, the text information produced by voice recognition processor 107 is encoded as an MPEG 4 text stream. However, the text data may be provided as binary asci code and encoded as MPEG 4 "user data".

In the embodiment above, the MPEG 4 data 502, the text data 504, the quantised view parameters 512 and the viewing histograms 540 are generated and stored in meeting archive database 126 in real-time as data is received from the other participants. However, instead, the MPEG 4 data received from the other participants may be stored and the data 502, 504, 512 and 540 generated and stored in meeting archive database 126 in non-real-time.

In the embodiment above, the MPEG 4 data 502, the text data 504, the quantised view parameters 512 and the viewing histograms 540 are generated and stored in meeting archive database 126 before the database is interrogated to retrieve data for a defined part of the meeting. However, some, or all, of the data 502, 504, 512 and 540 may be generated in response to a search of the meeting archive database 126 being requested by the user, rather than being generated and stored prior to such a request. For example, in the embodiment above, at steps S500 and S502 (FIG. 33), the 3D conference model in meeting archive database 126 is updated and the updated model is encoded as MPEG 4 data which is then stored as data 502 in meeting archive database 126. However, instead, the body animation parameters (defining the 3D coordinates of the body markers and the view parameter) may be stored for each participant together with the face pixel data and sound data and, during playback of a part of the meeting to the user, the stored body animation parameters may be used to change the positions of the avatars in the 3D model.

Similarly, although in the first embodiment the viewing histograms 540 are calculated and stored in real-time at steps S516 and S518, these histograms could be calculated in response to a search request being input by the user.

In the first embodiment, each user station 2, 4, 6, 8, 10, 12, 14 includes a voice recognition processor 107 which produces text data for output to the other user stations. In a further embodiment, voice data, but no text data may be sent from each user station to the other user stations, and the text data may be produced using a voice recognition processor in the receiving user station. In this embodiment, as part of the procedure shown in FIG. 5, data defining the user's voice profile necessary to carry out voice recognition would be sent to the conference coordinator and then distributed to the other participants. Such user profile parameters are, for example, the parameters stored in the "user files" of Dragon Dictate. In further embodiments, audio data may be stored in meeting archive database 126 instead of the text data 504. The stored audio data would then either itself be searched for key words using voice recognition processing, or converted to text using voice recognition processing and the text searched using a conventional text searcher.

Instead of interconnecting the user stations 2, 4, 6, 8, 10, 12, 14 as in the embodiment described above, a client-server type of system may be used in which all communication between the user stations is directed through a server (which could, itself, be one of the user stations). In such an arrangement, the server could be arranged to store and maintain the meeting archive database 126 and to perform all searches thereon, rather than providing this facility in each user station.

The meeting archiving technique described above is applicable to all types of three-dimensional conferences and meetings. For example, it may be applied to a meeting which takes place in the same virtual space with each user wearing a virtual reality headset which provides information to define the view parameter, V.

The meeting archive technique described above can also be applied to data recorded at a single user station. More particularly, it can be used in a situation in which images are recorded of a plurality of users using one or more cameras and a three-dimensional computer model is amended in dependence upon the movements of the users. In such a case, the users could, for example be participating in a face-to-face meeting.

In the embodiment above, processing is performed by a computer using processing routines defined by programming instructions. However, some, or all, of the processing could be performed using hardware.

Different combinations of the above modifications are, of course, possible and other changes and modifications can be made without departing from the spirit and scope of the invention.

SECOND EMBODIMENT

The apparatus 701 shown in FIG. 41 comprises a processor unit 702 coupled to a data store 703 for storing a 2D moving image database. The processor unit 702 is also coupled to a removable data storage medium drive 704 for receiving a removable data storage device 705 such as, for example, a floppy disk or a writable CD-ROM. The processor unit 702 is also coupled to a remote communications link 706 which enables communication with other computers via, for example, a network, an intranet or the internet. The processor unit 702 is also coupled to a display 707 for displaying information and instructions to a user and to an input device 708 for enabling a user to input information and instructions to the processor unit 702. The input device comprises at least one of a keyboard, a mouse, trackerball or other pointing device.

Program instructions may be supplied to the processor unit 702 via the input device 708, as a signal via the remote communications link line 706 or on a removable data storage medium 705.

As shown in FIG. 41, the processor unit 702 consists, in functional terms, of a central controller 709 which controls operation of the apparatus in accordance with program instructions stored in a memory 710. The central controller 709 is coupled to a 2D image processor 711 which, as will be described below, processes 2D moving image data and associated sound data input to the apparatus for storage in a database generated in the data store 703. The central controller 709 is also coupled to a database search processor 712 that enables data to be retrieved from a database in the data store 703 in accordance with search criteria input by a user using the input device 708.

The 2D image processor 711 and database search processor 712 operate under the control of the central controller 719 in accordance with instructions stored in the memory 710.

The central controller 719 also controls the display 707 via a display processor 715 and loudspeakers 707a associated with the display via a sound processor 714.

The apparatus shown in FIG. 41 also comprises a video tape recorder (VTR) 716 for receiving a video tape 718 carrying 2D moving image data in the form of video data to be stored in the database. The video tape recorder 716 is coupled to the processor unit 2 via a frame store 717.

FIGS. 42a and 42b illustrate an embodiment of the structure of a database generated in the data store 703 using the apparatus.

As can be seen from FIG. 42a, the database structure includes a data file D in which the 2D moving image data, in this case video data, is to be stored. The video data may be stored in a compressed format, for example in MPEG format, so as to reduce the required space.

As illustrated in FIG. 42a, the data file D consists of video data storage areas each of which is defined as a period of time T which, in this embodiment, coincides with one frame of the video image data. Thus FIG. 42a shows the data file D as being arranged to store n frames of video data together with the associated sound data in time blocks $T_1$ to $T_n$.

The database structure shown in FIG. 42a also has a plurality of text files TEXT 1 to 7 each of which consists of a plurality of text data storage areas with each text data storage area of a text file being uniquely associated with a corresponding video data storage area T. The database structure also contains, as shown in FIG. 42b, a participants file identifying participants in the video to be stored in the database.

The database structure also contains a quantized viewing parameter file for each of the participants. Each quantized viewing parameter file has a plurality of quantized viewing parameter data storage areas with each data storage area for a particular quantized viewing parameter file being uniquely associated with a particular video image data storage area T. Each quantized viewing parameter data storage area is arranged to store a quantized viewing parameter identifying which of the other participants the corresponding participant was looking at in the frame stored in the corresponding video data storage area.

Thus, as illustrated by the dashed line X in FIG. 42*a*, each video data store area, video data storage area T, for example, is associated with a corresponding text data storage area and a corresponding quantized viewing parameter data storage area.

The combination of the text files and the quantized viewing parameters enables a determination to be made as to which other participants a speaker was looking at whilst speaking.

The database shown in FIGS. 42*a* and 42*b* also includes a respective viewing histogram file for each of the participants. The viewing histogram file is arranged to store data indicating the proportion of time for which a speaker was looking at each of the other participants while speaking. This enables, for example, the primary addressee of the speaker to be determined. FIGS. 43*a* to 43*c* illustrate histograms H1, H2 and H3 for the text strings TE1, TE2 and TE3, respectively, shown in FIG. 42*a* with the vertical axis showing the percentage of the speaking time for which the speaker is gazing or looking at each of the participants given on the horizontal axis.

An example of the generation of a 2D moving image database embodying the invention will now be described with reference to FIGS. 42*a* to 53.

In this example, the 2D moving image data to be stored in the database is video footage of a conference or meeting. FIG. 44 shows very schematically a frame taken from the video footage. As can be seen from FIG. 44, the meeting consists of seven participants, Mr A, Mr B, Mr C, Mr D, Miss E, Mr F and Mr G. Successive frames of the video footage will look similar to that shown in FIG. 44. However, the direction in which the participants in the conference are looking will, of course, change during the course of the meeting as will the person who is speaking.

The memory 710 or data store 703 stores voice or speech recognition software 720 which, as illustrated schematically in FIG. 45 has access to a voice data file 721 containing a respective voice data file 721*a* to 721*g* for each of the participants. The voice recognition software 720 thus has access to the necessary information to enable it to identify and convert to text speech by each of the participants.

The voice data files may be supplied to the apparatus on a removable data storage medium 705 or via the remote communications link 706 from, for example, voice recognition software at the personal computers of each of the participants.

A video tape 718 carrying the video footage of the conference for which FIG. 44 shows one frame is inserted into the video tape recorder 716 and supplied via the frame store 717 to the 2D image processor 711 under control of the central controller 709.

FIGS. 46*a* and 46*b* show a top level flow chart of the processing carried out by the 2D image processor 711 for a section of video footage of the conference.

At step S601, the section of video footage to be processed is temporarily stored either in the memory 710 or a working section of data store 703.

At step S602 the processor 711 prompts the user to identify participants in the video conference and after these have been identified and stored by the processor 711 in the participants file as shown in FIG. 42*b*, the processor 711 accesses voice recognition software in the memory 710 (or data store 703) to perform speech recognition on the sound track accompanying the frames of video being processed at step S603.

The video data is then stored in the data file D at step S604 so that, in this embodiment, successive frames of video data and its accompanying sound track are stored in successive video data storage areas T. The processor unit 702 causes the text resulting from the voice recognition processing to be stored in the text file TEXT 1 to 7 of the speaker at step S605 so that text corresponding to words spoken in video data stored in a given video data storage area is stored in the corresponding text data storage area for the participant who was speaking. In the example shown in FIG. 42*a* where the section of video being processed is that corresponding to video data storage areas $T_1$ to $T_5$, then the text data is stored in text file TEXT 1 of participant 1 as continuous text stream TE1.

The 2D image processor 711 then determines the viewing parameters for the section of video footage at step S606, stores these in the relevant quantized viewing parameter storage areas of the quantized viewing parameter files 1 to 7 at step S607, generates the corresponding viewing histogram at step S608 and stores the histogram in the database at step S609. Where the section of video footage being processed is that for video data storage areas $T_1$ to $T_5$, then the histogram is stored, as shown in FIG. 42*a*, as H1 in the viewing histogram file 1.

The 2D image processor then determines at step S610 whether any further video footage is to be processed and if the answer is yes repeats steps S601 to S610 until all of the video footage has been processed and the moving image database shown in FIGS. 42*a* and 42*b* has been generated.

It will of course be appreciated that FIG. 42*a* shows only part of the database and that there will generally be many more video data storage areas T with corresponding text and quantized viewing parameter storage areas.

The subroutine executed at step S602 in FIG. 46 is illustrated in FIG. 47. At step S621, the 2D image processor 711 and central controller 709 cause the display 707 to display to the user the screen 730 shown in FIG. 50. The screen 730 has a window 731 for displaying the video footage and displays instructions to the user to enter the details of the participants in boxes 732*a* to 732*g* and then press enter.

At step S622, the 2D image processor 711 and central controller 709 monitor the screen 730 to determine whether the user has clicked on or otherwise activated a start button 733 shown in screen 730. When the start button is activated the 2D image processor 711 and central controller 709 cause, at step S623, the video to be played in the window 731 under the control of the video and sound processor 714 and 715. The central controller 709 monitors the input device 708 at step S624 to determine when the enter key has been pressed confirming entry of the participants details. When the answer at step S624 is yes, the 2D image processor 711 and central controller 709 cause the participants, that is Mr A, Mr B, Mr C, Mr D, Miss E, Mr F and Mr G in this case, to be entered into the participants file as shown in FIG. 42*b*. The 2D image processor 711 then checks at step S625 whether the video is running and, if so, stops the video at step S626 and returns it to the beginning of the section that was being played. If the answer at step S624 is no, then the 2D image processor continues to monitor the display screen 730 and the keyboard until the user has confirmed entry of the participants. Once the participants have been stored in the participants file and the video, if running, has been returned to the beginning of the section that was played, the 2D image processor 711 returns from the subroutine S602 and proceeds to the subroutine S603 of FIG. 46.

The voice recognition subroutine S603 of FIG. 46 will now be described with reference to FIGS. 48, 51 and 52.

Figure 51:
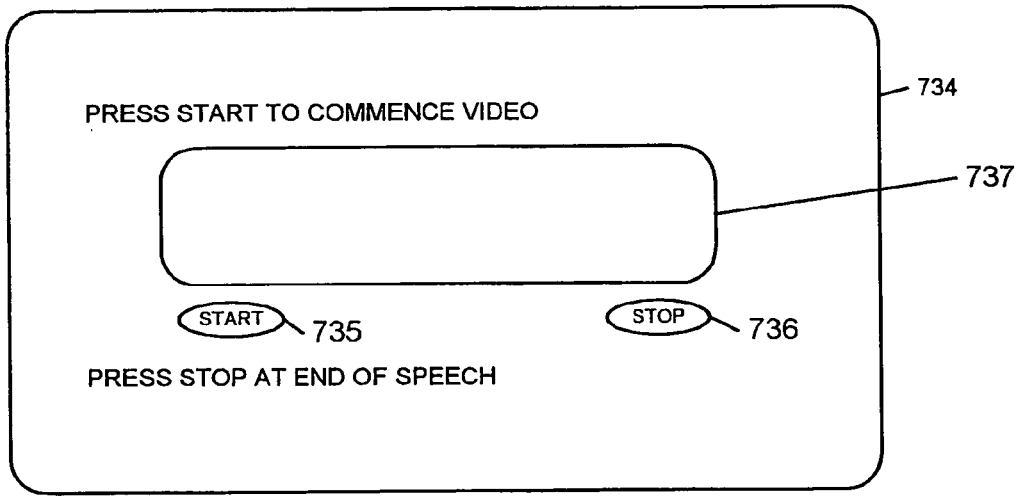

As step S631, the 2D image processor 711 and central controller 709 cause the display 707 to display the screen 734 shown in FIG. 51.

The screen 734 displays instructions to the user to press the start button 735 to commence playing of the video and to press the stop button 736 when the participant speaking in that section of video stops speaking so as to define the end of the speech to be processed. Thus, at step S632, the 2D image processor 711 monitors the screen 734 to determine when the start button 735 has been pressed. Once the start button 735 has been pressed, the 2D image processor 711 causes the video processor 715 to play the video in the window 737 of screen 734 at step S633.

Figure 52:
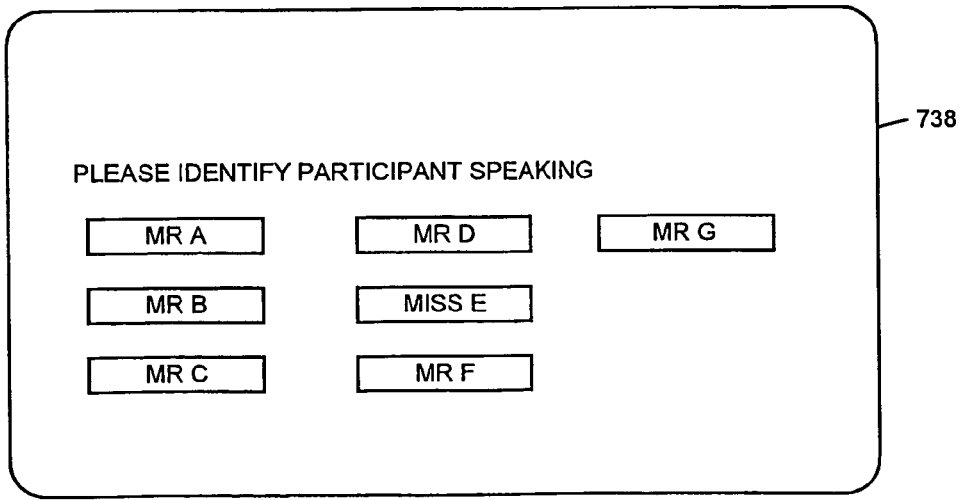

The 2D image processor then monitors at step S636 the stop button 736 and when the stop button 736 is pressed, at step S637 prompts the user to identify the speaker in that section of video by displaying the screen 738 shown in FIG. 52 which lists the participants entered by the user and requests the user to select the speaker by highlighting or clicking on the speaker's name and then pressing enter.

Where the video footage corresponds to that stored in video data storage areas $T_1$ to $T_5$, then the user will select Mr A.

At step S638 in FIG. 48, the 2D image processor 711 monitors the keyboard of the input device 708 to determine when the enter key has been pressed by the user to confirm selection of the speaker. If the answer at step 5638 is no, then the processor 711 returns to step S632. Similarly, if the answer at step S632 is no, then the processor returns to step S638 so that the central controller 709 continuously monitors for pressing of the start button and identification of the speaker until the answer at step S638 is yes.

When the answer at step S638 is yes, the processor 711 selects the voice data file shown schematically in FIG. 45 for the identified participant at step S639 and then performs speech or voice recognition using the voice recognition software at step S640 using the selected voice data file so as to generate text corresponding to the words spoken by the speaking participant. Thus for the video data storage areas $T_1$ to $T_5$ in FIG. 42a, the voice data file 721a for Mr A will be selected.

The processor 11 then returns from the subroutine S603 to step S604 of FIG. 46 and proceeds to store the video and the text in the manner described above so that the text is stored in the text file associated with the speaker, in this case, text file TEXT 1 and in the text data areas corresponding to the video data areas $T_1$ to $T_5$.

The 2D image processor 711 then proceeds to the subroutine of step S606 in FIG. 46 to enable the viewing parameters to be determined. The viewing parameter determining subroutine will now be described with reference to the flow chart shown in FIG. 49 and the screen 739 shown in FIG. 53.

Figure 53:
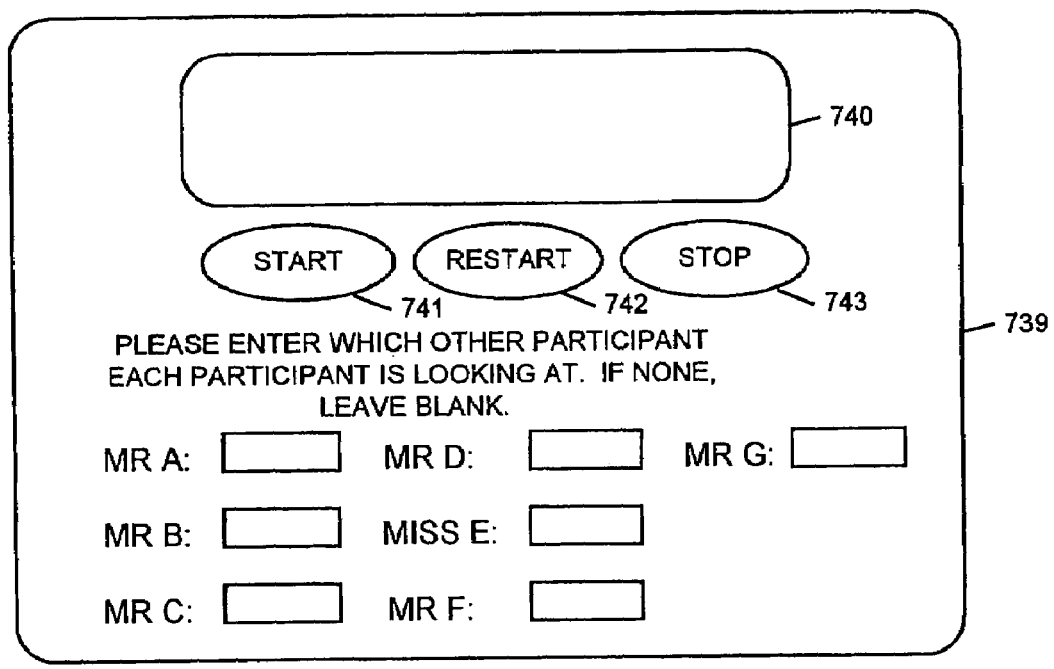

At step S641, the 2D image processor 711 displays the screen 739 shown in FIG. 53. The screen has a window 740 for playing back a section or clip of the video footage frame by frame and shows start, restart and stop buttons 741, 742 and 743. The video clip will correspond to the frames of video for which the speaker identified by the user as described above was speaking. The screen also prompts the user to identify the direction of gaze of each of the participants by entering the name of the person being looked at in the box adjacent the participants name. The user is instructed to leave a box blank if the participant is not looking at any of the other participants.

At step S642, the processor 711 monitors to determine whether or not the user has clicked on the start button 741. When the user clicks on the start button 741, the processor 711 displays the first frame of the video clip in the screen 740 at step S643 and waits for the user to press enter to indicate that input of the data has been completed at step S644.

For the video data storage area $T_1$, the user will enter the names Mr C in the box for Mr A, Mr A in the boxes for Mr B, Mr C, Mr D, Miss E and Mr F and nothing in the box for Mr G. The 2D image processor 711 and central controller 709 then access the participants file to determine the relevant numbers for the entered participants and then store these as the quantized viewing parameters in the quantized viewing parameter storage areas corresponding to the video data storage area $T_1$. In this case 3 is stored in the quantized viewing parameter storage area corresponding to the video data storage area $T_1$ of the quantized viewing parameter file 1, 1 in the quantized viewing parameter storage areas corresponding to the video data storage area $T_1$ of the quantized viewing parameter files 2 to 6 and zero in the quantized viewing parameter storage area corresponding to $T_1$ of the quantized viewing parameter 7.

The processor 711 then checks at step S646 whether the video clip is finished. If the answer is no, the processor 711 prompts the user to press the restart button by causing the restart button 744 to flash at step s647. When the restart button has been pressed, the processor 711 causes the next frame to be displayed at step S648 and steps S644 to S648 are repeated until the answer at step S646 is yes, that is until the entire video clip has been completed.

When the answer at step S646 is yes, the processor 711 returns to step S607 in FIG. 46a, storing all the quantized viewing parameters for the video clip.

The processor 711 then determines at step S608 in FIG. 46b the time for which the speaker was looking at each of the participants by using the viewing parameter data from the subroutine shown in FIG. 49 and generates the corresponding histogram. Thus, in the case of the speech by participant 1 (Mr A) for the period represented by the data storage units $T_1$ to $T_5$, the 2D image processor 711 determines that Mr A was looking at Mr C for 40% of the time and at Miss E for 60% of the time he was speaking and so generates the histogram shown in FIG. 43a which is stored as viewing histogram H1 associated with video data storage areas $T_1$ to $T_5$ in viewing histogram file 1 as shown in FIG. 42a.

The procedure described above with reference to FIGS. 46 to 53 is repeated for each successive clip of the entire video data file until the whole of the video data file and thus the entirety of the conference has been processed. It will be appreciated that the embodiment described above determines the start and end of a video clip to be processed by determining the frames at which the speaker starts and stops speaking. It will be appreciated that, as shown in FIG. 42a, there may be gaps or overlaps in the conversation. To accommodate this, the video clip selected for determining the participants at which the speaker is looking should include a few frames before or after the passage of speech identified by the user as described above with reference to FIG. 48.

FIG. 42a also illustrates the possibility that speeches by two speakers may overlap. Thus, in the example of the database shown in FIG. 42a, the speeches by Mr D and Mr E overlap for the data storage unit $T_{11}$ and $T_{12}$. Where the video information being processed contains a stereo sound track, then the stereo information may be used to separate the speech of the two participants so as to enable voice recognition to be carried out on the two separate speeches. Alternatively, the voice recognition software may be arranged to ignore areas of overlap and the processor unit 702 may prompt the user to correct the text derived by the voice recognition software in those areas where overlap occurs.

FIGS. 54 to 56 illustrate one example of a searching procedure that can be carried out by the database search processor 712 to enable specific information to be retrieved from the database.

As shown in FIG. 54, when the user initiates a search, the database search processor 712 prompts the user to enter search information at step S650 by causing the screen 750 shown in FIG. 55 to be displayed on the display 707. The screen 750 then prompts the user to enter information to enable retrieval of the sections of the video stored in the database where a particular participant was talking to another one of the participants. Thus, the screen 750 shown in FIG. 55 prompts the user to enter at box 751 the name of the speaker and at box 752 the name of the person being spoken to. The user may also enter at box 753 the subject matter about which the user is talking. If the user is not certain of the exact words that may have been used by the speaker then he may, in known fashion, enter a wild card. Known Boolean search algorithms may also be used to enable the searcher to search for combinations or alternatives of words.

The user may also restrict the search to a particular time period during the conference or meeting by, for example, specifying in box 754 that only speeches occurring before a certain time into the conference are to be considered or by specifying in box 755 that only speeches occurring after a certain time during the conference are to be considered. As another possibility, the searcher may specify that only speeches occurring within a certain time period during the conference should be searched for by specifying beginning and end times in boxes 756 and 757.

Once the user is satisfied that the correct information has been entered into the search screen, he initiates the search by clicking on the start button 758. The database search processor 712 then reads the information shown on the screen 750 and performs the search in accordance with the parameters set by the searcher.

In the example shown in FIG. 55, the searcher has identified Mr A in box 751 and Mr B in box 752. The database search processor 712 thus searches the quantized viewing parameter file 1 for all occurrences of the code 2 where text matching the search parameters in box 753 is also present in the text file TEXT 1 using text searching software stored in the memory 710. The viewing histogram file associated with each speech made by Mr A may be used to, for example, order the search results so that the search results are displayed in an order determined by the amount of time for which Mr A was looking at Mr B during the particular speech. As another possibility, the viewing histograms may be used so that only those speeches where Mr A is looking at Mr B for greater than a certain percentage of the overall time of the speech are identified as being relevant. For example, this minimum threshold may be 25% so that only those areas of the video where Mr A is looking at Mr B for at least 25% of the time for which he is speaking are identified as being valid search results.

The database search processor 712 then causes at step S652 the search results to be displayed on the display 707 as screen 751 shown in FIG. 56.

The screen 751 shown in FIG. 56 identifies the search results in terms of the time at which the speech started and the time into the meeting at which the speech started. Thus, the first search result shown in FIG. 56 identifies a speech by Mr A to Mr B starting at 10 minutes into the meeting and that this time was 40% of the time into the meeting (0.4×full meeting time). The timing information is, of course, implicit in the video information because the number of frames per second is predetermined. As another possibility, the search results may be displayed to show the frame number at which the speech started.

The search example given above assumes that the searcher is only interested in occurrences where a particular participant is talking to another participant. However, as will be appreciated, the database shown in FIGS. 42a and 42b also enables a search to be carried out to determine when one participant was looking at another participant regardless of whether or what topic either of those two participants was speaking. Such a search may be carried out by simply leaving the box 753 of the screen 750 blank.

In the second embodiment, the sound file representing the conversation of the participants in the meeting is derived from the video footage. However, each of the participants may be provided with an individual microphone, for example a throat microphone, and a separate sound track recorded and synchronised with the video footage in known manner. This would enable a separate file to be provided for speech made by each of the participants and should facilitate voice recognition processing even where two or more participants are talking at the same time.

In the second embodiment, speeches made by the participants are stored as text files. However, the speeches may be stored as sound files instead of text files and only converted to text when a search is required which would reduce the processing required to generate the database but increase the processing required to carry out a search.

In the second embodiment, the voice or speech recognition software converts spoken words into text. The accuracy of this conversion depends upon the dictionary of the voice recognition software and the voice data file for the participant and problems may occur where the participants use during the meeting words that are not available in the voice data files. To facilitate searching even where the voice recognition software has been unable to identify words with a sufficient degree of certainty, both the resulting text or word file (lattice) and the phoneme file (lattice) from which the words were identified may be stored in the database. This has the advantage that where the words to be searched for can be entered verbally by the searcher, the voice or speech recognition processor can compare the phonemes for the entered search query with the phonemes stored in the database so increasing the possibility of the search locating speeches containing words that are not available in the voice data files to which the voice recognition software has access.

In the second embodiment, participants in the 2D moving image data are identified by the user frame by frame. Where the video footage is long this may prove a time consuming task. Accordingly, the user may be given the option to identify the participants' gaze directions for groups of frames at a time or for only selected portions of the video footage.

Where, as in the example described above, the apparatus stores voice data files for each of the participants, then automatic recognition of the participants by comparing speeches made by them during the conference with the voice data files may be possible.

In the second embodiment, speech is identified by using speech (voice) recognition software. The use of voice recognition software may be avoided by requiring the user to type in the text as he hears it spoken by the speaker. As another possibility, a written transcript of the conference may be made available to the 2D image processor 711. This may be supplied in electronic form on a removable storage medium 705 or via the remote communications link 706, be input manually by the user using the input device 708 or be supplied using an optical scanner and optical character recognition software where the transcript is in hard copy form. The transcript should like the video footage effectively be a chronologically ordered record of the conference and should enable the processor unit 702 to generate the text files directly from the transcript.

In the second embodiment, the speaker is identified manually by the user. It may, however, be possible for the 2D image processor 711 to work out from the information in the video footage which of the participants is speaking. This may be achieved by, for example, comparing successive frames of the video information to determine which participants mouth is moving during that succession of frames.

In the second embodiment, the 2D moving image data stored in the database is video information relating to a meeting or conference. The present invention may also be applied to any other 2D moving image data where the participants are identifiable such as, for example, home videos, films, and security/surveillance videos of work place environments such as, for example, the control rooms of nuclear power plants and the like. The present invention may also be applied to 2D moving image data in the form of commercial films or cartoons. In such cases, information will generally be stored in the database only for the more important characters in the film or cartoons and the text files may be generated using the script or transcript of the film in the manner described above for conference transcripts. Alternatively, voice data files generated for the major actors in the film or cartoon may be used to enable the use of voice recognition software. Such voice data files may be specially generated by using existing sound recordings of the actors to train the voice recognition software to recognise the voices.

The 2D moving image data that may be stored in the database need not necessarily be derived from video or film footage. Thus, for example, the 2D moving image data may comprise computer games or educational software where images represented are at least partially computer generated. As another possibility, the 2D moving image data may comprise a connected series of still images such as, for example, are generated during time lapse photography. These images may be converted to electronic form by using an optical scanner or alternatively may be generated in an electric form using a digital still or video camera.

In the second embodiment, the database enables a searcher to search for instances within the stored 2D moving image data where a person is looking at and possibly talking to another person. The present invention may, however, also be applied where one or more of the participants is an animal or inanimate object. For example, the present invention may be applied to educational, arts, science, travel or other cultural videos or films or computer programs where a presenter looks at and explains items of interest such as, in the case of a travel film or video of the city of Paris, the Eiffel Tower, Montmartre etc. or in the case of an arts film where the presenter looks at and explains a series of paintings in a gallery.

In the second embodiment, the data storage areas $T_1$ to $T_n$ are arranged to store single frames. However, each data storage area may have the capacity to store a plurality of frames of image data.

In the second embodiment the 2D moving image data is supplied on a video tape 718. The data may also be supplied on a recording storage medium 705 or via the link 706.

In the second embodiment, the quantized viewing parameter files of all the participants contain data corresponding to all of the image data. However, only the quantized viewing parameter file of the speaker need contain data if it is only desired to be able to determine which other participants a participant was looking at while speaking.

THIRD EMBODIMENT

Referring to FIG. 57, a third embodiment of the invention comprises a processing apparatus 802, such as a personal computer, user input devices 804, such as a keyboard, mouse etc., a display device 806, such as a conventional personal computer monitor, and a scanner 808 for scanning photographs to produce digital image data therefrom.

The processing apparatus 802 is programmed to operate in accordance with programming instructions input, for example, as data stored on a data storage medium, such as disk 810, and/or as a signal 812 input to the processing apparatus 802, for example from a remote database, over a datalink (not shown) such as the Internet, and/or entered by a user via a user input device 804.

The programming instructions comprise instructions to cause the processing apparatus 802 to become configured to store image data defining input images together with associated information provided by the user in a database, and to search the database to retrieve images in dependence upon search parameters input by the user.

When programmed by the programming instructions, processing apparatus 802 effectively becomes configured into a number of functional units for performing processing operations. Examples of such functional units and their interconnections are shown in FIG. 57. The illustrated units and interconnections in FIG. 57 are, however, notional and are shown for illustration purposes only to assist understanding; they do not necessarily represent the exact units and connections into which the processor, memory etc. of the processing apparatus becomes configured.

Referring to the functional units shown in FIG. 57, central controller 820 processes inputs from the user input devices 804, and also provides control and processing for a number of the other functional units. Memory 822 is provided for use by central controller and other functional units.

Image data store 830 stores the image data representing the images input to the processing apparatus 802. This input image data is generated by scanning a photograph using scanner 808, or by downloading digital image data directly from a digital camera, from a database, or from a separate processing apparatus, etc. Such digital image data may be a photograph recorded with a digital camera or a frame of image data from a video camera.

Archive processor 840 in conjunction with central controller 820 stores image data from the image data store 830 in the archive database 850 together with information related to the image which is input by a user.

Text searcher 860, in conjunction with central controller 820 is used to search the archive database 850 to retrieve one or more images which meet search criteria specified by a user.

Image display processor 870 displays images from image data store 830 or archive database 850 on display device 806.

Output processor 880 outputs data from archive database 850, either on a storage device such as disk 890, or as a signal 892.

FIG. 58 shows the processing operations performed to store image data and associated information in archive database 850.

Referring to FIG. 58, at step S710, central controller 820 and image display processor 870 read image data stored in image data store 830 and display the next input image to the user on display device 806 (this being the first input image the first time step S710 is performed).

At step S720, central controller 820 causes a message to be displayed on display device 806 requesting the user to enter information about the displayed image. More particularly, in this embodiment, central controller 820 causes the screen shown in FIG. 59 to be displayed to the user.

Referring to FIG. 59, the user is requested to enter information 900 defining the approximate date that the image was recorded, and also information 910 comprising text to be stored in the archive database 850 in association with the image. The text may be, for example, a caption for the image, and/or factual information about when, where, how and why the image was recorded, and/or further information such as details about the subject matter of the image, etc.

In addition, the user is requested to enter information 920 defining each respective person or animal in the image and information 930 defining the person, animal or object at which each person or animal identified in information 920 is looking. This information will be used to facilitate better searching and retrieval of information from archive database 850, as will be explained below.

In response to the request for information at step S720, the user may type in the information using a user input device 804 such as a keyboard, or may enter the information using a conventional voice recognition processor, such as "Dragon Dictate" or IBM "ViaVoice".

Referring again to FIG. 58, at step S730, central controller 820 and archive processor 840 perform processing to store the image data for the input image and the information entered by the user at step S720 in the meeting archive database 850.

FIG. 60 shows the processing operations performed by central controller 820 and archive processor 840 at step S730.

Referring to FIG. 60, at step S800, the image data for the input image is stored in archive database 850.

FIG. 61 schematically illustrates the storage of data in archive database 850. The storage structure shown in FIG. 61 is notional and is provided for illustration purposes only to assist understanding; it does not necessarily represent the exact way in which data is stored in archive database 850.

Referring to FIG. 61, archive database 850 stores time information represented by the horizontal axis 1000, on which each unit represents a predetermined amount of time, for example one month. The image data stored at step S800 in FIG. 60 is stored in archive database 850 in compressed form, this being as JPEG data 1002 in this embodiment, together with timing information based on the information 900 entered by the user at step S720 (this timing information being represented in FIG. 61 by the position of the image data along the horizontal axis 1000).

In the example shown in FIG. 61, image data for six images is stored, as indicated at 1004, 1006, 1008, 1010, 1012 and 1014.

Referring again to FIG. 60, at step S810, the text information 910 entered by the user at step S720 is stored in the archive database 850 (indicated at 1020 in FIG. 61). More particularly, the text data is stored with a link to the corresponding image data, this link being represented in FIG. 61 by the text data being in the same vertical column as the JPEG image data, that is, for example, text data 1022 is linked to JPEG image data 1004.

At step S820, each person or animal identified in the information 920 input by the user at step S720 is read, together with the person, animal or object at which they are looking defined in the corresponding information 930.

At step S830, a check is carried out to determine whether a unique reference number has already been stored in archive database 850 for each person, animal and object read at step S820. More particularly, referring to FIG. 61, archive database 850 stores an identification table 1030 for storing information defining people, animals and objects defined in the information 920 and 930, together with a respective unique identification number. Accordingly, at step S830, a search of table 1030 is carried out to determine whether an entry already exists for each person, animal or object read at step S820.

If it is determined at step S830 that one or more of the people, animals or objects read at step S820 does not have a unique identification number, then, at step S840, a new entry is created in table 1030 to list the person, animal or object and to assign a unique reference number thereto. Thus, a new entry is created for each person, animal or object for which no entry already exists in table 1030. On the other hand, if it is determined at step S830 that an entry already exists in table 1030 for each person, animal and object read at step S820, then step S840 is omitted.

At step S850, the viewing information entered by the user as information 920 and 930 at step S720 is stored in archive database 850 (indicated at 1040 in FIG. 61), together with a link to the associated text data 1020 and JPEG image data 1002 (this link being schematically represented in FIG. 61 by the viewing information being in the same vertical column as the associated text data and JPEG image data— thus for example, viewing information 1042 is associated with text data 1022 and JPEG image data 1004).

Referring again to FIG. 58, at step S740, central controller 820 determines whether image data for another input image is stored in image data store 830. Steps S710 to S740 are repeated until each input image has been archived in archive database 850 as described above.

In the example shown in FIG. 61, archive data for six images is stored. The data 1050, 1052 and 1054 for three of the images is stored with time information indicating that these images were recorded between 1 Nov. 1998 and 1 Dec. 1998, while the data 1056 for a fourth image is stored with time information indicating that it was recorded between 1 Dec. 1998 and 1 Jan. 1999, and the data 1058 and 1060 for fifth and sixth images is stored with time information indicating that these images were recorded between 1 Jan. 1999 and 1 Feb. 1999.

The viewing information 1040 for images 1050 and 1052 defines, in conjunction with the data stored in table 1030, that Simon is looking at Mike in these images. Similarly, the viewing information 1040 for image 1054 defines that Alex is looking at a cat in the image. The viewing information 1040 for image 1056 indicates that Allan is looking at the Tower of London and also that Alex is looking at the Tower of London. The viewing information 1040 for image 1058 defines that Simon is looking at Allan and also that Allan is looking at the Tower of London. Similarly, the viewing information 1040 for image 1060 defines that Mike is looking at a newspaper in the image.

FIG. 62 shows the processing operations performed by central controller 820, text searcher 860 and image display processor 870 to search the archive database 850 to identify each photograph which meets the search specification entered by a user and to display the identified photographs to the user on display device 806.

Referring to FIG. 62, at step S900, central controller 820 causes a message to be displayed on display device 806 requesting the user to enter information defining the search of archive database 850 that is required. More particularly, in this embodiment, central controller 820 causes the display shown in FIG. 63A to appear on display device 806.

Referring to FIG. 63A, the user is requested to enter information defining the image or images that he wishes to find in the archive database 850. More particularly, in this embodiment, the user is requested to enter information 1100 defining a person or animal present in the image(s) to be found, information 1110 defining the person, animal or object at which the person or animal identified in information 1100 is looking in the image, and information 1120 defining one or more key words which were present in the text information 910 entered by the user at step S720 (FIG. 58). In addition, the user is able to enter time information defining a portion or portions of the database for which the search is to be carried out. More particularly, the user can enter information 1130 defining a date beyond which the search should be discontinued (that is, the period before the specified date will be searched), information 1140 defining a date after which the search should be carried out, and information 1150 and 1160 defining a start date and end date respectively between which the search is to be carried out.

In this embodiment, the user is not required to enter all of the information 1100, 1110 and 1120 for one search, and instead may omit one or two pieces of this information. If the user enters all of the information 1100, 1110 and 1120, then the search will be carried out to identify each image in the meeting archive database 850 in which the person or animal identified in information 1100 is looking at the person, animal or object identified in information 1110 and the key words defined in information 1120 are associated with the image in text data 1020. On the other hand, if information 1120 is omitted, then a search is carried out to identify each image in which the person or animal identified in information 1100 is looking at the person, animal or object identified in information 1110, irrespective of the text which is associated with the image. If the information 1110 is omitted, then a search is carried to identify each image in which the person or animal identified in information 1100 is present and the key words defined in information 1120 are present in the text data 1020 associated with the image. If the information 1100 is omitted, then a search is carried out to identify each image in which the person, animal or object identified in information 1110 is present and the key words defined in information 1120 are present in the text data 1020 associated with the image. If information 1110 and 1120 is omitted, then a search is carried out to identify any image in which the person or animal identified in information 1100 is present, irrespective of the person, animal or object at which they are looking and irrespective of the text data 1020 associated with the image. If the information 1100 and 1120 is omitted, then a search is carried out to identify each image in which the person, animal or object defined in information 1110 is present. Similarly, if information 1100 and 1110 is omitted, then a search is carried out to identify each image for which the associated text data 1020 contains the key words defined in information 1120.

In addition, the user may enter all of the time information 1130, 1140, 1150 and 1160 or may omit one or more pieces of this information.

Once the user has entered all of the required information to define the search, he begins the search by clicking on area 1170 using a user input device 804, such as a mouse.

Referring again to FIG. 62, at step S910, the search information entered by the user is read by central controller 820 and the instructed search is carried out. More particularly, in this embodiment, central controller 820 converts any person, animal or object identified in information 1100 or 1110 to a corresponding unique reference number using table 1030, searches the viewing information 1040 to identify each image satisfying the requirements specified in information 1100 and 1110, and searches the text data 1020 to identify which image or images of those identified on the basis of the viewing information 1040 have the key words defined in information 1120 associated therewith. If any time information has been entered by the user, then these searches are restricted to the dates defined by those time limits.

At step S920, central controller 820 displays a list of relevant images identified during the search to the user on display device 806. More particularly, central controller 820 displays information such as that shown in FIG. 63B to the user.

Referring to FIG. 63B, a list is displayed of each image which satisfies the search parameters, and information is displayed defining the time at which the image was recorded (this being the information 900 input by the user at step S720). The user is then able to select one of the images to be displayed on display device 806 by clicking on the required image in the list using a user input device 804, such as a mouse. In the example shown in FIG. 63B, two images are listed as having being found in the search. By way of example, if the user had entered "Allan" as information 1100 and "Tower of London" as information 1110 to define the search, but had not entered information 1120, then the two images 1056 and 1058 would be identified as meeting these search criteria.

At step S930, central controller 820 reads the selection made by the user at step 5920, and image display processor 870 displays the selected image on the user display device 806.

Various modifications and changes can be made to the third embodiment.

For example, in the third embodiment, the text information 910 is manually entered by a user (that is by typing or speaking through a voice recognition processor). However, the text information may be input by using an optical character-recognition processor to convert written text to digital data. In particular, this method may be used to archive material containing both photographs and words, such as magazines, brochures, catalogues etc. such that the input image data is generated using scanner 808 and the input text data is generated using an optical character recognition processor.

In the third embodiment, at step S720 (FIG. 58), the information 900 defining the time at which the input image was recorded in entered manually. However, some cameras print the recording date on the photograph and, in such cases, processing may be performed by processing apparatus 802 to read this date from the input image data. In addition the recording date may be incorporated in other ways as part of the input image data and read by processing apparatus 802.

In the third embodiment, at step S720 (FIG. 58), the information 920 defining a subject person or animal is entered manually. However, instead, image processing may be carried out by processing apparatus 802 to perform image identification to identify each person or animal type in the image automatically. If one or more animals cannot be identified using such techniques, then the user may be requested to input information 920 manually.

In the embodiment above, processing apparatus 802 includes functional components for receiving and generating data to be archived (for example, central controller 820, image data store 830 and archive processor 840), functional components for storing the archive data (for example archive database 850), and also functional components for searching the database and retrieving information therefrom (for example central controller 820 and text searcher 860). However, these functional components may be provided in separate apparatus. For example, one or more apparatus for generating data to be archived, and one or more apparatus for database searching may be connected to one or more databases via a network, such as the Internet. FIG. 64 illustrates an example configuration of such separate apparatus comprising data input apparatus 1200, a database 1210, and database searching apparatus 1220.

Other modifications and changes are, of course, possible without departing from the spirit and scope of the invention.

FOURTH EMBODIMENT

Referring now to FIG. 65 an apparatus 1301 for generating a database in a fourth embodiment of the present invention will be described.

The apparatus 1301 comprises a processor unit 1302 coupled to a data store 1303 which may be, for example, a hard disk drive, for storing a database generated by the apparatus. The processor unit 1302 is also coupled to a removable data storage medium drive 1304 for receiving a removable data storage medium 1305 such as, for example, a floppy disk, CD-ROM or computer tape for enabling data and/or program instructions to be input to the processor unit 1302. The processor unit 1302 also has a remote communications link 1306 for enabling coupling of the apparatus 1301 to another computer or a network of computers or to an intranet or the internet to enable data and/or program instructions to be supplied to or supplied from the apparatus 1301 as a signal or signals on the remote communications link 1306.

The processor unit 1302 is also coupled to a display 1307 which may be, for example, a visual display unit (VDU) or LCD display unit and to a user input device 1308 which comprises at least one of a keyboard and a mouse, trackerball or other pointing device for enabling input to the processor unit 1302 of data and/or instructions by a user.

FIG. 65 shows the main functional elements of the processor unit 1302. Thus, the processor unit 1302 consists of a central controller 1309 which controls overall operation of the apparatus. The central controller 1309 is coupled to a database search processor 1311 which in accordance with instructions stored in the memory 1310 enables searching of a database in the data store 1303 as will be described below.

The central controller 1309 is also coupled to a display processor 1312 and a sound processor 1313 which enable the central controller 1309 to control display of both still images and video on the display 1307 and generation of sounds by a loudspeaker 1307a associated with the display 1307.

Program instructions for controlling operation of the processor unit 1302 may be supplied via the input device 1308, a removable storage medium 1305 or the remote communications link 1306 and stored in memory 1310.

The processor unit 1302 is programmed to generate within the data store 1303 a database structure, an embodiment of which is illustrated diagrammatically in FIGS. 66a and 66b.

The database structure generated by the processor unit 1302 defines a data file D in which the data being archived or stored within the database is held. As shown in FIG. 66a, the data file D consists of a series of data storage areas $T_1$ to $T_n$ defined as successive time slots each arranged to store a frame of image data and corresponding sound data. The database structure defined by the processor unit 1302 in the data store 1303 also includes, as shown in FIG. 66b, a participants file structured to associate each of a number of participants shown in the image data to be stored in the data file D with a corresponding code or number. In the example shown in FIG. 66b, the participants file is structured so as to enable seven participants to be identified.

As shown in FIG. 66a, the database structure also includes a text file TEXT 1 to 7, a quantised viewing parameter file 1 to 7 and a viewing histogram file 1 to 7 for each of the participants.

Each of the text and quantised viewing parameter files is structured so as to have a respective different storage area corresponding to each of the data storage areas $T_1$ to $T_n$. Thus, as illustrated by the dashed demarcation line X shown in FIG. 66a, the data storage area $T_1$ is associated with a corresponding text storage area in each of the text files TEXT 1 to 7 and a corresponding quantised viewing parameter storage area in each of the quantised viewing parameter files, structured to contain a quantised viewing parameter relevant to image data stored in the image data storage area $T_1$. Each text storage area of a text file is arranged to store text representing words spoken by the participant associated with that text tile in image data storage in the corresponding image data storage area while each quantised viewing parameter area of a quantised viewing parameter file is arranged to store a parameter representing the direction of the gaze (that is what or who the participant was looking at) of the participant associated with that quantised viewing parameter file in image data stored in the corresponding image data storage area. Thus, the database structure is such that each image data storage area is associated with, for each participant, a corresponding text file storage area and a corresponding quantised viewing parameter storage area.

The data structure generated by the processor unit 1302 also includes for each participant a viewing histogram file 1 to 7 which, as will be described below, provides a histogram specifying the proportion of time for which a speaker looked at each of the other participants.

An example of a database generated by the apparatus shown in FIG. 65 using this database structure will now be described with reference to FIGS. 66 to 68.

In this example, the data to be stored in the database consists of a connected series of frames of image data and an accompanying sound track. This data may be, for example, 3D computer model data and its associated sound track, 2D moving image data and its associated sound track or video data that may be, for example, commercially generated video data such as a film, cartoon or the like or may be home or commercially generated video data such as video conference data. In each of these cases, the data consists of a connected sequence of images and a corresponding sound track and whether the data is 3D computer model data or video data is not relevant.

In this example the data to be stored in the database represents a conference or meeting will now be described. The conference may be an actual conference or, where the data to be stored is 3D model data, then the conference may be a virtual reality conference with the participants being located remotely from one another and interacting by use of virtual reality headsets and bodysuits.

FIG. 67 shows a frame of the image data of the conference. The conference or meeting consists of seven participants, Mr A, Mr B, Mr C, Mr D, Miss E, Mr F and Mr G. These people represent the participants in the conference and their names are stored by the processor unit 1302 in the participants file shown in FIG. 66*b* so that each participant is associated with an identifying number or code. In this example, Mr A to D, Miss E, Mr F and Mr G are represented by the numbers 1 to 7, respectively. These numbers uniquely associate each participant with corresponding text, quantised viewing parameter and viewing histogram files in the database structure.

The data representing the conference is supplied to the processor unit 1302 either via the remote communications link 1306 or via a storage medium 1305 inserted into the drive 1304. The processor unit 1302 stores the data in the data file D so that each frame of image data and its associated sound track is stored in a respective different one of the data storage areas $T_1$ to $T_n$. The data may be stored in the data file D in a known compressed format, for example in MPEG format where the data is video data or in MPEG4 format where the data is 3D model data.

The processor unit 1302 stores in the text files TEXT 1 to 7 representing speech occurring during the conference so that each text storage area of each text file TEXT 1 to 7 stores text representing words spoken by the corresponding participant in the corresponding frame of the image data.

In the embodiment shown in FIG. 66*a* the filled-in text storage areas TE1, TE2 and TE3 show that Mr A is speaking in the first five frames while Mr D is speaking in the seventh to twelfth frames and Miss E is speaking in the eleventh to nth frames. Accordingly, the processor unit 1302 stores the text corresponding to the words spoken by Mr A in text file 1 in the text file storage areas corresponding to image storage areas $T_1$ to $T_5$ and the text representing words spoken by Mr D in the text file storage areas of text file 4 corresponding to image storage areas $T_7$ to $T_{12}$ and so on.

The processor unit 1302 stores in the quantised viewing parameter files a quantised viewing parameter for each of the data storage areas T. The parameter stored in the quantised viewing parameter file for a particular participant indicates for each of the image data storage areas T which of the other participants that participant was looking at. The quantised viewing parameters correspond to the numbers allocated to the participants with the quantised viewing parameter 0 indicating that, in that frame, that particular participant was not looking at any of the other participants. Thus, in the example shown in FIG. 66*a*, the quantised viewing parameter file 1 shows that Mr A was looking at Mr C in the first two frames $T_1$ and $T_2$, at Mr D in frames $T_3$ to $T_5$, at nobody in frame $T_6$ and so on.

The processor unit 1302 stores in each viewing histogram file a histogram indicating the proportion of time for which the corresponding participant looked at each of the other participants while he was speaking.

Figure 68C:
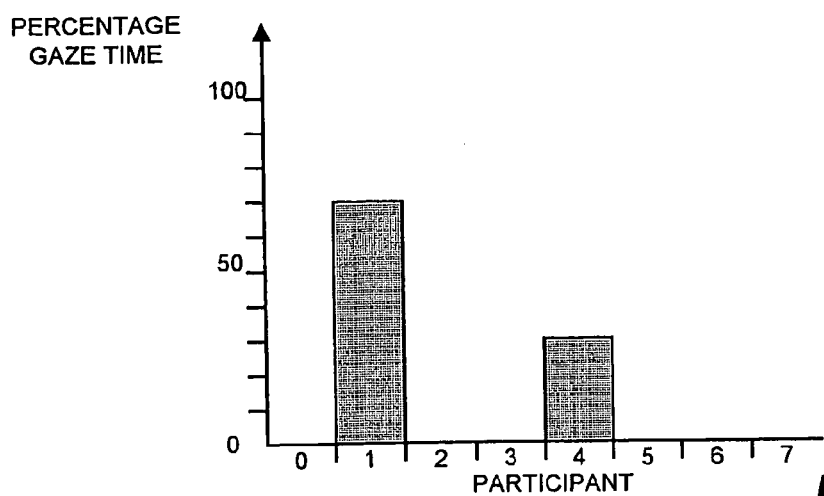

FIGS. 68*a* to 68*c* show the viewing histograms stored by the processor unit 1302 for the periods of speech TE1, TE2 and TE3, respectively. Thus, FIG. 68*a* illustrates that while Mr A was making the speech TE1, he spent 40% of his time looking at Mr C and 60% of his time looking at Mr D. FIG. 68*b* shows that, in contrast, Mr D spent 85% of his time looking at Mr A and 15% of his time looking at Miss E while making the speech represented by the text TE2. FIG. 68 shows that Miss E spent 70% of her time looking at Mr A and 30% of her time looking at Mr D while making the speech represented by the text TE3.

It will, of course, be appreciated that the data to be stored in the database will generally consist of more frames than frames $T_1$ to $T_n$ shown in FIG. 66*a* and that each frame will have its corresponding text and quantised viewing parameter storage areas as discussed above with viewing histograms being associated with each stored speech.

The database structure generated by the apparatus 1301 enables searching of the resulting database to select portions of the stored data where a certain participant in the conference was looking at a particular one of the other participants, for example when the speaker was looking at a particular one of the other participants. This enables the parts of the data where a speaker was talking to a particular one of the other participants to be easily identified and retrieved. Also, the database structure described above enables a database stored in accordance with that structure to be searched so as to determine when a speaker was talking to a particular one of the other participants about a particular subject so that, for example, critical parts of a long meeting or conference can be readily accessed.

FIG. 69 shows a flow chart for illustrating searching of the database shown in FIGS. 66*a* and 66*b*.

At step S1001, the central controller 1309 prompts the user to enter the information to be searched for by displaying on the display 1307 the screen 1320 shown in FIG. 70*a*.

The screen 1320 requests the user to input the name of the person talking in box 1321, the person to whom they are talking in box 1322 and the subject or words that were being spoken in box 1323. As the successive image data storage areas represent successive time slots starting from the beginning of the conference, then the user may also input time limits on the search. For example, the user may enter at box 1324 a latest time limit so that only data falling within the parameters set in boxes 1321 to 1323 before the time set in box 1324 are retrieved. Alternatively, the user may input at box 1325 an earliest time limit so that only data meeting the search parameters set in boxes 1321 to 1323 and occurring after a certain time are retrieved. The screen 1320 shown in FIG. 70*a* also provides the option for the user to instruct the database search processor 1311 to search for data meeting the parameters set in boxes 1321 to 1323 and occurring between certain time limits by inputting these time limits in boxes 1326 and 1327 in FIG. 70*a*.

Once the user has input the search parameters using the user input device 1308, and is satisfied that these are correct, then the user commences the search by clicking the start button shown in the bottom right-hand corner of the screen in FIG. 70*a* by using a mouse or other pointing device.

On receipt of the start instruction, the central controller 1309 causes the database search processor 1311 to read the search information input via the screen 1320 and to perform the required search at step S1002 in accordance with the search parameters entered by the user.

The database search processor 1311 then identifies the number codes allocated to the participants entered in boxes 1321 and 1322 in screen 1320 from the participants file shown in FIG. 66b. For example, if the user enters the name Mr D in box 1321 and the name Miss E in box 1322, then the database search processor 1311 will search the text file TEXT4 for Mr D to determine when Mr D was talking and will search the quantised viewing parameter file 4 for the number 5 to determine those occasions on which Mr D was talking and was looking at Miss E. If the user has also entered a search parameter in box 1323, then the database search processor will further refine the search by searching through the text files where Mr D was speaking while looking at Miss E to locate any text where the words entered in box 1323 are used. If the user has placed a time limit on the area of the search, then the above search steps will be restricted to the stored data falling within those time limits.

The database search processor 1311 may use the viewing histogram files 1 to 7 shown in FIG. 66a to refine the search by, for example, disregarding those times when Mr D was speaking but looked at Miss E only briefly, that is where the percentage gaze time of Mr D towards Miss E was below a predetermined percentage. For example only those speeches of Mr A where he looked or gazed at Miss E for more than 25% of the duration of the speech may be selected. This enables false search results to be reduced by eliminating those cases where Mr D was actually primarily talking to one of the other participants but glanced briefly at Miss E to gauge her reaction.

The search results are than displayed on the display at step S1003. FIG. 70b shows a screen of typical search results. As shown, the search results age identified by specifying the time at which the speech by Mr D started, thereby facilitating selection by the user of one of the search results. This information is available to the database search processor 1311 because the data is stored as consecutive frames and the frame speed of the original memory image data will be known. As an alternative, the search results could be identified by the number of frames into the conference. The search results may also indicate the time into the meeting and/or the proportion of the meeting that had elapsed by the time the speech started. Thus, the two exemplary search results shown in FIG. 70b are identified as a speech 1 starting at 10 minutes 0 seconds into the meeting (that is 0.4 times of the full meeting time) and a speech 2 starting at 12 minutes 30 seconds (that is 0.5 times the full meeting time into the meeting).

The user then selects one of the search results by highlighting or clicking on that particular search result using the input device 1308 and the central controller 1309 then causes the selected part of the conference to be played back to the user at step S1004 with the visual data being displayed to the user on the display 1307 and the corresponding audio data being played through the loudspeaker 1307a.

Once the selected search result has been played back to the user, the user may be prompted by a screen (not shown) displayed on the display 1307 to request another search. If another search is requested at step S1005, then steps S1001 to S1004 in FIG. 69 will be repeated to perform that particular search.

The database may also be searched to enable a searcher to retrieve the portions of the conference data when a particular participant was looking at another identified participant regardless of whether or not either of the two participants was speaking simply by leaving box 1323 empty when entering the search request. Also, it will be appreciated that the data entered into box 1323 when used may follow any standard known searching techniques and that, for example, wild cards and the like may be used to enable a searcher to conduct searches when he is not sure of the exact word or words used by the speaker.

In the fourth embodiment, the viewing histograms 1 to 7 enable refinement of the search. This feature is, however, optional and the viewing histogram information may be omitted.

In the fourth embodiment, each image data storage area corresponds to a frame of the image data. However, each image data storage area may encompass the image data for a plurality of successive frames.

In the fourth embodiment, the data to be stored is moving image or video data or 3D computer model data. However, the data to be stored may consist of a series of separately taken but connected or related images and an accompanying synchronised sound track. For example, in the case of the conference described above, the data may consist of still images or video frames taken at predetermined intervals during the conference so as to record only important parts of a long conference.

In the fourth embodiment, the data D stored in the database relates to a conference or meeting. The data may, however, represent other interactions between participants. For example, the data stored may be 2D moving image data derived from a commercial video of a film, cartoon or the like, a home video or a computer game or educational product. Where the data represents a 3D computer model, then the scenario model need not necessarily have been a meeting but could represent other interactions between participants as in, for example, a 3D computer game or educational computer software where a viewer is guided through, for example, a 3D model of a building, museum, art gallery, or the like.

The database structure described above for the fourth embodiment may also be used to store still images that may be associated with a sound track representing words spoken by a participant shown in the still image within a period for which a still image is representative. These still images may be connected with one another so that the sequence of still images or different still images may show different participants. In the latter case, it will be appreciated that the database will have a participants file entry and text and quantised viewing parameter files for each of the participants although, because the participants in different images are not connected, the entries in a large number of quantised viewing parameter files may be zero.

Also, where the images stored are a series of still images, then the viewing histogram files will be omitted from the database because each unconnected still image will only contain information indicating the gaze of each participant in that image. The database may also be used to store silent moving image data or still image data unaccompanied by any speech data so that, in this case, the text files will also be omitted. Such a database would enable searching of the image file stored in the data file D to determine when an identified person was looking at another identified person. This would enable, for example, a searcher to search through his electronically stored holiday pictures to locate a picture of himself and another identified participant such as a friend or member of his family. Still images may be input to the apparatus 1 using the methods described above, directly using a digital camera or by optically scanning original photographs or hard copy images, for example.

Where the image data stored in the data file consists of a series of still images, then the still images may be stored in any standard compressed format such as, for example, JPEG, TIFF or GIFF.

Also, the participants identified in the data stored need not all be human beings, at least some of the participants may be objects or animals. For example, the database may be used to archive home or educational videos or photographs wherein the "participants" being viewed are items of interest such as, for example, the Eiffel Tower, Notre Dame, Buckingham Palace, The Tower of London, The Statue of Liberty, etc. or famous paintings. In such circumstances, any audio or text file accompanying the corresponding image data may represent a commentary provided by the maker of the video or a commentary provided by a person seen in the video while looking at the item of interest.

In the fourth embodiment, audio information is stored as text. However, the audio information may be stored as audio information, possibly in a compressed form, and only converted to text using the voice recognition software when text to be searched for is entered in box 1323 of the screen 1320 shown in FIG. 70a. Also, it will be appreciated that the voice recognition software could be used to enable the user to input all commands and instructions via a microphone functioning as the input device 1308.

In the fourth embodiment, the quantized viewing parameter files of all the participants contain data corresponding to all of the image data. However, only the quantized viewing parameter file of the speaker need contain data if it is only desired to be able to determine which other participants a participant was looking at while speaking.

The database may contain all three types of data, 3D model data, 2D moving image data and still image data, or any combination thereof.

In the fourth embodiment, the text files are derived from audio data. However, the database described above may also be used where the information stored in the text files 1 to 7 is originally in the form of text. For example the text may be sub-titles derived from the film or video footage to be stored by, for example, using optical character recognition software, or text entered by a user using the input device 1308.

The database once generated and stored in the data store 1303 may, under the control of the central controller 1309, be supplied as a signal on the remote communications link 1306 or stored on a removable data storage medium 1305 such as a writable CD-ROM by use of the removable data storage medium drive 1304.

The contents of the assignee's co-pending PCT application which designates, inter alia, the United States of America as a designated state and has the following details are hereby incorporated by reference:

Title: Database Annotation and Retrieval

Filed: 1 Mar. 2000

Priorities claimed:
    9905201.1 of 5 Mar. 1999 in UK
    9905186.4 of 5 Mar. 1999 in UK
    9905160.9 of 5 Mar. 1999 in UK
    9905199.7 of 5 Mar. 1999 in UK
    9905187.2 of 5 Mar. 1999 in UK Inventors:
    Jason Peter Andrew CHARLESWORTH
    Jebu Jacob RAJAN
    Philip Neil GARNER

The invention claimed is:

1. Apparatus for generating a database structure, comprising a memory for storing data and a processor operable to generate in the memory a database structure comprising: an image data file having a plurality of image data storage areas each arranged to store an item of image data; a participants data file arranged to store data identifying participants shown in image data stored in the image data file; and a viewing data file having a plurality of viewing data storage areas each associated with one of the image data storage areas and being arranged to store data relating to the direction in which a participant shown in an item of image data stored in the corresponding image data storage area is looking.

2. Apparatus according to claim 1, wherein the processor is operable to generate in the database structure a plurality of viewing data files each arranged to be associated with a particular different one of participants shown in the image data and each having a plurality of viewing data storage areas each associated with an image data storage area and each being arranged to store data indicating which, if any, of the other participants the participant associated with that viewing data storage area is looking at in an item of image data stored in the corresponding image data storage area.

3. Apparatus according to claim 1, wherein the participants are people.

4. Apparatus according to claim 1, wherein the processor is operable to generate the database structure such that the database structure also comprises an audio file having a plurality of audio data storage areas each associated with one of the image data storage areas with each audio data storage area being arranged to store data relating to audio data associated with the corresponding image data storage area.

5. Apparatus according to claim 1, wherein the processor is operable to generate the database structure such that the database structure also comprises a plurality of audio files each arranged to be associated with a respective different participant and each having a plurality of audio data storage areas each associated with one of the image data storage areas and each audio data storage area being arranged to store data relating to audio data associated with the corresponding image data storage area.

6. Apparatus according to claim 1, wherein the processor is operable to generate the database structure such that the database structure also comprises a speech file having a plurality of speech data storage areas each associated with one of the image data storage areas with each speech data storage area being arranged to store data relating to words spoken by or associated with a participant in an item of image data stored in the corresponding image data storage area.

7. Apparatus according to claim 6, wherein the processor is operable to generate the database structure such that the database structure also comprises at least one viewing proportion file arranged to store data relating to the amount of time an associated participant looks at each of a plurality of other participants while that participant is speaking.

8. Apparatus according to claim 6, wherein the processor is operable to generate the database structure such that the speech is arranged to be stored as text.

9. Apparatus according to claim 1, wherein the processor is operable to generate the database structure such that the database structure also comprises a plurality of speech files each associated with a particular different participant and each speech file having a plurality of speech data storage areas each associated with one of the image data storage areas and being arranged to store data relating to words spoken by or associated with that participant in relation to an image stored in that image data storage area.

10. Apparatus according to claim 1, wherein the processor is operable to generate the database structure such that the database structure also comprises a speech file having a plurality of speech data storage areas each associated with one of the image data storage areas with each speech data storage area being arranged to store data relating to words spoken by or associated with a participant in an item of image data stored in the corresponding image data storage area and to generate the viewing data file such that each viewing data storage area is arranged to store data indicating which, if any, of other participants in an item of image data stored in the corresponding image data storage area is being looked at by the participant when the participant associated with the viewing data file is speaking.

11. Apparatus according to claim 10, wherein the processor is operable to generate a viewing data file for each of a plurality of participants shown in the image data with each viewing data storage area of each viewing data file being arranged to store data indicating which, if any, of other participants in an item of image data stored in the corresponding image data storage area is being looked at by the participant associated with that viewing data file when that participant is speaking.

12. Apparatus according to claim 1, wherein the processor is operable to generate the database structure such that each image data storage area is arranged to store at least one frame of image data.

13. Apparatus according to claim 1, wherein the image data file is arranged to store image data having sound data associated therewith.

14. Apparatus for generating a database, comprising a memory and a processor operable to generate in the memory a database comprising: an image data file having a plurality of image data storage areas each storing an item of image data; a participants data file storing data identifying participants shown in the image data stored in the image data file; and a viewing data file having a plurality of viewing data storage areas each associated with one of the image data storage areas and storing data identifying the direction in which a participant shown in the item of image data stored in the corresponding image data storage area is looking.

15. A computer-readable storage medium encoded with computer-readable data defining a database structure comprising: an image data file having a plurality of image data storage areas each arranged to store an item of image data; a participants data file arranged to store data identifying participants shown in image data stored in the image data file; and a viewing data file having a plurality of viewing data storage areas each associated with one of the image data storage areas and being arranged to store data identifying the direction in which a participant shown in the image represented by an item of image data stored in the corresponding image data storage area is looking.

16. A storage medium according to claim 15, wherein the computer-readable data defines a database structure further comprising a plurality of viewing data files each arranged to be associated with a particular different one of participants shown in image data and each having a plurality of viewing data storage areas each associated with an image data storage area and each being arranged to store data indicating which, if any, of the other participants the participant associated with that viewing data storage area is looking at in an item of image data stored in the corresponding image data storage area.

17. A storage medium according to claim 15, wherein the computer-readable data defines a database structure further comprising an audio file having a plurality of audio data storage areas each associated with one of the image data storage areas with each audio data storage area being arranged to store data relating to audio data associated with the corresponding image data storage area.

18. A storage medium according to claim 15, wherein the computer-readable data defines a database structure further comprising a plurality of audio files each arranged to be associated with a respective different participant and each having a plurality of audio data storage areas each arranged to be associated with one of the image data storage areas and being arranged to store data relating to sounds issued by or associated with that image data storage area and the corresponding participant.

19. A storage medium according to claim 15, wherein the computer-readable data defines a database structure further comprising a speech file having a plurality of speech data storage areas each associated with one of the image data storage areas with each speech data storage area being arranged to store data relating to words spoken by or associated with a participant in an item of image data stored in the corresponding image data storage area.

20. A storage medium according to claim 15, wherein the computer-readable data defines a database structure further comprising a plurality of speech files each associated with a particular different participant and each speech file having a plurality of speech data storage areas each associated with one of the image storage areas and being arranged to store data identifying words spoken by or associated with that participant in relation to an image stored in that image data storage area.

21. A storage medium according to claim 20, wherein the computer-readable data defines a database structure further comprising at least one viewing proportion file arranged to store data relating to the amount of time an associated participant looks at each of a plurality of other participants while speaking.

22. A storage medium according to claim 20, wherein the computer-readable data defines a database structure arranged to store speech as text.

23. A storage medium according to claim 15, wherein the computer-readable data defines a database structure further comprising a speech file having a plurality of speech data storage areas each associated with one of the image data storage areas with each speech data storage area being arranged to store data relating to words spoken by or associated with a participant in an item of image data stored in the corresponding image data storage area and wherein each viewing data storage area is arranged to store data indicating which, if any, of other participants in an item of image data stored in the corresponding image data storage area is being looked at by the participant when the participant associated with the viewing data file is speaking.

24. A storage medium according to claim 23, wherein the computer-readable data defines a database structure comprising a viewing data file for each of a plurality of participants shown in the image data with each viewing data storage area of each viewing data file being arranged to store data indicating which, if any, of other participants in an item of image data stored in the corresponding image data storage area is being looked at by the participant associated with that viewing data file when that participant is speaking.

25. A storage medium according to claim 15, wherein the computer-readable data defines a database structure wherein the image data file is arranged to store image data having sound data associated therewith.

26. A computer-readable storage medium encoded with computer-readable data defining a database comprising: an image data file having a plurality of image data storage areas each storing an item of image data; a participants data file storing data identifying participants shown in the image data stored in the image data file; and a viewing data file having a plurality of viewing data storage areas each associated with one of the image data storage areas and storing data identifying the direction in which a participant shown in the image represented by the item of image data stored in the corresponding image data storage area is looking.

27. A storage medium according to claim 26, wherein the computer-readable data defines a database having a plurality of viewing data files each associated with a different participant shown in the image data and each having a plurality of viewing data storage areas each associated with an image data storage area and each storing data indicating which, if any, of the other participants the participant associated with that viewing data storage area is looking at in an item of image data stored in the corresponding image data storage area.

28. A storage medium according to claim 26, wherein the computer-readable data defines a database further comprising an audio file having a plurality of audio data storage areas each associated with one of the image data storage areas with each audio data storage area storing data relating to audio data associated with the corresponding image data storage area.

29. A storage medium according to claim 26, wherein the computer-readable data defines a database further comprising a plurality of audio files each associated with a respective different participant and each having a plurality of audio data storage areas each associated with one of the image data storage areas and storing data relating to sounds issued by or associated with the item of image data stored in that image storage area and the corresponding participant.

30. A storage medium according to claim 26, wherein the computer-readable data defines a database further comprising a speech file having a plurality of speech data storage areas each associated with one of the image data storage areas with each speech data storage area storing data relating to words spoken by or associated with a participant in an item of image data stored in the corresponding image data storage area.

31. A storage medium according to claim 26, wherein the computer-readable data defines a database further comprising a plurality of speech files each associated with a particular different participant and each speech file having a plurality of speech data storage areas each associated with one of the image storage areas and storing data relating to words spoken by or associated with that participant in relation to an image stored in that image data storage area.

32. A storage medium according to claim 31, wherein the computer-readable data defines a database further comprising at least one viewing proportion file storing data relating to the amount of time an associated participant looks at each of a plurality of other participants while speaking.

33. A storage medium according to claim 31, wherein the computer-readable data defines a database in which speech is stored as text.

34. A storage medium according to claim 26, wherein the computer-readable data defines a database also comprising a speech file having a plurality of speech data storage areas each associated with one of the image data storage areas with each speech data storage area storing data relating to words spoken by or associated with a participant in an item of image data stored in the corresponding image data storage area and wherein each viewing data storage area stores data indicating which, if any, of other participants in an item of image data stored in the corresponding image data storage area is being looked at by the participant when the participant associated with the viewing data file is speaking.

35. A storage medium according to claim 34, wherein the computer-readable data defines a database having a viewing data file for each of a plurality of participants shown in the image data with each viewing data storage area of each viewing data file storing data indicating which, if any, of other participants in an item of image data stored in the corresponding image data storage area is being looked at by the participant associated with that viewing data file when that participant is speaking.

36. A storage medium according to claim 26, wherein the computer-readable data defines a database wherein the image data file stores image data having sound data associated therewith.

37. A storage medium according to claim 26, wherein the computer-readable data defines a database wherein the image data file stores 3D computer model data.

38. A storage medium according to claim 26, wherein the computer-readable data defines a database wherein the image data file stores video data.

39. A storage medium according to claim 26, wherein the computer-readable data defines a database wherein the image data file stores still image data.

40. A method of generating a database, comprising the steps of causing a processor to generate in a memory a database comprising: an image data file having a plurality of image data storage areas each storing an item of image data; a participants data file storing data identifying participants shown in the image data stored in the image data file; and a viewing data file having a plurality of viewing data storage areas each associated with one of the image data storage areas and storing data identifying the direction in which a participant shown in the image represented by the item of image data stored in the corresponding image data storage area is looking.

41. Apparatus for searching a database storing a plurality of images, data identifying participants shown in the images, and, for each participant in each image, viewing data identifying the subject at which the participant is looking, the apparatus comprising:
 a receiver operable to receive a first search parameter identifying a first participant and a second search parameter identifying a subject the first participant is looking at;
 a viewing data identifier operable to search the database to identify in the database viewing data associating the subject defined by the second search parameter with the first participant defined by the first search parameter; and
 an image data identifier operable to identify image data associated with identified viewing data.

42. Apparatus for searching a database storing a plurality of images, data identifying participants shown in the images, viewing data defining, for each participant in each image, the subject at which the participant is looking, and data defining words spoken by or associated with a participant in an image, the apparatus comprising:
 a receiver operable to receive a first search parameter identifying a first participant and a second search parameter identifying a subject the first participant is looking at;

a viewing data identifier operable to search the database to identify in the database viewing data associating the subject defined by the second search parameter with the first participant defined by the first search parameter;

an image data identifier operable to identify image data associated with identified viewing data, wherein the receiver is operable to receive a further search parameter defining words spoken by the first participant to the subject; and a speech data identifier operable to search the database to identify in the database speech data containing speech defined by the further search parameter.

43. Apparatus for searching a database storing a plurality of images, data identifying participants shown in the images, viewing data defining, for each participant in each image, the subject at which the participant is looking, data defining words spoken by or associated with a participant in an image, and viewing proportion data relating to the amount of time a participant looks at each subject while speaking, the apparatus comprising:

a receiver operable to receive a first search parameter identifying a first participant, a second search parameter identifying a subject the first participant is looking at, and a third search parameter defining words spoken by the first participant to the subject;

a viewing data identifier operable to search the database to identify in the database viewing data associating the subject defined by the second search parameter with the first participant defined by the first search parameter;

a speech data identifier operable to search the database to identify in the database speech data containing words defined by the third search parameter;

an image data identifier operable to identify image data associated with identified viewing data and identified speech data; and a viewing proportion checker operable to check the viewing proportion data for the first participant for the identified speech and for disregarding any identified speeches where the amount of time the first participant looks at the subject is less than a predetermined proportion of the duration of that speech.

44. A method of searching a database storing a plurality of images, data identifying participants shown in the images, and, for each participant in each image, viewing data identifying the subject at which the participant is looking, the method comprising:

receiving a first search parameter identifying a first participant and a second search parameter identifying a subject the first participant is looking at;

identifying in the database viewing data associating the subject defined by the second search parameter with the first participant defined by the first search parameter; and identifying image data associated with identified viewing data.

* * * * *

UNITED STATES PATENT AND TRADEMARK OFFICE
CERTIFICATE OF CORRECTION

PATENT NO. : 7,139,767 B1
APPLICATION NO. : 09/519178
DATED : November 21, 2006
INVENTOR(S) : Michael James Taylor et al.

It is certified that error appears in the above-identified patent and that said Letters Patent is hereby corrected as shown below:

<u>COLUMN 8</u>:

Line 39, "step 522," should read --step S22,--.

<u>COLUMN 9</u>:

Line 64, "552 to 558" should read --S52 to S58--.

<u>COLUMN 11</u>:

Line 35, "step 598," should read --step S98,--.
Line 52, "step s100," should read --step S100,--.

<u>COLUMN 16</u>:

Line 10, "s150" should read --S110--.

<u>COLUMN 17</u>:

Line 8, "step s110," should read --step S110,--.
Line 38, "step 5232," should read --step S232,--.
Line 41, "step 5234," should read --step S234,--.
Line 42, "step 5232" should read --step S232,--.
Line 51, "step 5252," should read --step S252,--.

<u>COLUMN 19</u>:

Line 11, "step 5320," should read --step S320,--.
Line 28, "step 5342," should read --step S342,--.
Line 31, "angle 0" should read --angle $\theta$--; and "step 564" should read --step S64--.
Line 33, "step 5346," should read --step S346,--.
Line 34, "step 5344" should read --step S344--.
Line 36, "5274" should read --S274--.

UNITED STATES PATENT AND TRADEMARK OFFICE
CERTIFICATE OF CORRECTION

PATENT NO.         : 7,139,767 B1
APPLICATION NO. : 09/519178
DATED                 : November 21, 2006
INVENTOR(S)       : Michael James Taylor et al.

It is certified that error appears in the above-identified patent and that said Letters Patent is hereby corrected as shown below:

COLUMN 25:

Line 56, "step 5401" should read --step S401--.

COLUMN 27:

Line 55, "step 5452," should read --S452,--.

COLUMN 28:

Line 28, "step 5470," should read --step S470,--.
Line 35, "step 5370" should read --step S370--.

COLUMN 33:

Line 42, "544" should read --S44--.

COLUMN 34:

Line 3, "frame" should read --frames--.

COLUMN 35:

Line 6, "theirhorizontal" should read --their horizontal--.

COLUMN 36:

Line 51, "asci" should read --ASCII--.

COLUMN 41:

Line 39, "step 5638" should read --step S638--.

COLUMN 42:

Line 37, "step s647." should read --step S647--.

UNITED STATES PATENT AND TRADEMARK OFFICE
CERTIFICATE OF CORRECTION

| | |
|---|---|
| PATENT NO. | : 7,139,767 B1 |
| APPLICATION NO. | : 09/519178 |
| DATED | : November 21, 2006 |
| INVENTOR(S) | : Michael James Taylor et al. |

It is certified that error appears in the above-identified patent and that said Letters Patent is hereby corrected as shown below:

COLUMN 45:

Line 30, "pants" should read --pant's--.

COLUMN 46:

Line 51, "becomes" should read --become--.

COLUMN 50:

Line 50, "step 5920," should read --S920,--.

COLUMN 51:

Line 1, "in" should read --is--.
    Line 50, "internet" should read --Internet--.

COLUMN 52:

Line 44, "tile" should read --file--.

COLUMN 55:

Line 30, "than" should read --then--.

UNITED STATES PATENT AND TRADEMARK OFFICE
CERTIFICATE OF CORRECTION

| | |
|---|---|
| PATENT NO. | : 7,139,767 B1 |
| APPLICATION NO. | : 09/519178 |
| DATED | : November 21, 2006 |
| INVENTOR(S) | : Michael James Taylor et al. |

It is certified that error appears in the above-identified patent and that said Letters Patent is hereby corrected as shown below:

COLUMN 57:

Line 67, "GARNER" should read --GARNER ¶ Attorneys reference: 26439999; CFP 1203 WO--.

Signed and Sealed this

Twenty-third Day of September, 2008

JON W. DUDAS
*Director of the United States Patent and Trademark Office*